(12) United States Patent
Talbot

(10) Patent No.: US 9,113,593 B2
(45) Date of Patent: Aug. 25, 2015

(54) REDUCTION IN CUTTING INEFFICIENCY OF A SICKLE CUTTER SYSTEM

(71) Applicant: MacDon Industries Ltd., Winnipeg (CA)

(72) Inventor: Francois R. Talbot, Winnipeg (CA)

(73) Assignee: MacDon Industries Ltd, Winnipeg, MB (CA)

(*) Notice: Subject to any disclaimer, the term of this patent is extended or adjusted under 35 U.S.C. 154(b) by 345 days.

(21) Appl. No.: 13/743,885

(22) Filed: Jan. 17, 2013

(65) Prior Publication Data

US 2013/0192188 A1 Aug. 1, 2013

Related U.S. Application Data

(60) Provisional application No. 61/587,843, filed on Jan. 18, 2012, provisional application No. 61/664,345, filed on Jun. 26, 2012, provisional application No. 61/677,169, filed on Jul. 30, 2012, provisional application No. 61/677,177, filed on Jul. 30, 2012.

(51) Int. Cl.

| A01D 34/02 | (2006.01) |
| A01D 34/18 | (2006.01) |
| A01D 34/13 | (2006.01) |
| A01D 34/14 | (2006.01) |
| A01D 34/00 | (2006.01) |
| A01D 41/12 | (2006.01) |
| A01D 43/00 | (2006.01) |
| A01D 45/22 | (2006.01) |
| A01D 34/28 | (2006.01) |

(52) U.S. Cl.
CPC .............. *A01D 34/18* (2013.01); *A01D 34/008* (2013.01); *A01D 34/02* (2013.01); *A01D 34/13* (2013.01); *A01D 34/14* (2013.01); *A01D 34/28* (2013.01); *A01D 41/12* (2013.01); *A01D 43/00* (2013.01); *A01D 45/22* (2013.01)

(58) Field of Classification Search
USPC .................................... 56/257, 259, 297, 298
See application file for complete search history.

(56) References Cited

U.S. PATENT DOCUMENTS

| 3,553,948 A | 1/1971 | White |
| 3,577,716 A | 5/1971 | McCarty et al. |
| 4,236,370 A | 12/1980 | Shaver |
| 4,246,742 A | 1/1981 | Clark et al. |
| 4,644,738 A | 2/1987 | Krambeck et al. |
| 4,660,361 A | 4/1987 | Remillard et al. |
| 4,894,979 A | 1/1990 | Lohrentz |
| 4,909,026 A | 3/1990 | Molxahn |
| 6,962,040 B2 | 11/2005 | Talbot |
| 7,328,565 B2 | 2/2008 | Snider |

*Primary Examiner* — Thomas B Will
*Assistant Examiner* — Mai Nguyen
(74) *Attorney, Agent, or Firm* — Adrian D. Battison; Ade & Company Inc.

(57) ABSTRACT

In a sickle cutting system, it has been found that a significant decrease in cutting inefficiency, which is measured by calculating the area of the cutting process where crop is not immediately cut but is instead pushed forwardly by engagement with a surface of the system, can be obtained by a combination of one or more of the features where the cutting stroke is reduced from the conventional length of 3.0 inches to a value of the order of 2.0 inches; the length of the cutting edge of each knife blade is increased to a length greater than 2.2 inches; the width at the rear of the ledger surface of each guard is increased to greater than 1.0 inches; and the front edge of the blade is formed with an apex to shed crop material to one or other side of the apex.

17 Claims, 80 Drawing Sheets

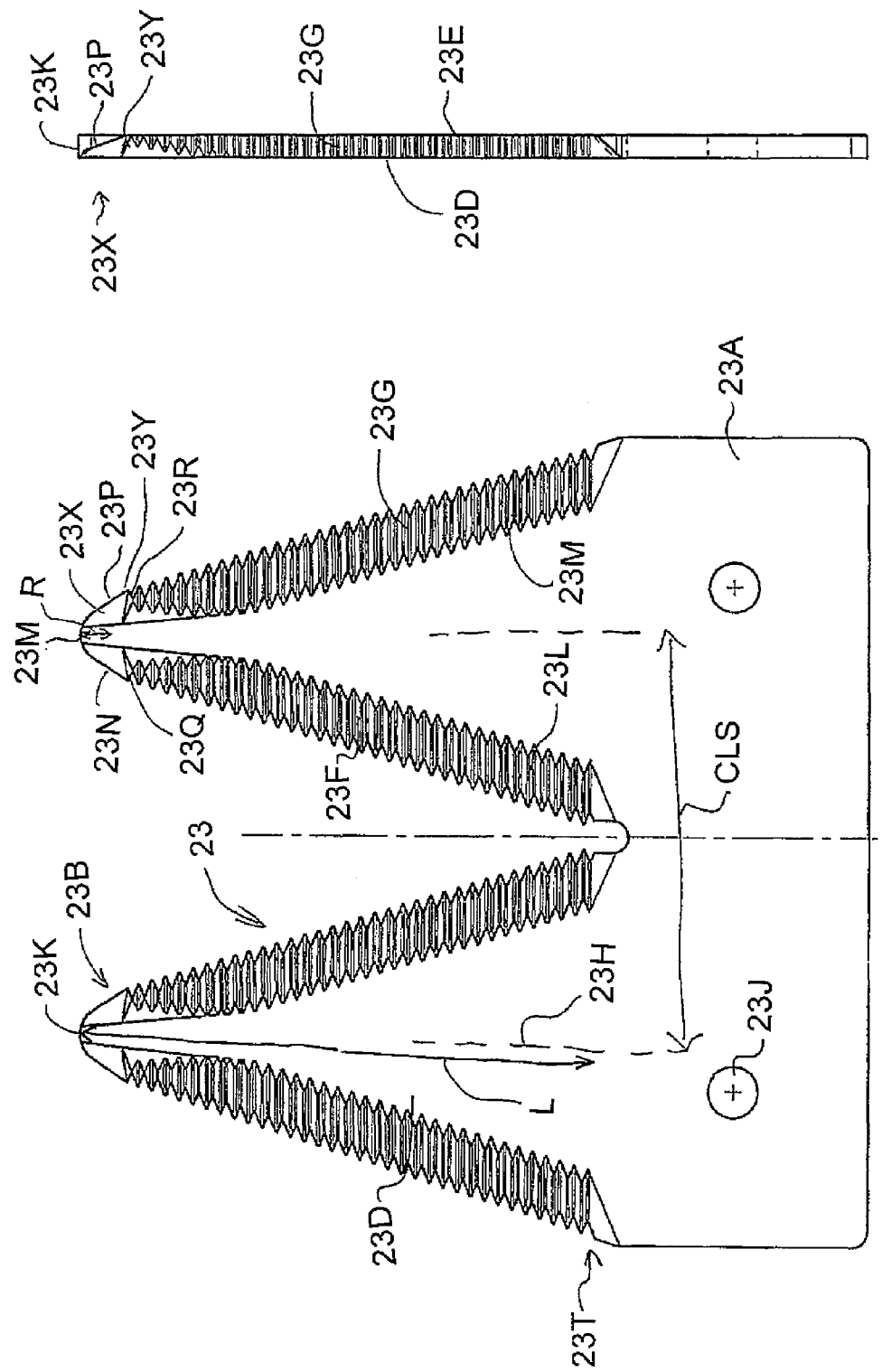

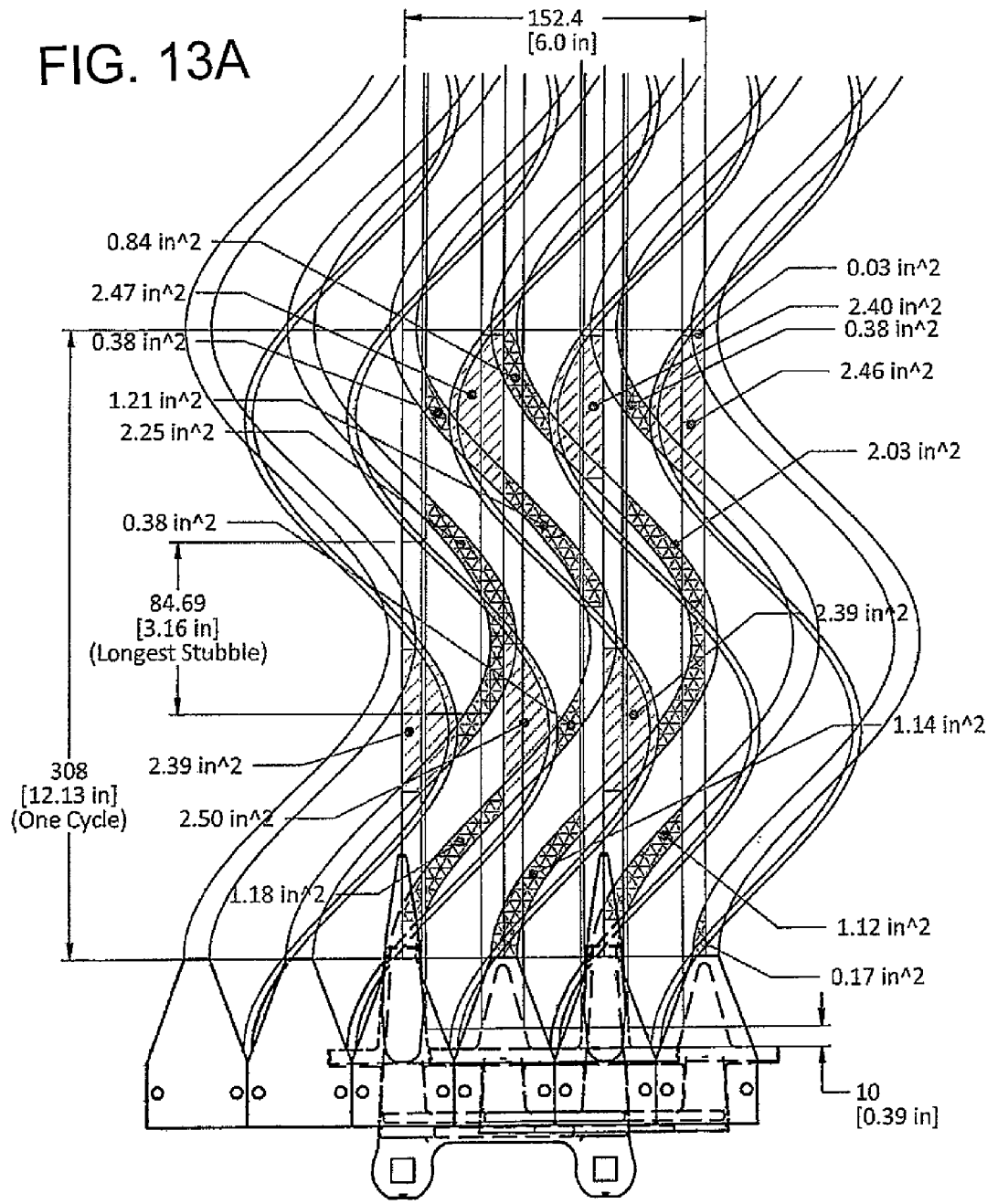

Stubble Length at Section A-A

Stubble Length at Section B-B

Stubble Length at Section C-C

Stubble Length at Section D-D

Stubble Length at Section A-A

Stubble Length at Section B-B

Stubble Length at Section C-C

Stubble Length at Section D-D

Stubble Length at Section A-A

Stubble Length at Section B-B

Stubble Length at Section C-C

Stubble Length at Section D-D

Stubble Length at Section A-A

Stubble Length at Section B-B

Stubble Length at Section C-C

Stubble Length at Section D-D

2" Guard/Section Spacing, 4" Stroke - 10 mph, 650 rpm

SECTION AA

2" Guard/Section Spacing, 4" Stroke - 10 mph, 650 rpm

SECTION BB

2" Guard/Section Spacing, 4" Stroke - 10 mph, 650 rpm

SECTION CC

SECTION DD

FIG. 21

| | Current stub guard and section: 1/4" Right of Left Guard Tip | | | | |
|---|---|---|---|---|---|
| | Amount that Stubble is Pushed: | | | | |
| Point No. | sideways X | forward Y | height of knife Z | Stubble Length | Length Above Knife |
| 1 | 0.17 | 8.53 | 1.50 | 8.66 | 7.16 |
| 2 | 0.17 | 7.53 | 1.50 | 7.68 | 6.18 |
| 3 | 0.17 | 6.53 | 1.50 | 6.70 | 5.20 |
| 4 | 0.17 | 5.53 | 1.50 | 5.73 | 4.23 |
| 5 | 0.17 | 4.53 | 1.50 | 4.77 | 3.27 |
| 6 | 0.17 | 3.53 | 1.50 | 3.84 | 2.34 |
| 7 | 0.17 | 2.53 | 1.50 | 2.95 | 1.45 |
| 8 | 0.17 | 1.53 | 1.50 | 2.15 | 0.65 |
| 9 | 0.17 | 0.53 | 1.50 | 1.60 | 0.10 |
| 10 | 0.20 | 0.00 | 1.50 | 1.51 | 0.01 |
| 11 | 0.10 | 0.00 | 1.50 | 1.50 | 0.00 |
| 12 | 0.10 | 0.00 | 1.50 | 1.50 | 0.00 |
| 13 | 0.10 | 10.61 | 1.50 | 10.72 | 9.22 |
| 14 | 0.17 | 9.61 | 1.50 | 9.73 | 8.23 |
| | | | Average: | 4.93 | 3.43 |

FIG. 22

Current stub guard and section: halfway between guard tips

| Point No. | Amount that Stubble is Pushed: sideways X | forward Y | height of knife Z | Stubble Length | Length Above Knife |
|---|---|---|---|---|---|
| 1 | 1.03 | 1.79 | 1.50 | 2.55 | 1.05 |
| 2 | 1.15 | 1.82 | 1.50 | 2.62 | 1.12 |
| 3 | 1.29 | 2.01 | 1.50 | 2.82 | 1.32 |
| 4 | 1.38 | 2.28 | 1.50 | 3.06 | 1.56 |
| 5 | 0.97 | 4.52 | 1.50 | 4.86 | 3.36 |
| 6 | 0.97 | 3.52 | 1.50 | 3.95 | 2.45 |
| 7 | 0.97 | 2.52 | 1.50 | 3.09 | 1.59 |
| 8 | 1.03 | 1.77 | 1.50 | 2.54 | 1.04 |
| 9 | 1.15 | 1.82 | 1.50 | 2.62 | 1.12 |
| 10 | 1.29 | 2.00 | 1.50 | 2.81 | 1.31 |
| 11 | 0.97 | 2.28 | 1.50 | 2.90 | 1.40 |
| 12 | 0.97 | 4.60 | 1.50 | 4.93 | 3.43 |
| 13 | 0.97 | 3.60 | 1.50 | 4.02 | 2.52 |
| 14 | 0.97 | 2.60 | 1.50 | 3.15 | 1.65 |
| | | | Average: | 3.28 | 1.78 |

FIG. 23

| Current stub guard and section: 1/4" Left of Right Guard ||||||
|---|---|---|---|---|---|
| | Amount that Stubble is Pushed: | | | | |
| Point No. | sideways X | forward Y | height of knife Z | Stubble Length | Length Above Knife |
| 1 | 0.17 | 1.53 | 1.50 | 2.15 | 0.65 |
| 2 | 0.17 | 0.53 | 1.50 | 1.60 | 0.10 |
| 3 | 0.20 | 0.00 | 1.50 | 1.51 | 0.01 |
| 4 | 0.10 | 0.00 | 1.50 | 1.50 | 0.00 |
| 5 | 0.10 | 0.00 | 1.50 | 1.50 | 0.00 |
| 6 | 0.10 | 10.61 | 1.50 | 10.72 | 9.22 |
| 7 | 0.17 | 9.61 | 1.50 | 9.73 | 8.23 |
| 8 | 0.17 | 8.53 | 1.50 | 8.66 | 7.16 |
| 9 | 0.17 | 7.53 | 1.50 | 7.68 | 6.18 |
| 10 | 0.17 | 6.53 | 1.50 | 6.70 | 5.20 |
| 11 | 0.17 | 5.53 | 1.50 | 5.73 | 4.23 |
| 12 | 0.17 | 4.53 | 1.50 | 4.77 | 3.27 |
| 13 | 0.17 | 3.53 | 1.50 | 3.84 | 2.34 |
| 14 | 0.17 | 2.53 | 1.50 | 2.95 | 1.45 |
| | | | Average: | 4.93 | 3.43 |

FIG. 24

| | Current stub guard and section: 7/8" Right of Left Guard Tip | | | | |
|---|---|---|---|---|---|
| | Amount that | | | | |
| Point No. | sideways X | forward Y | height of knife Z | Stubble Length | Length Above Knife |
| 1 | 1.84 | 3.30 | 1.50 | 4.07 | 2.57 |
| 2 | 1.94 | 3.23 | 1.50 | 4.06 | 2.56 |
| 3 | 2.01 | 3.09 | 1.50 | 3.98 | 2.48 |
| 4 | 0.45 | 5.52 | 1.50 | 5.74 | 4.24 |
| 5 | 0.45 | 4.52 | 1.50 | 4.78 | 3.28 |
| 6 | 0.45 | 3.52 | 1.50 | 3.85 | 2.35 |
| 7 | 0.45 | 2.52 | 1.50 | 2.97 | 1.47 |
| 8 | 0.45 | 1.52 | 1.50 | 2.18 | 0.68 |
| 9 | 0.38 | 0.53 | 1.50 | 1.64 | 0.14 |
| 10 | 0.53 | 0.00 | 1.50 | 1.59 | 0.09 |
| 11 | 0.67 | 0.00 | 1.50 | 1.64 | 0.14 |
| 12 | 4.60 | 1.71 | 1.50 | 5.13 | 3.63 |
| 13 | 3.60 | 1.71 | 1.50 | 4.26 | 2.76 |
| 14 | 2.60 | 1.71 | 1.50 | 3.45 | 1.95 |
| | | | Average: | 3.52 | 2.02 |

FIG. 25

| | Current pointed guard and section: 1/4" Right of Left Guard Tip | | | | |
|---|---|---|---|---|---|
| | Amount that Stubble is Pushed: | | | | |
| Point No. | sideways X | forward Y | height of knife Z | Stubble Length | Length Above Knife |
| 1 | 0.21 | 8.47 | 1.50 | 8.60 | 7.10 |
| 2 | 0.21 | 7.47 | 1.50 | 7.62 | 6.12 |
| 3 | 0.21 | 6.47 | 1.50 | 6.64 | 5.14 |
| 4 | 0.21 | 5.47 | 1.50 | 5.68 | 4.18 |
| 5 | 0.21 | 4.47 | 1.50 | 4.72 | 3.22 |
| 6 | 0.21 | 3.47 | 1.50 | 3.79 | 2.29 |
| 7 | 0.21 | 2.47 | 1.50 | 2.90 | 1.40 |
| 8 | 0.21 | 1.47 | 1.50 | 2.11 | 0.61 |
| 9 | 0.21 | 0.47 | 1.50 | 1.59 | 0.09 |
| 10 | 0.22 | 0.00 | 1.50 | 1.52 | 0.02 |
| 11 | 0.19 | 0.00 | 1.50 | 1.51 | 0.01 |
| 12 | 0.14 | 0.00 | 1.50 | 1.51 | 0.01 |
| 13 | 0.21 | 6.72 | 1.50 | 6.89 | 5.39 |
| 14 | 0.21 | 5.72 | 1.50 | 5.92 | 4.42 |
| | | | Average: | 4.36 | 2.86 |

FIG. 26

| | Current pointed guard and section: halfway between guard tips | | | | |
|---|---|---|---|---|---|
| | Amount that Stubble is Pushed: | | | | |
| Point No. | sideways X | forward Y | height of knife Z | Stubble Length | Length Above Knife |
| 1 | 1.02 | 1.78 | 1.50 | 2.54 | 1.04 |
| 2 | 1.06 | 1.68 | 1.50 | 2.49 | 0.99 |
| 3 | 1.10 | 1.69 | 1.50 | 2.51 | 1.01 |
| 4 | 1.13 | 1.77 | 1.50 | 2.58 | 1.08 |
| 5 | 1.04 | 4.47 | 1.50 | 4.83 | 3.33 |
| 6 | 1.04 | 3.47 | 1.50 | 3.92 | 2.42 |
| 7 | 1.04 | 2.47 | 1.50 | 3.07 | 1.57 |
| 8 | 1.03 | 1.77 | 1.50 | 2.54 | 1.04 |
| 9 | 1.06 | 1.69 | 1.50 | 2.50 | 1.00 |
| 10 | 1.10 | 1.68 | 1.50 | 2.51 | 1.01 |
| 11 | 1.13 | 1.76 | 1.50 | 2.57 | 1.07 |
| 12 | 1.04 | 4.53 | 1.50 | 4.88 | 3.38 |
| 13 | 1.04 | 2.53 | 1.50 | 3.12 | 1.62 |
| 14 | 1.04 | 2.53 | 1.50 | 3.12 | 1.62 |
| | | | Average: | 3.08 | 1.58 |

FIG. 27

| Current pointed guard and section: 1/4" Left of Right Guard | | | | |
|---|---|---|---|---|
| | Amount that Stubble is Pushed: | | | |
| Point No. | sideways X | forward Y | height of knife Z | Stubble Length | Length Above Knife |
| 1 | 0.21 | 1.47 | 1.50 | 2.11 | 0.61 |
| 2 | 0.21 | 0.47 | 1.50 | 1.59 | 0.09 |
| 3 | 0.22 | 0.00 | 1.50 | 1.52 | 0.02 |
| 4 | 0.19 | 0.00 | 1.50 | 1.51 | 0.01 |
| 5 | 0.14 | 0.00 | 1.50 | 1.51 | 0.01 |
| 6 | 0.21 | 6.72 | 1.50 | 6.89 | 5.39 |
| 7 | 0.21 | 5.72 | 1.50 | 5.92 | 4.42 |
| 8 | 0.21 | 8.47 | 1.50 | 8.60 | 7.10 |
| 9 | 0.21 | 7.47 | 1.50 | 7.62 | 6.12 |
| 10 | 0.21 | 6.47 | 1.50 | 6.64 | 5.14 |
| 11 | 0.21 | 5.47 | 1.50 | 5.68 | 4.18 |
| 12 | 0.21 | 4.47 | 1.50 | 4.72 | 3.22 |
| 13 | 0.21 | 3.47 | 1.50 | 3.79 | 2.29 |
| 14 | 0.21 | 2.47 | 1.50 | 2.90 | 1.40 |
| | | | Average: | 4.36 | 2.86 |

FIG. 28

| Current pointed guard and section: 7/8" Right of Left Guard Tip | | | | | |
|---|---|---|---|---|---|
| | Amount that | | | | |
| Point No. | sideways X | forward Y | height of knife Z | Stubble Length | Length Above Knife |
| 1 | 1.70 | 3.13 | 1.50 | 3.86 | 2.36 |
| 2 | 1.73 | 2.90 | 1.50 | 3.69 | 2.19 |
| 3 | 1.75 | 2.58 | 1.50 | 3.46 | 1.96 |
| 4 | 0.42 | 5.47 | 1.50 | 5.69 | 4.19 |
| 5 | 0.42 | 4.47 | 1.50 | 4.73 | 3.23 |
| 6 | 0.42 | 3.47 | 1.50 | 3.80 | 2.30 |
| 7 | 0.42 | 2.47 | 1.50 | 2.92 | 1.42 |
| 8 | 0.42 | 1.47 | 1.50 | 2.14 | 0.64 |
| 9 | 0.39 | 0.61 | 1.50 | 1.67 | 0.17 |
| 10 | 0.44 | 0.69 | 1.50 | 1.71 | 0.21 |
| 11 | 0.47 | 0.71 | 1.50 | 1.72 | 0.22 |
| 12 | 0.51 | 0.62 | 1.50 | 1.70 | 0.20 |
| 13 | 1.66 | 3.53 | 1.50 | 4.18 | 2.68 |
| 14 | 1.66 | 2.53 | 1.50 | 3.38 | 1.88 |
| | | | Average: | 3.19 | 1.69 |

FIG. 29

| Point No. | Amount that Stubble is Pushed: sideways X | forward Y | height of knife Z | Stubble Length | Length Above Knife |
|---|---|---|---|---|---|
| \multicolumn{6}{l}{New Cutting System: 1/4" Right of Left Guard Tip} |
| 1 | 1.61 | 3.79 | 1.5 | 4.38 | 2.88 |
| 2 | 1.61 | 2.83 | 1.5 | 3.58 | 2.08 |
| 3 | 0.53 | 2.95 | 1.5 | 3.35 | 1.85 |
| 4 | 0.53 | 1.99 | 1.5 | 2.55 | 1.05 |
| 5 | 0.53 | 1.04 | 1.5 | 1.90 | 0.40 |
| 6 | 0.53 | 0.08 | 1.5 | 1.59 | 0.09 |
| 7 | 0.42 | 0 | 1.5 | 1.56 | 0.06 |
| 8 | 0.29 | 0 | 1.5 | 1.53 | 0.03 |
| 9 | 0.15 | 0 | 1.5 | 1.51 | 0.01 |
| 10 | 0.02 | 0 | 1.5 | 1.50 | 0.00 |
| 11 | 0.11 | 0 | 1.5 | 1.50 | 0.00 |
| 12 | 1.61 | 4.77 | 1.5 | 5.25 | 3.75 |
| | | | Average: | 2.52 | 1.02 |

FIG. 30

| New Cutting System: Half-way between Guard Tips | | | | |
|---|---|---|---|---|
| Amount that Stubble is Pushed: | | | | |
| | | height of | | Length |
| | sideways | forward | knife | Stubble | Above |
| Point No. | X | Y | Z | Length | Knife |
| 1 | 0.48 | 1.01 | 1.50 | 1.87 | 0.37 |
| 2 | 0.64 | 1.21 | 1.50 | 2.03 | 0.53 |
| 3 | 0.82 | 1.56 | 1.50 | 2.31 | 0.81 |
| 4 | 0.20 | 1.90 | 1.50 | 2.43 | 0.93 |
| 5 | 0.20 | 0.94 | 1.50 | 1.78 | 0.28 |
| 6 | 0.30 | 0.79 | 1.50 | 1.72 | 0.22 |
| 7 | 0.47 | 0.97 | 1.50 | 1.85 | 0.35 |
| 8 | 0.65 | 1.22 | 1.50 | 2.04 | 0.54 |
| 9 | 0.82 | 1.56 | 1.50 | 2.31 | 0.81 |
| 10 | 0.21 | 1.86 | 1.50 | 2.40 | 0.90 |
| 11 | 0.21 | 0.90 | 1.50 | 1.76 | 0.26 |
| 12 | 0.31 | 0.80 | 1.50 | 1.73 | 0.23 |
| | | | Average: | 2.02 | 0.52 |

FIG. 31

| | Amount that Stubble is Pushed: | | height of knife | | |
|---|---|---|---|---|---|
| Point No. | sideways X | forward Y | height of knife Z | Stubble Length | Length Above Knife |
| 1 | 0.42 | 0 | 1.50 | 1.56 | 0.06 |
| 2 | 0.29 | 0 | 1.50 | 1.53 | 0.03 |
| 3 | 0.15 | 0 | 1.50 | 1.51 | 0.01 |
| 4 | 0.02 | 0 | 1.50 | 1.50 | 0.00 |
| 5 | 0.11 | 0 | 1.50 | 1.50 | 0.00 |
| 6 | 1.61 | 4.77 | 1.50 | 5.25 | 3.75 |
| 7 | 1.61 | 3.79 | 1.50 | 4.38 | 2.88 |
| 8 | 1.61 | 2.83 | 1.50 | 3.58 | 2.08 |
| 9 | 0.53 | 2.95 | 1.50 | 3.35 | 1.85 |
| 10 | 0.53 | 1.99 | 1.50 | 2.55 | 1.05 |
| 11 | 0.53 | 1.04 | 1.50 | 1.90 | 0.40 |
| 12 | 0.53 | 0.08 | 1.50 | 1.59 | 0.09 |
| | | | Average: | 2.52 | 1.02 |

New Cutting System: 1/4" Left of Right Guard Tip

FIG. 32

| | New Cutting System, stub, 2" stroke: 5/8" Right of Left Guard Tip | | | | |
|---|---|---|---|---|---|
| | Amount that Stubble is Pushed: | | | | |
| Point No. | sideways X | forward Y | height of knife Z | Stubble Length | Length Above Knife |
| 1 | 1.02 | 2.17 | 1.5 | 2.83 | 1.33 |
| 2 | 1.17 | 2.31 | 1.5 | 2.99 | 1.49 |
| 3 | 1.24 | 1.88 | 1.5 | 2.71 | 1.21 |
| 4 | 0.17 | 1.86 | 1.5 | 2.40 | 0.90 |
| 5 | 0.17 | 0.9 | 1.5 | 1.76 | 0.26 |
| 6 | 0.16 | 0.05 | 1.5 | 1.51 | 0.01 |
| 7 | 0.04 | 0 | 1.5 | 1.50 | 0.00 |
| 8 | 0.13 | 0.27 | 1.5 | 1.53 | 0.03 |
| 9 | 0.32 | 0.61 | 1.5 | 1.65 | 0.15 |
| 10 | 0.49 | 0.95 | 1.5 | 1.84 | 0.34 |
| 11 | 0.75 | 2.21 | 1.5 | 2.77 | 1.27 |
| 12 | 0.89 | 2.28 | 1.5 | 2.87 | 1.37 |
| | | | Average: | 2.20 | 0.70 |

FIG. 33

| | New Cutting System, pointed, 2" stroke: 1/4" Right of Left Guard Tip | | | | |
|---|---|---|---|---|---|
| | Amount that Stubble is Pushed: | | | | |
| Point No. | sideways X | forward Y | height of knife Z | Stubble Length | Length Above Knife |
| 1 | 1.39 | 3.38 | 1.5 | 3.95 | 2.45 |
| 2 | 1.39 | 2.42 | 1.5 | 3.17 | 1.67 |
| 3 | 0.53 | 2.89 | 1.5 | 3.30 | 1.80 |
| 4 | 0.53 | 1.93 | 1.5 | 2.50 | 1.00 |
| 5 | 0.53 | 0.97 | 1.5 | 1.86 | 0.36 |
| 6 | 0.53 | 0.01 | 1.5 | 1.59 | 0.09 |
| 7 | 0.44 | 0 | 1.5 | 1.56 | 0.06 |
| 8 | 0.35 | 0 | 1.5 | 1.54 | 0.04 |
| 9 | 0.24 | 0 | 1.5 | 1.52 | 0.02 |
| 10 | 0.14 | 0 | 1.5 | 1.51 | 0.01 |
| 11 | 0.06 | 0 | 1.5 | 1.50 | 0.00 |
| 12 | 1.19 | 2.37 | 1.5 | 3.05 | 1.55 |
| | | | Average: | 2.25 | 0.75 |

FIG. 34

| | HSCS, pointed guards, 2" stroke: Half-way between Guard Tips | | | | |
|---|---|---|---|---|---|
| | Amount that Stubble is Pushed: | | | | |
| Point No. | sideways X | forward Y | height of knife Z | Stubble Length | Length Above Knife |
| 1 | 0.36 | 0.78 | 1.50 | 1.73 | 0.23 |
| 2 | 0.51 | 0.96 | 1.50 | 1.85 | 0.35 |
| 3 | 0.63 | 1.17 | 1.50 | 2.00 | 0.50 |
| 4 | 0.20 | 1.90 | 1.50 | 2.43 | 0.93 |
| 5 | 0.20 | 0.94 | 1.50 | 1.78 | 0.28 |
| 6 | 0.28 | 0.79 | 1.50 | 1.72 | 0.22 |
| 7 | 0.40 | 0.97 | 1.50 | 1.83 | 0.33 |
| 8 | 0.50 | 0.96 | 1.50 | 1.85 | 0.35 |
| 9 | 0.63 | 1.17 | 1.50 | 2.00 | 0.50 |
| 10 | 0.21 | 1.86 | 1.50 | 2.40 | 0.90 |
| 11 | 0.21 | 0.90 | 1.50 | 1.76 | 0.26 |
| 12 | 0.27 | 0.69 | 1.50 | 1.67 | 0.17 |
| | | | Average: | 1.92 | 0.42 |

FIG. 35

| | HSCS, pointed guards, 2" stroke: 1/4" Left of Right Guard Tip | | | | |
|---|---|---|---|---|---|
| | Amount that Stubble is Pushed: | | height of knife | | |
| Point No. | sideways X | forward Y | height of knife Z | Stubble Length | Length Above Knife |
| 1 | 0.44 | 0 | 1.5 | 1.56 | 0.06 |
| 2 | 0.35 | 0 | 1.5 | 1.54 | 0.04 |
| 3 | 0.24 | 0 | 1.5 | 1.52 | 0.02 |
| 4 | 0.14 | 0 | 1.5 | 1.51 | 0.01 |
| 5 | 0.06 | 0 | 1.5 | 1.50 | 0.00 |
| 6 | 1.19 | 2.37 | 1.5 | 3.05 | 1.55 |
| 7 | 1.39 | 3.38 | 1.5 | 3.95 | 2.45 |
| 8 | 1.39 | 2.42 | 1.5 | 3.17 | 1.67 |
| 9 | 0.53 | 2.89 | 1.5 | 3.30 | 1.80 |
| 10 | 0.53 | 1.93 | 1.5 | 2.50 | 1.00 |
| 11 | 0.53 | 0.97 | 1.5 | 1.86 | 0.36 |
| 12 | 0.53 | 0.01 | 1.5 | 1.59 | 0.09 |
| | | | Average: | 2.25 | 0.75 |

FIG. 36

| | Amount that Stubble is Pushed: | | | | |
|---|---|---|---|---|---|
| Point No. | sideways X | forward Y | height of knife Z | Stubble Length | Length Above Knife |
| 1 | 0.88 | 1.93 | 1.5 | 2.60 | 1.10 |
| 2 | 0.98 | 1.95 | 1.5 | 2.65 | 1.15 |
| 3 | 1.03 | 1.47 | 1.5 | 2.34 | 0.84 |
| 4 | 0.17 | 1.86 | 1.5 | 2.40 | 0.90 |
| 5 | 0.17 | 0.9 | 1.5 | 1.76 | 0.26 |
| 6 | 0.16 | 0.05 | 1.5 | 1.51 | 0.01 |
| 7 | 0.07 | 0 | 1.5 | 1.50 | 0.00 |
| 8 | 0.03 | 0 | 1.5 | 1.50 | 0.00 |
| 9 | 0.16 | 0.29 | 1.5 | 1.54 | 0.04 |
| 10 | 0.27 | 0.44 | 1.5 | 1.59 | 0.09 |
| 11 | 0.7 | 2.13 | 1.5 | 2.70 | 1.20 |
| 12 | 0.8 | 2.12 | 1.5 | 2.72 | 1.22 |
| | | | Average: | 2.07 | 0.57 |

HSCS, pointed guards, 2" stroke: 5/8" Right of Left Guard Tip

FIG. 37

| | JD system (2 & 4): 1/4" Right of Left Guard Tip | | | | |
|---|---|---|---|---|---|
| | Amount that Stubble is Pushed: | | height of knife | Stubble | Length Above |
| Point No. | sideways X | forward Y | Z | Length | Knife |
| 1 | 1.62 | 3.46 | 1.5 | 4.10 | 2.60 |
| 2 | 1.23 | 2.1 | 1.5 | 2.86 | 1.36 |
| 3 | 1.29 | 1.51 | 1.5 | 2.49 | 0.99 |
| 4 | 1.47 | 1.88 | 1.5 | 2.82 | 1.32 |
| 5 | 1.62 | 2.1 | 1.5 | 3.05 | 1.55 |
| 6 | 0.16 | 3.63 | 1.5 | 3.93 | 2.43 |
| 7 | 0.16 | 2.61 | 1.5 | 3.01 | 1.51 |
| 8 | 0.16 | 1.6 | 1.5 | 2.20 | 0.70 |
| 9 | 0.16 | 0.58 | 1.5 | 1.62 | 0.12 |
| 10 | 0.13 | 0 | 1.5 | 1.51 | 0.01 |
| 11 | 0.10 | 0 | 1.5 | 1.50 | 0.00 |
| 12 | 0.08 | 0 | 1.5 | 1.50 | 0.00 |
| 13 | 0.12 | 0 | 1.5 | 1.50 | 0.00 |
| 14 | 0.10 | 0 | 1.5 | 1.50 | 0.00 |
| 15 | 1.61 | 5.28 | 1.5 | 5.72 | 4.22 |
| 16 | 1.61 | 4.26 | 1.5 | 4.79 | 3.29 |
| | | | | Average: 2.76 | 1.26 |

FIG. 38

| | ID system (2 & 4): 5/8" Right of Left Guard Tip | | | | |
|---|---|---|---|---|---|
| | Amount that Stubble is Pushed: | | | | |
| Point No. | sideways X | forward Y | height of knife Z | Stubble Length | Length Above Knife |
| 1 | 1.10 | 2.21 | 1.50 | 2.89 | 1.39 |
| 2 | 1.21 | 2.04 | 1.50 | 2.81 | 1.31 |
| 3 | 0.90 | 1.18 | 1.50 | 2.11 | 0.61 |
| 4 | 1.04 | 1.43 | 1.50 | 2.32 | 0.82 |
| 5 | 1.21 | 1.81 | 1.50 | 2.64 | 1.14 |
| 6 | 0.22 | 3.63 | 1.50 | 3.93 | 2.43 |
| 7 | 0.22 | 2.61 | 1.50 | 3.02 | 1.52 |
| 8 | 0.22 | 1.60 | 1.50 | 2.20 | 0.70 |
| 9 | 0.22 | 0.58 | 1.50 | 1.62 | 0.12 |
| 10 | 0.24 | 0.39 | 1.50 | 1.57 | 0.07 |
| 11 | 0.27 | 0.40 | 1.50 | 1.58 | 0.08 |
| 12 | 0.22 | 0.30 | 1.50 | 1.55 | 0.05 |
| 13 | 0.25 | 0.36 | 1.50 | 1.56 | 0.06 |
| 14 | 0.28 | 0.45 | 1.50 | 1.59 | 0.09 |
| 15 | 1.04 | 3.79 | 1.50 | 4.21 | 2.71 |
| 16 | 1.04 | 2.77 | 1.50 | 3.32 | 1.82 |
| | | | Average: | 2.43 | 0.93 |

FIG. 39

| | Amount that Stubble is Pushed: | | | | |
|---|---|---|---|---|---|
| Point No. | sideways X | forward Y | height of knife Z | Stubble Length | Length Above Knife |
| 1 | 0.59 | 1.15 | 1.5 | 1.98 | 0.48 |
| 2 | 0.72 | 1.19 | 1.5 | 2.05 | 0.55 |
| 3 | 0.88 | 1.29 | 1.5 | 2.17 | 0.67 |
| 4 | 0.58 | 0.79 | 1.5 | 1.79 | 0.29 |
| 5 | 0.75 | 1.08 | 1.5 | 1.99 | 0.49 |
| 6 | 0.6 | 3.67 | 1.5 | 4.01 | 2.51 |
| 7 | 0.6 | 2.65 | 1.5 | 3.10 | 1.60 |
| 8 | 0.6 | 1.64 | 1.5 | 2.30 | 0.80 |
| 9 | 0.6 | 0.62 | 1.5 | 1.73 | 0.23 |
| 10 | 0.64 | 1.07 | 1.5 | 1.95 | 0.45 |
| 11 | 0.66 | 1 | 1.5 | 1.92 | 0.42 |
| 12 | 0.61 | 0.82 | 1.5 | 1.82 | 0.32 |
| 13 | 0.64 | 0.92 | 1.5 | 1.87 | 0.37 |
| 14 | 0.49 | 3.4 | 1.5 | 3.75 | 2.25 |
| 15 | 0.49 | 2.38 | 1.5 | 2.86 | 1.36 |
| 16 | 0.49 | 1.37 | 1.5 | 2.09 | 0.59 |
| | | | Average: | 2.34 | 0.84 |

JD system (2 & 4): Half-way between Guard Tips

FIG. 40

| | JD system (2 & 4): 1/4" Left of Right Guard Tip | | | | |
|---|---|---|---|---|---|
| | Amount that Stubble is Pushed: | | height of knife | | |
| Point No. | sideways X | forward Y | height of knife Z | Stubble Length | Length Above Knife |
| 1 | 0.26 | 0.44 | 1.50 | 1.58 | 0.08 |
| 2 | 0.18 | 0.00 | 1.50 | 1.51 | 0.01 |
| 3 | 0.05 | 0.00 | 1.50 | 1.50 | 0.00 |
| 4 | 0.12 | 0.12 | 1.50 | 1.51 | 0.01 |
| 5 | 0.14 | 0.00 | 1.50 | 1.51 | 0.01 |
| 6 | 0.00 | 0.00 | 1.50 | 1.50 | 0.00 |
| 7 | 0.11 | 0.00 | 1.50 | 1.50 | 0.00 |
| 8 | 1.34 | 4.33 | 1.50 | 4.77 | 3.27 |
| 9 | 1.34 | 3.32 | 1.50 | 3.88 | 2.38 |
| 10 | 1.34 | 2.30 | 1.50 | 3.06 | 1.56 |
| 11 | 1.35 | 1.50 | 1.50 | 2.51 | 1.01 |
| 12 | 1.39 | 1.86 | 1.50 | 2.76 | 1.26 |
| 13 | 0.26 | 4.45 | 1.50 | 4.70 | 3.20 |
| 14 | 0.26 | 3.43 | 1.50 | 3.75 | 2.25 |
| 15 | 0.26 | 2.42 | 1.50 | 2.86 | 1.36 |
| 16 | 0.26 | 1.4 | 1.5 | 2.07 | 0.57 |
| | | | Average: | 2.56 | 1.06 |

FIG. 41

|  | Figure 16 | | Figure 17 | | Figure 20 | | Figure 18 | | Figure 19 | |
|---|---|---|---|---|---|---|---|---|---|---|
|  | from ground | above knife | from ground | above knife | from ground | above knife | from ground | above knife | from ground | above knife |
| Longest Stubble Length | 10.72 | 9.22 | 8.60 | 7.10 | 5.72 | 4.22 | 5.25 | 3.75 | 3.95 | 2.45 |
| Average Stubble Length (half way between guards tips) | 3.28 | 1.78 | 3.08 | 1.58 | 2.34 | 0.84 | 2.02 | 0.52 | 1.92 | 0.42 |
| Average Stubble Length (¼" right of LH guard tip) | 4.93 | 3.43 | 4.36 | 2.86 | 2.76 | 1.26 | 2.52 | 1.02 | 2.25 | 0.75 |
| Average Stubble Length (¼" left of LH guard tip) | 4.93 | 3.43 | 4.36 | 2.86 | 2.56 | 1.06 | 2.52 | 1.02 | 2.25 | 0.75 |
| Average Stubble Length (half way between ¼" and centre) | 3.52 | 2.02 | 3.19 | 1.69 | 2.43 | 0.93 | 2.20 | 0.70 | 2.07 | 0.57 |
| Overall Average Stubble Length | 4.04 | 2.54 | 3.64 | 2.14 | 2.50 | 1.00 | 2.29 | 0.79 | 2.11 | 0.61 |

FIG. 42

| | Column 1 | | Column 2 | | Column 3 | | Column 4 | |
|---|---|---|---|---|---|---|---|---|
| | from ground | above knife | from ground | above knife | from ground | above knife | from ground | above knife |
| Longest Stubble Length | 4.75 | 3.25 | 3.89 | 2.39 | 5.49 | 3.99 | 4.02 | 2.52 |
| Average Stubble Length (half way between guards tips) | 1.89 | 0.39 | 1.76 | 0.26 | 2.58 | 1.08 | 2.14 | 0.64 |
| Average Stubble Length (¼" right of LH guard tip) | 2.34 | 0.84 | 2.14 | 0.64 | 3.05 | 1.55 | 2.41 | 0.91 |
| Average Stubble Length (¼" left of LH guard tip) | 2.34 | 0.84 | 2.14 | 0.64 | 3.05 | 1.55 | 2.41 | 0.91 |
| Average Stubble Length (half way between ¼" and centre) | 2.08 | 0.58 | 2.08 | 0.58 | 2.92 | 1.42 | 2.22 | 0.72 |
| Overall Average Stubble Length | 2.15 | 0.65 | 2.04 | 0.54 | 2.90 | 1.40 | 2.28 | 0.78 |

FIG. 43

|  | 6MPH Typical RPM | 10MPH Typical RPM | 14MPH Typical RPM |
|---|---|---|---|
| 2" stroke | 735 | 918 | 1102 |
| 3" stroke | 600 | 750 | 900 |
| 4" stroke | 520 | 650 | 779 |
|  |  |  |  |

REDUCTION IN CUTTING INEFFICIENCY OF A SICKLE CUTTER SYSTEM

This application claims the benefit under 35 USC 119(e) of Provisional Applications U.S. 61/587,843 filed Jan. 18, 2012; U.S. 61/664,345 filed Jun. 26, 2012; 61/677,169 filed Jul. 30, 2012 and U.S. 61/677,177 filed Jul. 30, 2012.

This invention relates generally to a sickle knife cutter system for harvesting crop with improved cutting action which leads to a reduction in cutting inefficiency, which is measured by calculating the area of the cutting process where crop is not immediately cut but is instead pushed forwardly by engagement with a non-cutting surface of the system.

BACKGROUND OF THE INVENTION

The present invention relates generally to a crop cutting device comprising a frame structure arranged for forward travel over ground having a standing crop thereon; a cutter bar secured to the frame structure and extending transversely across a front end of said frame structure; a plurality of knife guards mounted in spaced relation along said cutter bar and projecting forwardly therefrom in transverse alignment; each of said guards having an upwardly facing ledger surface with opposed side edges thereof arranged to provide first and second shearing edges; a sickle bar mounted in transversely extending position and being driven for reciprocating movement relative to said knife guards; the sickle bar having a plurality of knife blades mounted thereon for movement therewith; each of the knife blades having a cutting surface for passing across the ledger surface of the knife guards and an opposed surface; each of the knife blades having two side cutting edges which are beveled from the opposed surface to the cutting surface to cooperate with said shearing edges of said knife guards; the sickle bar being driven to carry the knife blades back and forth between the knife guards.

It is well known that many sickle knives of this general type include a conventional or pointed guard where the guard is formed as an integral element which includes a base piece attached to the cutter bar and defining the ledger surface and a nose piece projecting forwardly from the ledger surface in front of the front edge of the blade which is generally pointed at a leading end so as to separate the crop to each side of the guard. This nose piece also stands up in front of the ledger surface to protect the front edge of the blade and includes a rearwardly extending shelf over the ledger surface which forms a slot with the ledger surface through which the blade passes. Guards of this type include separate hold down members between the guards which apply downward pressure on the cutter bar to press the blades against the ledger surface.

Pointed guards generally feature a point with a cut slot that the sickle blades reciprocate in and out of. Various types of hold-down arrangement are used to apply pressure to the sickle to keep its shearing surface in close contact with the guard ledger as cutting occurs. Usually these are located between the guard point or at the rear edge of the sickles. Most are sheet metal and feature easy adjustment using a hammer or a simple single point threaded adjustment. By keeping the hold-downs separate from the guards fewer hold-downs than points may be used to reduce the cost and number of adjustments required. Pointed guards have found much favor in easier cutting conditions due to the ease of adjustment and superior performance.

Another form of guard is known as a stub guard which is formed in two separate pieces including a base piece which carries the ledger surface and a top piece which extends over the ledger surface. The pieces are separate and separately adjustable relative to the cutter bar so that the top piece can apply pressure onto the blade to press it onto the ledger surface. The pieces terminate at a front edge which is just behind the front edge of the blade so that the front edge of the blade is presented to the crop.

In tough cutting, stub or no-clog guards have found the most favor. Stub guards use a separate top and bottom guard pieces that spaced slightly more than one sickle blade thickness apart create a slot for the blade to operate in. The front edge of the blade protrudes slightly past the front tip of the two guards. This feature is what originally gave stub-guards their non-clogging self-cleaning action. A major improvement in stub guard technology was made when fully adjustable top hold-down assemblies were introduced. These arrangements allowed the gap to be controlled much more precisely than previously so that the shearing surface of the blade was kept in close contact with the guard ledger surface. This adjustability allows the stub top piece to act as a much more effective hold-down than the hold-downs found on regular pointed guard systems.

The pointed guard has an advantage of presenting a point to the incoming crop so that crop is effectively divided around it. This is especially advantageous when the sickle blade is at or near the end or start of each stroke and a front edge of each blade, which is typically a blunt front edge of a width of the order of 0.5 inch, is hidden partially or entirely within the guard slot. Since the sickle bar velocity is lowest at or near the end or start of each stroke this gives the pointed guard a considerable advantage over the stub guard for most crops.

The guards can be formed as single elements separately mounted on the guard bar or as double or triple elements connected together side by side for common mounting and common adjustment relative to the guard bar. There is no reason why more elements might be included but this is not typical.

In some cases the arrangement is of the double sickle type where each sickle bar is essentially half the length of the cutter bar and the cutter bars reciprocate in opposite phase to minimize vibrating mass and vibrations. Usually the sickle bars are timed so that they move in opposite directions so that vibrations induced into the cutter bar assembly are minimized.

The sickle knife cutting system has been widely accepted as the most power efficient system due to the shearing action. However due to speed restrictions of generally less than 5 to 8 mph ground speed, other systems such as rotating flail systems have come into use since these can be operated at much higher ground speed of up to 14 mph while maintaining a high cutting efficiency. Such rotary systems have however much higher power usage, are limited in width and provide crop handling difficulties for forming effective swaths for drying of the crop.

It remains therefore an ongoing and highly desirable objective to construct a sickle knife system which can cut standing crop with sufficient cutting efficiency that the ground speed can be significantly increased. It is believed that the construction of a sickle cutting system which can operate at ground speeds of greater than 5 to 8 mph and up to 14 mph would enable the advantages of the sickle cutting action to take back the market currently being met by the flail systems.

Cutting crops such as soy beans where the bean pods can be located closely adjacent the ground typically requires low ground speeds of around 4 to 5 mph to ensure that the crop is cut and fed into the combine harvester without too much loss of the pods. Pods can be lost if the cutting action causes some or too many of the lowest pods to be left at the stubble or broken up by the cutting action. It would be highly desirable to increase cutting speed above the typical range of 4 to 5 mph so as to increase this to or above 6 mph.

Cutting crops such as hay or forage crops such as alfalfa or grasses typically allows higher ground speeds of up to 10 mph since the crop is more resistant to a poor or inefficient cutting action. It would be highly desirable to increase cutting speed above the typical range of up to 10 mph so as to increase this to or above 12 or even 14 mph.

The term "sickle bar" as used herein is intended to refer generally to a structure which supports all of the knife blades at the spaced positions along its length and is not intended to be limited to a single continuous element extending along the whole length of the structure. Thus the bar may be formed of different elements at different parts of the length and may include pieces below and above the blades.

SUMMARY OF THE INVENTION

It is one object of the present invention to provide a sickle cutting apparatus which can provide an improvement in cutting efficiency leading to a possible increase in ground speed.

According to the invention there is provided a sickle cutting apparatus comprising:

a frame structure arranged for forward travel over ground having a standing crop thereon;

a cutter bar secured to the frame structure and extending transversely across a front end of said frame structure;

a plurality of stationary knife guards mounted along the cutter bar and projecting forwardly therefrom;

each of said guards having at least one guard finger so that the fingers are arranged in a row along the cutter bar with a space between each finger and the next allowing crop to enter the space up to a position of engagement with a rear element along the cutter bar;

each guard finger having an upwardly facing ledger surface with opposed side edges thereof arranged to provide first and second shearing edges;

a sickle bar mounted in transversely extending position and being driven for reciprocating movement relative to said guard fingers;

the sickle bar having a plurality of knife blades mounted thereon for movement therewith;

each of the knife blades having a cutting surface for passing across the ledger surface of the knife guard fingers and an opposed surface;

each of the knife blades having on first and second sides first and second side cutting edges which are beveled from the opposed surface to the cutting surface to cooperate with said shearing edges of said guard fingers;

the guard fingers and knife blades being arranged so as to provide a cutting action on the crop in which each knife blade reciprocates back and forth between the guard fingers;

wherein the guard fingers, knife blades and the rear element are shaped and arranged to provide a percentage cutting inefficiency calculated as follows:

within a rectangular area defined by the length of the knife stroke and the ground distance traveled during one knife cycle, within a rectangular area defined by the length of the knife stroke and the ground distance traveled during one knife cycle, the sum of any areas of crop in which the crop remains uncut until it reaches an element of the cutting system by which the crop is pushed forward, without cutting, by contact with the element as the element moves forward;

divided by:

the rectangular area defined by the length of the knife stroke and the ground distance traveled during one knife cycle;

EITHER wherein the percentage cutting inefficiency, calculated at 6 mph and at a sickle stroke rate set at a value which provides inertia values equal to those obtained by a three inch stroke at 600 rpm, is less than 30% preferably less than 25% and more preferably less than 20%;

OR wherein the percentage cutting inefficiency, calculated at 10 mph and at a sickle stroke rate set at a value which provides inertia values equal to those obtained by a three inch stroke at 750 rpm, is less than 35% preferably less than 30% and more preferably less than 25%;

OR wherein the percentage cutting inefficiency, calculated at 14 mph and at a sickle stroke rate set at a value which provides inertia values equal to those obtained by a three inch stroke at 900 rpm, is less than 40% preferably less than 35% and more preferably less than 30%.

GENERAL DESCRIPTION

It has been found, as described hereinafter, in relation to the embodiments particularly described, that a significant increase in ground speed while maintaining an acceptable level of cutting efficiency as measured by the average stubble length can be obtained by a combination of one or more of the features where:

a) The distance between the center line of the guards which is generally equal to the distance between the center line of the blades is reduced from the conventional length of 3.0 inches. This distance may be equal to the stroke length so that a shorter stroke length can allow a significant increase in reciprocation rate. However the stroke length may be a multiple of the center line distance. Even where the stoke length is not reduced so that the increase in reciprocation rate cannot be achieved, the reduced center line distance has been shown to provide a significant advantage.

b) the length of the cutting edge of each knife blade as measured from a rearmost end of a cutting action to a forwardmost tip of the knife blade is increased from a conventional length to a length greater than 2.2 inches.

c) the width of the ledger surface of each guard at a position thereon aligned with the rear end of the cutting edge of each knife blade is increased from a conventional length to a length greater than 1.0 inches.

d) the front edge of the blade is formed with a pointed portion where the shape of an apex and side edges of the pointed portion are arranged to shed crop material engaging the point portion as the point portion is moved forwardly in the crop to one or other side of the point portion for cutting and to avoid pushing crop forwardly by the point portion.

This combination surprisingly provides a crop cutting efficiency which is sufficiently high that the ground speed can be increased from the conventional of the order of 5 to 8 mph to 12 to 14 mph. This increase is significant and significantly alters the ability of the draper header to harvest forage crops such as alfalfa at greater than 10 mph and up to 14 mph and to harvest soy beans at greater than 5 mph and up to 6 or 7 mph.

The invention herein can be defined as or relate to the method of cutting, the header for cutting, the guards and/or the knife blades. Thus each of these components of the invention includes aspects of the invention which distinguish that component from the prior art as defined hereinafter.

Blade Length

A first improvement can therefore be obtained by providing a knife blade which is narrower than conventional system so that typically the width is equal to approximately 2.0 inches center to center while providing a blade which has a length greater than conventional system so that the length from the trash bar to the tip is greater than 2.0 inches and typically of the order of or greater than 2.75 inches.

This can be further combined with an arrangement in which the width of the guard at the trash bar is increased so that the width of each guard at the rear trash bar is equal to the maximum width which can be obtained while leaving a space at the trash bar between the ledger surfaces of the order of 0.5 inch or the distance necessary to avoid pinching of crop stalks between the ledger surfaces.

Typically each of the knife blades is generally triangular in shape so that the side edges converge to a front edge at an angle of the order of 60 degrees to the direction of reciprocating movement. The blade has a bottom cutting surface for passing across the ledger surface of the knife guards and an opposed or upper surface. The two converging side cutting edges are beveled from the upper surface to the bottom cutting surface to cooperate with the shearing edges of said knife guards. In addition the beveled side edges are typically serrated with grooves running in a direction longitudinal to the reciprocating direction. In order to maximize the cutting action, the length of the cutting edge is substantially the maximum length extending from the trash bar at the rear to a position close to the front edge of the blade.

The fore-aft length of a blade has traditionally been in the order of 45 mm (1.75 in) from the front of the trash bar, that is the rearmost cutting location or the rear of the cutting action, to the tip of the section, or 55 mm (2.2 in) from the front edge of the knife back to the tip of the section. Traditionally this dimension is usually similar to the length of the cutting edge.

In this new arrangement, the fore-aft length of the blade is increased substantially. Thus the length of cutting edge of each sickle blade from a rearmost end of the cutting action at the trash bar, or to the rear of the shearing action on the ledger surfaces, to a front edge of the blade in the present invention is greater than 1.75 inches. This can lie in the range 2.2 to 3.0 inches.

The term "trash bar" as used herein does not require the provision of a specific bar member extending across the blades but merely relates to the position of that component of the system where the crop is halted as it moves rearwardly between the guard fingers. Thus at some point the crop is halted so that it remains in the position where it can be engaged by the side edges of the blades and can be cut in the shearing action relative to the side edges of the ledger surface. This element which halts the crop movement is called herein the "trash bar".

This also reduces the angle of inward inclination of the cutting edge from the typical 30 degrees to an angle less than 20 degrees and typically of the order of 15 degrees and in the range 15 to 30 degrees.

Thus in one example the blade has a width of 2.0 inches at the base and a length from the front of the trash bar to the tip of 2.5 inches.

Pointed Blade Tip

It is common practice for sickle sections, of the current type having beveled and serrated side edges, to have a front edge in the order of 15 mm (0.6 inches) wide. When used with a pointed guard, this is not as much of a problem as this edge is sometimes in the shadow of the guard. However, even with pointed guards and certainly when used with stub guards, the wide tip has the potential for running down crop or pushing the crop forwardly with the forward motion of the cutter bar, thus leaving more long uncut stems greater in length than the nominal minimum value above thus significantly increasing the average length with is the measure herein of cutting efficiency. In present invention the blade is designed with a pointed tip, thus eliminating the problem when used with stub guards.

In some crop conditions e.g. forage with a mat of wet leaves near the ground, pointed guards will tend to plug due to "mouse nesting" on the guard point. It is therefore important that a cutting system works well with stub guards.

The intention is therefore to provide a sickle blade which is as pointed as reasonably practical. A sharp point is difficult to obtain so that typically the front edge is smoothly curved with a radius of curvature less than 0.5 inches thus defining a front apex which is sufficiently narrow to shed crop stalks to each side. That is, each knife blade has a front point portion in front of the cutting edges which has side edges converging to front apex where the apex and the side edges are shaped and arranged such that crop material engaging the point portion, as the point portion is moved forwardly in the crop, is shed to one or other side of the point portion for cutting and is not pushed forwardly by the point portion. In the present arrangement the front apex is not a point as this can be damaged but is a curved front edge of a radius of curvature less than 0.5 inches and preferably less than 0.25 inches. From this curvature the sides of the pointed portion diverge rearwardly at an angle approximately equal to or slightly greater than the angle of the cutting edges.

In a blade which has a center to center spacing of the order of 2.0 inches and a length from apex to trash bar greater than 2.0 inches, the angle of the side edges of the blade is less than 20 degrees and can be as low as 15 degrees.

The angle of the side edges of the front point portion can be greater and is typically in the range 30 to 45 degrees and preferably of the order of 35 degrees.

This curvature at the apex and the angle of divergence from the curved apex acts to shed the crop to the sides and to avoid trapping and pushing the crop forwardly.

While this is the optimum arrangement, a practical construction may have a straight line across the apex with a transverse width which is much less than the conventional 0.6 inches and is typically less than 0.25 inches.

Thus each knife blade has a front point portion in front of the beveled and serrated side cutting edges which front point portion has side edges converging to front apex, where the apex and the side edges of the front point portion are shaped and arranged such that crop material engaging the front point portion, as the point portion is moved forwardly in the crop, is shed to one or other side of the front point portion for cutting by the side cutting edges and is not pushed forwardly by the front point portion.

Preferably the beveled side sedges are serrated in a direction at right angles to a forward direction.

Preferably the pointed portion has a thickness at the apex equal to that of the blade.

Preferably the beveled edges are reduced in width at as they approach the pointed portion leaving a strip of the upper surface between the beveled edges having thickness equal to that of the blade with side edges of the strip being parallel to the center line of the blade.

Preferably at this strip the beveled edges become narrower as the beveled edge approaches the front pointed portion of the blade.

Preferably the beveled edges and the serrations therein terminate at a position spaced from the apex of the pointed portion such that the front pointed portion forms an arrowhead shape in front of a forwardmost one of the serrations with the width of the front pointed portion being substantially equal to the width of the side edges at the forwardmost one of the serrations.

Preferably a center line spacing between each knife blade and the next is less than 3.0 inches, preferably less than 2.5 inches and more preferably of the order of or equal to 2.0 inches.

Preferably a length of each knife blade from the trash bar to a forward most tip of the knife blade is greater than 2.0 inches, preferably greater than 2.5 inches and more preferably greater than 2.75 inches.

Preferably the front point portion has side edges which are not sharpened.

Preferably the radius of curvature of the front pointed portion at the apex is less than 0.5 inch and more preferably less than 0.25 inch.

Blade Shape

The characteristics of the blade defined above where it is much narrower than conventional, 2.0 inches as opposed to 3.0 inches, and significantly longer, 2.5 to 2.75 inches as opposed to 2.2 inches places considerable limitations on the shape and arrangement of the beveled and serrated edges.

In order to form the pointed portion at the front edge in front of the beveled edges, the beveled edges are reduced in width as they approach the front edge leaving a strip of the upper surface between the beveled edges with side edges of the strip parallel to a center line of the blade. Thus at this strip the beveled edge becomes narrower and the grooves in the edge get shorter as the beveled edge approaches the front apex of the blade. The beveled edges and the serrations therein terminate at a position spaced from the front apex to define an arrow-head shaped pointed portion in front of the beveled edges which imparts sufficient strength to the construction to allow the formation of the serrations. The thickness of the blade through the main body of the blade excluding the beveled edges is constant so that the pointed portion and the apex have the same thickness as the rest of the main body of the blade and the bevel which reduces the thickness does not extend to the apex.

Width of Guard Cutting Edge

The cutting efficiency and therefore stubble length are also affected by the width of the cutting edge of the knife guard. Generally, the width at the rear of the cutting edge on the guard is in the order of 25 mm (1.0 in). In the arrangement of the present invention that width is substantially increased. Thus the width of each guard at a position thereon aligned with the rear end of the cutting edge of each blade is greater than 1.0 inches. The maximum width of the guard is slightly less than the center to center spacing of the blades since it is necessary to leave a gap between the guards at the back to prevent pinching the crop and to allow the crop to reach the back for the rearmost cutting action. Thus with a blade center to center spacing of 2.0 inches the width of the guard is slightly less than that of the width of the blade or roughly 1.9 inches. Thus with a blade of this width, the width of the guards can be as much as 1.9 inches and preferably lies in the range 1.2 to 1.9 inches. However where the blade is greater than 2.0 inches in width, the guard has a width which is between 0.5 and 0.1 inches less than the width of the blade.

Thus the arrangement provided herein provides a center line spacing between each guard finger and the next which is less than 3.0 inches and more preferably 2.0 inch where a width of each guard at the rear trash bar is greater than 1.5 inches and preferably 1.75 inches.

Thus a width of each guard at the rear trash bar is equal to the maximum width which can be obtained while leaving a space at the trash bar between the ledger surfaces of the order of 0.5 inch or the distance necessary to avoid pinching of crop stalks between the ledger surfaces.

Preferably the stroke length is equal to the center line spacing between the knife blades.

Preferably, at the position in the stroke where the center line of the knife blades is aligned with the center line of the guard fingers, the side cutting edges of the knife blades substantially directly overlie the side edges of the ledger surface.

Preferably each knife blade has a front point portion in front of the side cutting edges which front point portion has side edges converging to front apex, where the apex and the side edges of the front point portion are shaped and arranged such that crop material engaging the front point portion, as the point portion is moved forwardly in the crop, is shed to one or other side of the front point portion for cutting by the side cutting edges and is not pushed forwardly by the front point portion.

Cutting Efficiency:

Of course ground speed can be increased if the operator has no regard for cutting effectiveness and the quality of the cut crop. This is of course unacceptable.

One measure of cutting effectiveness is that of the length of stubble which remains on the ground. If the cutting blades run at a nominal height from the ground then they will theoretically cut all crop to a nominal length equal to the height of the blade from the ground. However this does not occur as the sickle knife moves forwardly since not all crop is cut immediately as it enters the cutting system. As some cutting is delayed and the crop pushed forwardly by engagement with elements of the cutting system to bend over from the normal upstanding position, then some stubble will have a length exceeding the nominal length and this length difference will increase as the ground speed increases. Thus cutting effectiveness can be measured by detecting and measuring the average length difference of stubble which exceeds this nominal length.

An acceptable effectiveness is defined where the average stubble length difference, that is the average length beyond the minimum or nominal length defined by the distance of the blades from the ground, is less than 1.0 inches, as measured at a set speed of 10 mph. Thus for example where the nominal height is a typical 1.5 inches, an acceptable effectiveness is where a measured average length is no greater than 2.5 inches.

Of course machines can run at different speeds and there is no intention herein to limit the speed to a particular value. However as the stubble length is of course speed dependent, it is necessary, in order to analyze the system, to set a predetermined value at which the stubble length is measured.

Of course in a practical situation there may be failures in proper cutting action leaving some crop stalks greater than the allowed length difference defined above. However discarding such discernible failures in the cutting action which are due to cutting errors and are not a measure of the actual efficiency of the proper cutting, a proper efficiency is defined by the average stubble length as set forth above.

Thus the best measure of cutting effectiveness is the stubble length that is left after cutting. The requirement however will vary depending on the crop. For example for a wheat crop, it will not be critical that a short stubble length be maintained, as the heads are generally high on the plant.

In the case of hay (alfalfa) it will be important that a fairly short stubble length is maintained so that a significant quantity of crop is not left in the field. A typical acceptable total average stubble length in this case would be in the area of 2.75 inches (that is 1.25 inches longer than the nominal minimum length). Thus the ground speed can typically exceed the 10 mph value set above for the above analysis and may be as high as or higher than 14 mph.

In the case of soybeans, the acceptable average stubble length depends on the general height of the lowest bean pod on the plants. The acceptable average stubble length thus varies from about 2 to 2.5 inches or 0.5 to 1.0 inches greater than the nominal value. In this case a speed of less than 10 mph is likely to be desirable.

The guard fingers, knife blades and the trash bar are arranged so as to provide a cutting action on the crop in which:
  in a first cutting stroke, each knife blade moves across from one guard finger to the next in a first direction so as to cut crop located on said first side of the knife blade between the first cutting edge of the knife blade and the next guard finger by the shearing action while leaving uncut crop located on the second side of the knife blade;
  and, in a second cutting stroke, each knife blade moves across from the next guard finger to said one guard finger in a second direction so as to cut crop located on the second side of the knife blade between the second cutting edge of the knife blade and said one guard finger by the shearing action, including said uncut crop, while leaving uncut crop located on the second side of the knife blade.

While this crop remains upstanding before it is cut, the stubble length remains at the nominal value. However as soon as the crop is pushed forwardly by a non-cutting surface or a cutting surface which is not in a cutting action at that position in the stroke, it begins to bend over and its length when it is cut is increased from the nominal value by the distance the crop is bent forwardly.

The guard fingers, knife blades and the trash bar are shaped and arranged therefore to provide a percentage cutting inefficiency of less than 35%, 30% or 25%, at the above set speed of 10 mph and at a sickle stroke rate set at a value which provides inertia values equal to those obtained by a three inch stroke at 750 rpm,
  where percentage cutting inefficiency is calculated as follows:
    within a rectangular area defined by the length of the knife stroke and the ground distance traveled during one knife cycle, the sum of any areas of crop in which the crop remains uncut until it reaches an element of the cutting system by which the crop is pushed forward, without cutting, by contact with the element as the element moves forward;
    divided by:
    the rectangular area defined by the length of the knife stroke and the ground distance traveled during one knife cycle.

Thus in a first cutting stroke, there is an area of crop located on the second side of each knife blade in which the crop is gathered by contact with the guard fingers and trash bar as the guard fingers and trash bar move forward while the knife blade is cutting on said first side of said knife blade. Symmetrically in a second cutting stroke, there is an area of crop located on the first side of each knife blade that is gathered by contact with the guard fingers and trash bar as the guard fingers and trash bar move forward while the knife blade is cutting on said second side of said knife blade.

The elements which can engage and push the crop while not cutting the crop as the blade moves away from those elements include the trash bar and the serrated edge of the blade on the understanding that crop cannot slide along the serrated blade but instead will remain at a particular serration and be pushed forward by the blade at that location until the return stroke cuts the crop.

There is in many prior art arrangements an area that is generated by any crop which is pushed forward by contact with a front edge of the knife blade. In the present invention the blade is of a shape to shed the crop thus reducing this significant inefficiency.

The definition of inefficiency can also be applied at different ground speeds wherein the percentage cutting inefficiency can calculated at 6 mph and at a sickle stroke rate set at a value which provides inertia values equal to those obtained by a three inch stroke at 600 rpm, is less than 30%; or the percentage cutting inefficiency can be calculated at 10 mph and at a sickle stroke rate set at a value which provides inertia values equal to those obtained by a three inch stroke at 750 rpm, is less than 35%; or the percentage cutting inefficiency can be calculated at 14 mph and at a sickle stroke rate set at a value which provides inertia values equal to those obtained by a three inch stroke at 900 rpm, is less than 40%.

The reason for identifying the theoretical calculated efficiency at three different speeds of 6, 10 and 14 mph is that different machines can be designed and arranged to travel at different speeds.

Thus for example a 40 foot header used as a straight cut header for a combine can have a sickle knife length of 40 feet and can be designed to travel in the range 2 to 8 mph so that using a pre-set speed of 6 mph and a stroke rate of 600 rpm falls reasonably in the range of a machine of this type.

The present invention sets out that, at the pre-set speed and pre-set stroke rate, the shape and arrangement of the cutting system is such that it obtains the stated inefficiency. Of course, at different speeds and stroke rates, the same cutting system will have different inefficiencies, but in order to determine whether a cutting system provides the inefficiency of the present invention, pre-set parameters must be determined to allow the calculation to be carried out.

Thus as another example, at 14 mph the machine concerned can be of the type for cutting hay or forage crops and will have a header of for example 20 feet in width with two 10 foot sickle knives.

At 10 mph the machine has intermediate characteristics. The pre-set characteristics used therefore are set forth as alternative to determine the actual theoretical calculated inefficiency of the cutting system of a machine and the calculation can be carried out at those pre-set characteristics selected from the above different examples which best match the range of operation of the machine concerned.

As defined in the figures hereinafter, the sickle stroke rate for a 4.0 inch stroke, which provides inertia values equal to those obtained by a 3.0 inch stroke at 750 rpm, is 650 rpm and the sickle stroke rate for a 2.0 inch stroke, which provides inertia values equal to those obtained by a 3.0 inch stroke at 750 rpm, is 918 rpm.

The pre-set parameters for the inefficiency calculation are set out in the table shown in FIG. 43 hereinafter.

In order to achieve the above decrease in cutting inefficiency, the following characteristics are preferably to be selected, although other characteristics may when analyzed provide the same level of inefficiency:
  a center line spacing between each knife blade and the next which is less than 3.0 inches and preferably of the order of 2.0 inches.
  a length of each knife blade from the trash bar to a forward-most tip of the knife blade which is greater than 2.0 inches and preferably of the order of 2.75 inches.

a width of each guard at the rear trash bar which is greater than 1.0 inches and preferably, for a guard spacing center to center of 2.0 inches of the order of 1.75 inches. That is the width of each guard at the rear trash bar is equal to the maximum width which can be obtained while leaving a space at the trash bar between the ledger surfaces of the order of 0.5 inch or the distance necessary to avoid pinching of crop stalks between the ledger surfaces.

Preferably the stroke length is equal to the center line spacing between the knife blades.

Preferably at the position in the stroke where the center line of the knife blades is aligned with the center line of the guard fingers, the side cutting edges of the knife blades substantially directly overlie the side edges of the ledger surface.

Preferably each knife blade has a front point portion in front of the side cutting edges which front point portion has side edges converging to front apex, where the apex and the side edges of the front point portion are shaped and arranged such that crop material engaging the front point portion, as the point portion is moved forwardly in the crop, is shed to one or other side of the front point portion for cutting by the side cutting edges and is not pushed forwardly by the front point portion.

Preferably the front point portion has side edges which are not sharpened.

BRIEF DESCRIPTION OF THE DRAWINGS

FIG. 3 is top plan view of a knife blade for use in the sickle knife of FIG. 1.

FIG. 4 is a side elevational view along of the knife blade of FIG. 3.

FIGS. 9 to 11 and 20 each comprise a schematic illustration showing movement of a header through a standing crop and illustrating the cutting actions as a single cutting blade and the guards associated therewith move forwardly and illustrating the cutting inefficiencies of the system, where:

FIG. 13A shows a guard and cutting blade of the PRIOR ART operating at 6 mph and 520 rpm.

FIGS. 21 to 40 are tables showing the cutting analyses of FIGS. 16A, 16C, 16E, 16G, 17A, 17C, 17E, 17G, 18A, 18C, 18E, 18G, 19A, 19C, 19E, 19G, 20A, 120C, 20E and 20G respectively.

FIGS. 41 and 42 are tables forming an overall analysis of stubble lengths for the prior art systems of FIGS. 16, 17 and 20 and the system according to the present invention of FIGS. 18 and 19.

FIG. 43 is a table showing the set stroke rate in rpm to be used in the calculation of inefficiency for different speeds and stroke length.

DETAILED DESCRIPTION

Figure 1:
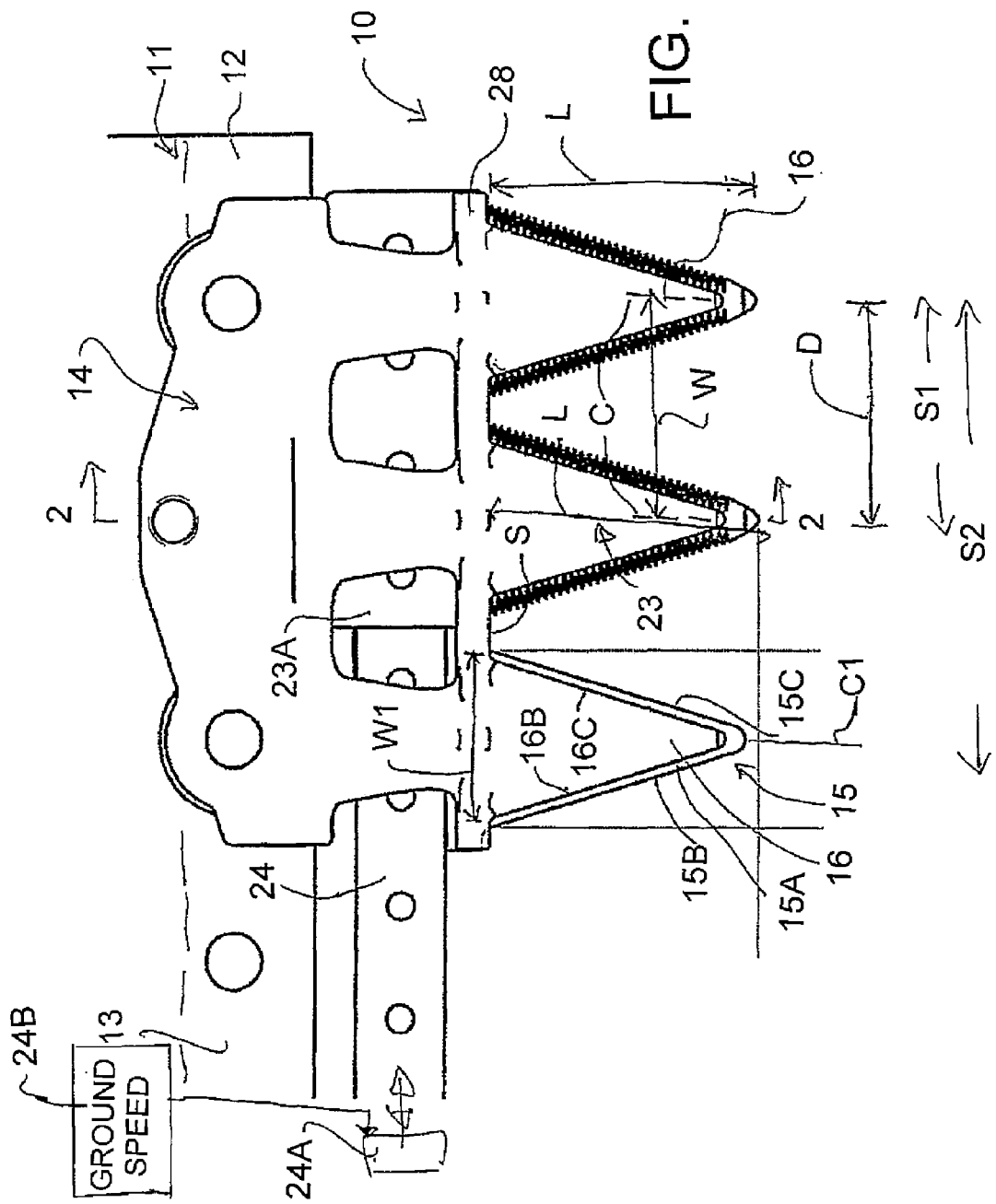
FIG. 1 is a top plan view of a part of header showing a portion of the sickle knife according to a first embodiment of the present invention using a stub guard.
Figure 2:
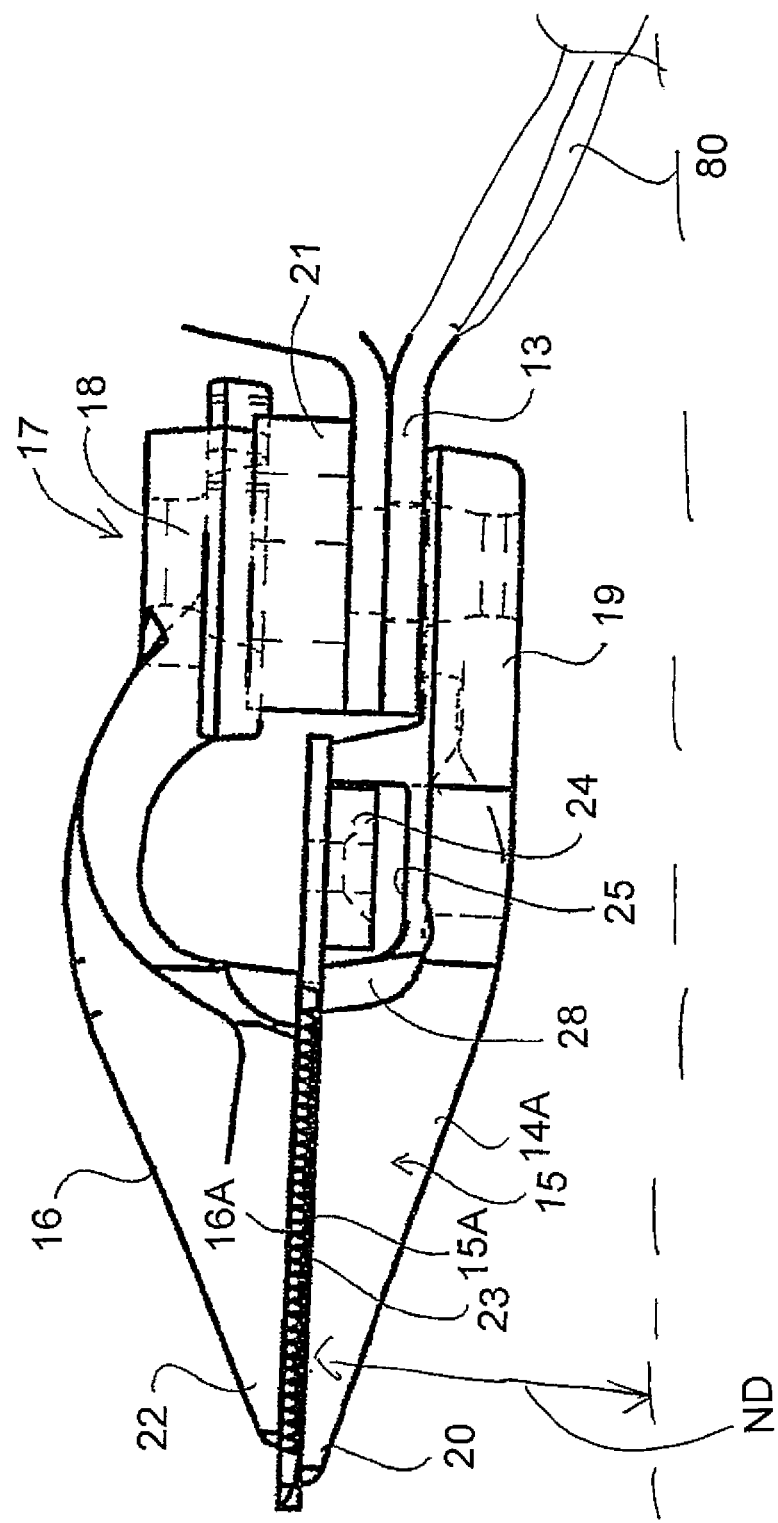
FIG. 2 is a cross-sectional view along the lines 2-2 of FIG. 1.

In FIGS. 1 and 2 is shown a first embodiment of a crop cutting device generally indicated at 10. Only a part of the complete machine is shown since the remainder of the machine may vary widely depending upon requirements and since the construction is of course well known to a person skilled in the art. In this embodiment as shown, there is a frame generally indicated at 11 which forms only one part of the total frame structure that is the part of the frame that is relevant to the present invention.

The cutting device 10 further includes a cutter bar 12 attached to the frame structure 11. Thus the frame structure 11 in the part as shown comprises a guard bar 13 to which is attached a plurality of knife guards 14. The guard bar 13 is attached to the frame structure which supports the guard bar in fixed position across the front edge of the frame for a cutting action of the crop cutting device on the standing crop.

Each knife guard 14 includes one or more guard fingers 14A so that guards can be arranged with a single finger, pair of fingers or triples. As shown the guard bar forms a triple guard construction with three fingers where a series of such guards are mounted on the guard bar 13 at spaced positions along the length of the guard bar. In the embodiment as shown, only one of the guards is shown but it will be appreciated that there are additional guards as required to provide a crop cutting device of a required width.

The knife guards shown in FIGS. 1 and 2 are basically of a conventional construction of a stub guard in that each guard finger 14A includes a lower portion 15 and an upper portion 16. These two portions are mounted on the is guard bar 13 by a mounting arrangement 17 including bolts 18. The mounting arrangement thus attaches a rear end 19 of the lower portion 15 rigidly on the underside of the bar 13 so that the fingers of the guard project forwardly from the bar to a front nose 20. Similarly the upper portion 16 is mounted on the guard bar 13 by an adjustment plate 21 attached onto the same bolts 18. Upper portion 16 has fingers which extend forwardly to a nose 22.

In the embodiment shown the guards are stub guards so that the noses 20, 22 of the upper and lower portions substantially overlie one another and confine between them the blades 23 of the sickle bar or knife back 24.

Each pair of guards thus includes two guard elements each defined by an upper portion and a lower portion and the guard elements are shown in FIG. 1 at 15 and 16. A front crop guide bar or trash bar 28 is also provided. Between the mounting bar 21 and the front guide bar 28 is provided a channel 25 within which the sickle bar or knife back 24 is mounted for reciprocating movement.

The trash bar may form a continuous bar member extending along the lower guard portion 15 in front of the bar 24 to prevent any crop reaching that area. However the trash bar may be formed by any part of the system which prevents the crop from moving rearwardly beyond the rear end of the cutting edges of the blades.

There may be a single sickle bar driven from one end or in some cases there are two sickle bars driven from opposite ends and meeting in the middle. The sickle bar or bars are driven by the reciprocating drive motor (not shown but conventional) such that the bar reciprocates back and forth.

In some cases the bar reciprocates by a distance S1 equal to the space between the nose of one guards 15, 16 and that of the next along the guard bar 13 so that the blades reciprocate from a position with the center line of the knife aligned with the center line of the first guard to a position aligned with the next and back to the first. In other cases, the reciprocation stroke may be as shown at S2 a multiple of, typically double, the distance between the guards so that the knife moves from a first guard finger across a second to a third and back to the first. This arrangement reduces the available reciprocation rate due to increased acceleration forces but reduces the number of reversals.

FIG. 43 shows the set stroke rate in rpm to be used in the calculation of inefficiency for different speeds and stroke length.

Each sickle bar comprises the support bar member 24 and the plurality of blades indicated at 23. As shown the blades are formed in pairs mounted on a common base as shown in FIG. 3, but individual blades may be provided or in some cases the blades may have more than two on the same base.

Each of the blades forms a generally triangular-shaped member which has a rear end or base 23A bolted to the bar and converges from the rear end to a front end 23B. Each of the blades has a top surface 23D and a bottom surface 23E. Each of the blades has a side edge 23F and a second side edge 23G. The sides edges are beveled from the top surface down to the bottom surface 23E so that a sharp edge is formed at the bottom surface at each of the side edges. The blades are also serrated at each cuffing edge with grooves 23L, 23M extending parallel to the bars 24 that is at right angles to a center line 23H.

The top member 16 acts to hold the blades downwardly into engagement with the top ledger surface 15A of the bottom portion 15. The bottom portion 15 has two side edges of the ledger surface 15A as best shown in FIG. 2 with those side edges 15B and 15C acting as side edges of the ledger surface 15A. Thus the cutting action of the blades occurs between the ledger 15A and the bottom surface 23E of the blade as the blade reciprocates from its position at one of the guards to its position at the next adjacent one of the guards. In this cutting action, therefore, the side edge of the blade moves across the space between the guards and enters onto the ledger surface of the next guard in a cutting action between the bottom surface of the blade and the top surface of the guard which are immediately adjacent and generally in contact or at least closely adjacent to provide a shearing action on the crop.

In these guards, the upper portion 16 acts merely as a hold down member contacting the upper surface of each of the blades so as to prevent it from moving away from the ledger surface 15A by applying pressure to that upper surface 23D of the blade and holding the blade in contact with or closely adjacent the ledger surface 15A of the bottom portion where the cutting action occurs. The upper portion 16 therefore as shown in FIG. 1 has side surfaces 16B and 16C of the bottom surface 16A which is narrower than the ledger surface 15A of the bottom portion 15.

The mounting and adjustment arrangements for the bottom portion 15 and the upper portion 16 can vary in accordance with a number of different designs readily available to a person skilled in the art. It suffice to say that the hold down portion 16 is adjustable so that the gap between the bottom surface of the hold down portion and the ledger surface of the bottom portion 15 can be adjusted to allow the sliding action of the blades while holding the blades in the required position.

The disclosures of the following documents of the present Applicants are incorporated herein by reference or may be referred to for details of the construction not provided herein. These show various conventional details of the sickle knife system which can be used in the arrangement herein but are not described as they are known to persons skilled in the art.

U.S. Pat. No. 7,328,565 (Snider) issued Feb. 12, 2008;
U.S. Pat. No. 4,894,979 (Lohrentz) issued Jan. 23, 1990
U.S. Pat. No. 4,909,026 (Molzahn) issued Mar. 20, 1990.
U.S. Pat. No. 6,962,040 (Talbot) issued Nov. 8, 2005.
U.S. application Ser. No. 13/680,557 filed Nov. 19, 2012 based on a Provisional application 61/577,427 filed Dec. 19, 2011 (Talbot) relating to an adjustable hold down.

In FIG. 1, a drive for knife bar 24 is indicated schematically at 24A. This can comprise any suitable drive system known to persons skilled in this art of a type which can generate a stroke S1 of 2 inches at a drive rate of typically 918 rpm. The system can also be arranged in an alternative embodiment to drive the stroke S2 of 4 inches in which case the reciprocation rate may be lower. The drive system 24A includes an input from a ground speed indicator 24B which allows automatic adjusting of the stroke rate of the drive system 24A in dependence on ground speed. As the system herein provides a cutting efficiency which is higher than that of previous designs and suitable for cutting at speeds as much as 14 mph, it is possible when running at lower ground speeds such as less than 10 mph to reduce the drive rate of the knife since the maximum cutting effect is not required at those lower ground speeds. Thus the system can be arranged to automatically control the knife speed to a lower fixed value when the ground speed is less than a predetermined set value or to provide a proportional control of the drive speed.

The knife blade 23 is narrower than conventional system so that typically the width W is equal to the stroke length which is approximately 2.0 inches center C to center C while providing a blade which has a length L greater than conventional system so that the length from the trash bar 28 to the tip 23K is greater than 2.0 inches and typically of the order of or greater than 2.75 inches.

This can be further combined with an arrangement in which the width W1 of the guard ledger surface at the trash bar 28 is increased so that the width W1 of each guard at the rear trash bar is equal to the maximum width which can be obtained while leaving a space S at the trash bar between the ledger surfaces of the order of 0.5 inch or the distance necessary to avoid pinching of crop stalks between the ledger surfaces.

Typically each of the knife blades is generally triangular in shape with straight side edges 23F, 23G. However other shapes of the side edges 23F, 23G in plan such as convex or concave can be used. Thus the side edges 23F, 23G converge to the front apex 23K at an angle of the order of 60 degrees to the direction of reciprocating movement. The two converging side cutting edges 23F, 23G are beveled from the upper surface 23D to the bottom cutting surface 23E to cooperate with the shearing edges of the knife guards. In addition the beveled side edges are serrated with grooves 23L, 23M running in a direction longitudinal to the reciprocating direction. In order to maximize the cutting action, the length of the cutting edge is substantially the maximum length extending from the trash bar 28 at the rear to a position close to the front apex 23K of the blade.

In this new arrangement, the conventional fore-aft length of the blade is increased substantially. Thus the length of cutting edge of each sickle blade from a rearmost end of the cutting action at the trash bar 28, or to the rear of the shearing action on the ledger surfaces 15A, to the front apex 23K of the blade in the present invention is greater than 1.75 inches. This can lie in the range 2.2 to 3.0 inches.

The cutting efficiency and therefore stubble length are also affected by the width of the cutting edge of the knife guard. In the arrangement of the present invention that width is substantially increased. Thus the width W1 of each guard at the trash bar 28 is greater than 1.0 inches. The maximum width of the guard is slightly less than the center to center spacing of the blades since it is necessary to leave the gap S between the guards at the back to prevent pinching the crop and to allow the crop to reach the back for the rearmost cutting action. Thus with a blade center to center spacing of 2.0 inches the width W1 of the guard is slightly less than that of the width of the blade or roughly 1.9 inches. Thus with a blade of this width, the width of the guards can be as much as 1.9 inches and preferably lies in the range 1.2 to 1.9 inches. However where the blade is greater than 2.0 inches in width, the guard has a width which is between 0.5 and 0.1 inches less than the width of the blade.

At the position in the stroke shown in FIG. 1 where the center line C of the knife blades is aligned with the center line C1 of the guard fingers, the side cutting edges of the knife blades 23F, 23G substantially directly overlie the side edges 15B, 15C of the ledger surface 15A.

Each knife blade has a front point portion 23X in front of the side cutting edges 23F, 23G which front point portion has side edges 23N, 23P converging to the front apex 23K, where the apex and the side edges of the front point portion 23X are shaped and arranged such that crop material engaging the front point portion, as the point portion is moved forwardly in the crop, is shed to one or other side of the front point portion for cutting by the side cutting edges and is not pushed forwardly by the front point portion 23X.

Figure 5:
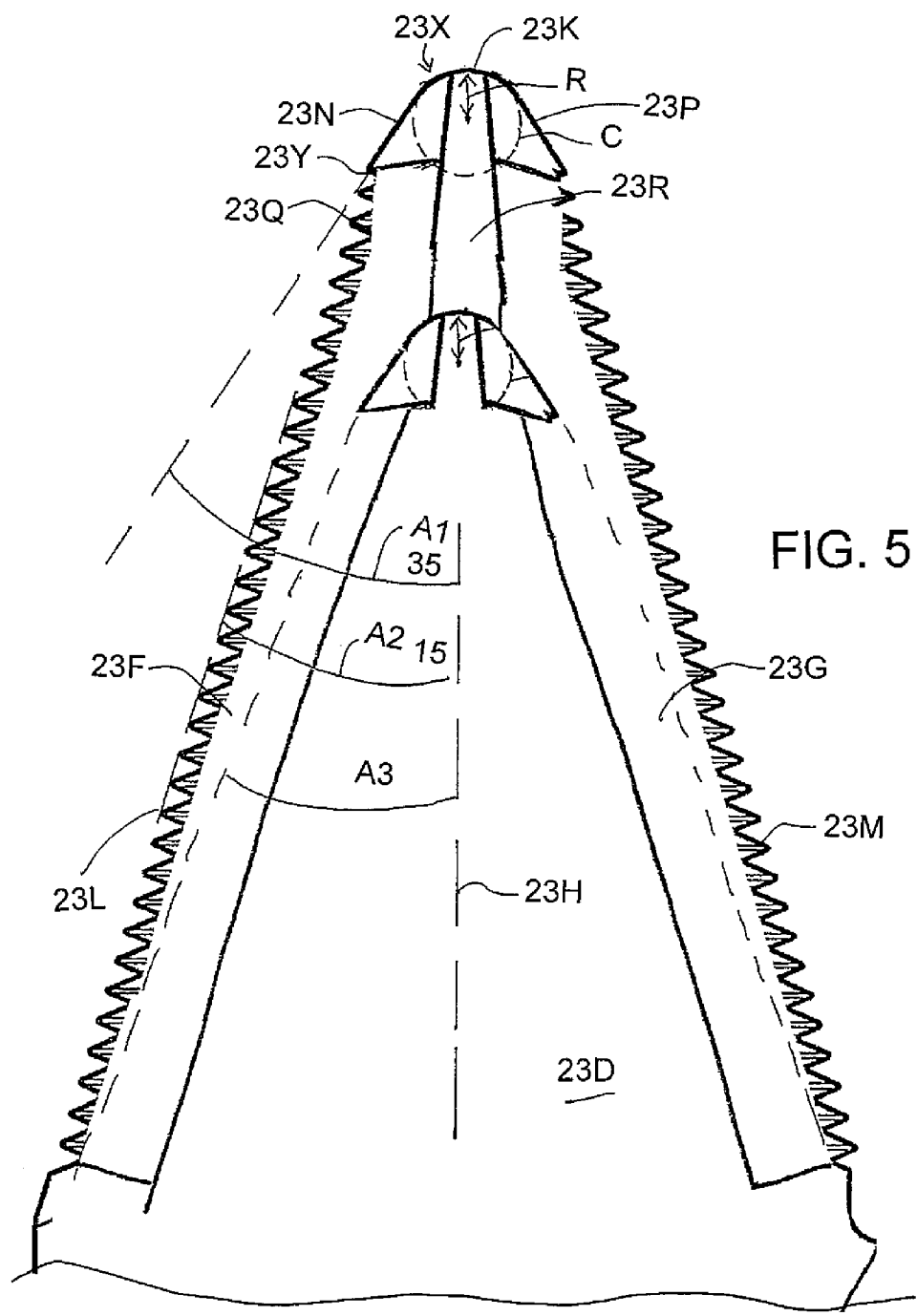
FIG. 5 is top plan view of one knife blade of FIG. 3 on an enlarged scale showing the angles of the side edges for different length blades.

As shown in FIGS. 3, 4 and 5, the arrow head shaped front point portion 23X has side edges 23N, 23P which are not sharpened. The angle of the bevel of the sides 23F and 23G may extend partly into the side edges 23N and 23P but the side edges 23N and 23P are not beveled to the bottom surface 23E so that they are not sharp. Also the last serration 23Y of the bevel edges 23F and 23G is located at the bottom of the portion 23X so that the side edges 23N and 23P are not serrated. The pointed portion 23X has a thickness at the apex 23K equal to that of the blade so that as shown in FIG. 4B, the thickness along the center line remains constant right up to the apex 23K. The arrangement is designed so that the front portion 23X is as thick as possible over its full extent consistent with the requirement to machine the blade to form the beveled and serrated edges 23F, 23G. Thus the beveled side edges 23N and 23P are reduced in width in plan view at as they approach the pointed portion 23X leaving a strip 23R of the upper surface between the beveled edges having thickness equal to that of the blade with side edges 23Q of the strip being parallel to the center line 23H of the blade. Thus, at this strip 23R, the beveled side edges 23N and 23P become narrower as the beveled side edges 23N and 23P approach the front pointed portion 23X of the blade.

The beveled side edges 23N and 23P and the serrations 23L therein terminate at the position 23Y spaced from the apex 23K of the pointed portion 23X such that the front pointed portion 23X forms an arrow-head shape in front of a forwardmost one 23Y of the serrations with the width of the front pointed portion 23X being substantially equal to the width of the side edges 23N and 23P at the forwardmost one 23Y of the serrations.

Figure 6:
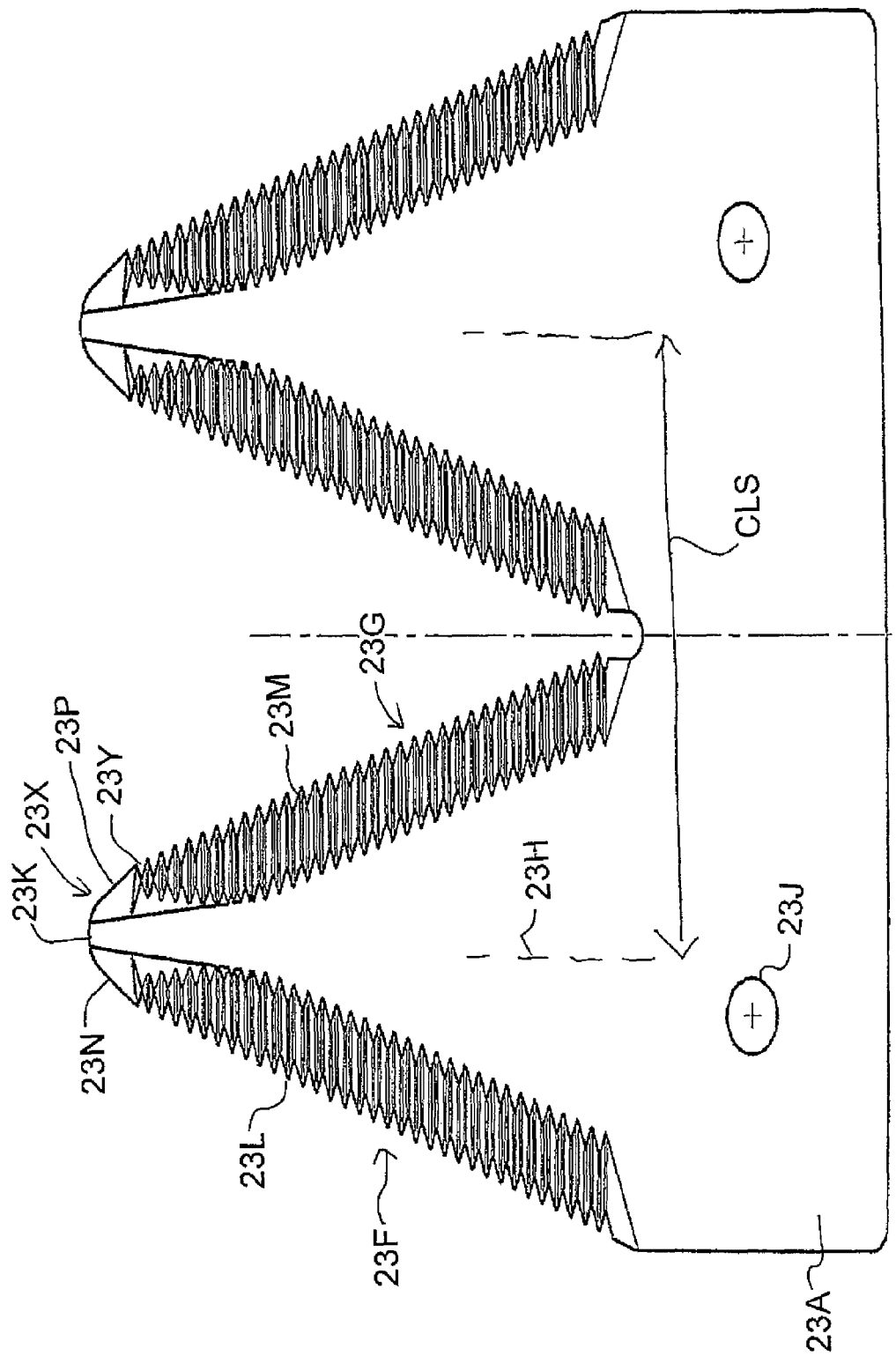
FIG. 6 is top plan view of a knife blade of the type of FIG. 3 showing a different width blade.

As shown in FIGS. 3 and 4, a center line spacing CLS between each knife blade and the next is less than the conventional value of 3.0 inches and preferably of the order of or equal to 2.0 inches. It will be appreciated that a measurement of center to center spacing which is equal to an integral number of inches is preferred for engineering reasons but in theory it is not essential to have an integral number and in some cases the spacing can be in millimeters. In practice, a spacing in the range 2.5 to 1.5 inches is suitable. In FIG. 6 (not to scale) a wider spacing of 2.5 inches is shown. In FIG. 5 the angles of different lengths of blade are shown where a blade having a length of at least 2.5 inches from the trash bar is shown having an angle A2 of the side edges and a shorter blade having a length of the order of 2.0 inches from the rash bar has angles A3. In each case the angles of the side edges 23N and 23P is slightly greater than that of the cutting edges.

As shown in FIGS. 3 and 4, a length L along the center line 23H of each knife blade from the trash bar that is the rearmost end 23T of the cutting edge 23F to the forwardmost tip 23K of the knife blade is substantially equal to or greater than 2.75 inches. Improvement in cutting efficiency is obtained by increasing the length of the blade so that the selection of a value of at least 2.75 inches is preferred which provides the improved cutting action while avoiding a blade which has a length greater than can be manufactured to remain stiff and straight in the cutting action without danger of bending. Improvement can be obtained at any value greater than conventional blades so that any value greater than 2.0 inches is within the invention herein. A length greater than 2.5 inches will provide a significant improvement.

In order to provide shedding of crop at the apex, the radius of curvature of the front pointed portion at the apex is less than 0.5 inch and preferably less than 0.25 inches. However a blunt front edge is possible provided it is sufficiently narrow and a value of less than 0.25 inch or more preferably less than 0.125 inch is possible.

The above geometry provides a construction in which the side edges of the blade are arranged relative to a center line of the blade at an angle less than 30 degrees and preferably less than 25 degrees.

Similarly the side edges of the front portion, which are typically but not necessarily at the same angle as the side edges of the blade, are arranged relative to a center line of the blade at an angle less than 30 degrees and preferably less than 25 degrees. In practice this angle is preferably of the order of 20 degrees.

Thus the preferred construction provides a center line spacing between each knife blade and the next is of the order of or equal to 2.0 inches, the radius of curvature of the front pointed portion at the apex is less than 0.25 inch and the side edges of the front portion are arranged relative to a center line of the blade at an angle of the order of 20 degrees.

As shown in FIG. 1, the width between the centers of the guards is indicated at D. This can be the same as the length of the cutting stroke so that the blades move from a position aligned with the center line of one guard finger to that of the next. However in some embodiments the stroke may be a multiple of the distance D, typically twice, so that the blades move from the first guard finger to the third crossing the second. The reversal of the reciprocating action at the guard center line ensure that the blades are stationary and therefore carrying out no cutting when they are overlying the guard and not at an intermediate location. The increase of the stroke length to a multiple of the finger reduces the number of times the blades are stationary but requires a reduced stroke rate due to the increased forces on the drives system.

This distance D is less than 3.0 inches and is more preferably of the order of 2.0 inches. Typically the stroke can lie in the range 1.5 to 2.5 inches since this provides a stroke length which allows an increase in the cutting reciprocation rate of the sickle bar by a percentage of the order of 22%. This allows a typical rate of 600 cycles per minute, suitable for a 40 ft sickle bar, to be increased a rate greater than 750. For shorter bars this rate can be greater than 900. The length of the stroke and the rate are determined by the selected geometry of the drive system.

Typically each of the knife blades 23, as shown in FIG. 2, is generally triangular in shape. In the example shown, the blade 23 forms a double blade connected by a base 23A. The base has holes 23J for mounting on the blade drive bar 24. The blade 23 has two side edges 23F, 23G which converge at an angle A to the direction of reciprocating movement. At the front of the blade is provided a front apex 23K of a front arrow head shaped portion 23X.

The blade has a bottom cutting surface 23E for passing across the ledger surface 15A of the bottom knife guards 15 and an opposed or upper surface 23D. The two converging side cutting edges 23F, 23G are beveled from the upper surface 23D to the bottom cutting surface 23E to cooperate with the shearing edges of the knife guards. In addition the beveled side edges 23F, 23G are typically serrated with grooves 23L, 23M running in a direction longitudinal to the reciprocating direction. In order to maximize the cutting action, the length of the cutting edge is substantially the maximum length extending from the trash bar 28 or the rear edge 23T at the rear to a position at the front edge or tip 23K of the blade.

The fore-aft length of a blade has traditionally been in the order of 1.75 inches from the front of the trash bar to the tip of the section, or 2.2 inches from the front edge of the knife back to the tip of the section.

In this new arrangement, the fore-aft length L of the blade is increased substantially. Thus the length of the cutting edges of each sickle blade or blade is greater than 2.2 inches. This can be as much as 2.6 inches and can lie in the range 2.2 to 3.0 inches.

This also reduces the angle A of inward inclination of the cutting edge from the typical 30 degrees relative to the center line (an equilateral triangle) to an angle less than 30 degrees and typically of the order of 15 degrees and in the range 15 to 30 degrees.

It is common practice for sickle blades to have the front edge as a transverse straight edge in the order of 0.6 inches wide. The wide tip has the potential for running down crop, thus leaving long uncut stems. In the present invention the blade is designed with a pointed tip or front apex 23K, thus eliminating the problem.

The intention is therefore to provide a sickle blade which is as pointed at the front apex 23K as reasonably practical. A sharp point is difficult to obtain so that typically the front apex 23K is smoothly curved with a radius of curvature R of a curvature circle C less than 0.5 inches thus defining the front apex 23K which is sufficiently narrow to shed crop stalks to each side.

Each knife blade therefore has a front point portion in front of the cutting edges which has side edges 23N, 23P converging to front apex where the apex and the side edges are shaped and arranged such that crop material engaging the point portion as the point portion is moved forwardly in the crop is shed to one or other side of the point portion for cutting and is not pushed forwardly by the point portion.

While this is the optimum arrangement, a practical construction may have a transverse width of a straight line across the apex 23K which is much less than the conventional 0.7 inches and is typically less than 0.25 inches. This narrow front edge is selected to be sufficiently narrow so that crop is shed to either side and not pushed forwardly as the blade moves forwardly.

The side edges 23N and 23P are inclined outwardly and away from the apex at an angle A1 relative to the center line 23H of the order of 35 degrees and certainly less than 45 degrees to the center line 23H.

The characteristics of the blade defined above where it is much narrower than conventional and significantly longer places limitations on the shape and arrangement of the beveled and serrated edges 23F, 23G.

Thus the beveled edges 23F, 23G are reduced in width at 23Q as they approach the front edge pointed portion 23K at the apex 23X leaving a strip 23R of the upper surface between the beveled edges with parallel side edges of the strip 23R. Thus at this strip 23R the beveled edge 23F, 23G becomes narrower and the grooves 23L, 23M in the edge get shorter as the beveled edge approaches the front pointed portion 23X of the blade. The beveled edges 23F, 23G and the grooves 23L, 23M therein terminate at a position spaced from the front apex 23K to define the arrow head shaped portion 23X in front of the beveled edges which imparts sufficient strength to the construction to allow the formation of the serrations.

The cutting efficiency and therefore stubble length are also affected by the width of the cutting edge 15B, 15C of the ledger surface 15A of the knife guard 15. Generally, the width W1 between the edges 15B and 15C at the rear of the cutting edge on the guard in the arrangement of the present invention is substantially increased from the conventional width of the order of 1.0 inches. Thus the width W1 of each guard at a position thereon aligned with the rear end of the cutting edge of each blade is greater than 1.0 inches. The maximum width with a blade of 2.0 inches in width is slightly less than that of the width of the blade or roughly 1.9 inches. Thus with a blade of this width, the width of the guards can be as much as 1.9 inches and preferably lies in the range 1.2 to 1.9 inches. However where the blade is greater than 2.0 inches in width, the guard has a width which is between 0.5 and 0.1 inches less than the width of the blade. The bottom guard also tapers so that its edges 15B and 15C lie closely adjacent the edges of the blade when the blade and guard are in the aligned position at the end of a stroke. Thus the angle of convergence of the edges 15A and 15B matches closely the angle A. This leaves a space S at the rear of the guards 15 at the trash bar 28 to avoid pinching crop at this location. This space S generally should be greater than 0.4 inches and typically is of the order of 0.5 inches.

Thus the cutting system is carried so that it moves across the ground either closely in contact with the ground as shown or at a set cutting height. In both cases this determines a cutting height or nominal cutting distance from the ground with is the length of any crop stalk if cut efficiently and directly as it reaches the location between the blade and ledger surface. In FIG. 2, the cutter bar rests on the ground at a skid plate 80 which holds the ledger surface 15A at the height ND from the ground. Typically this is of the order of 1.5 inches but this can be varied slightly by changing the angle of the cutter bar about a transverse axis by changing the angle of the header.

Figure 7:
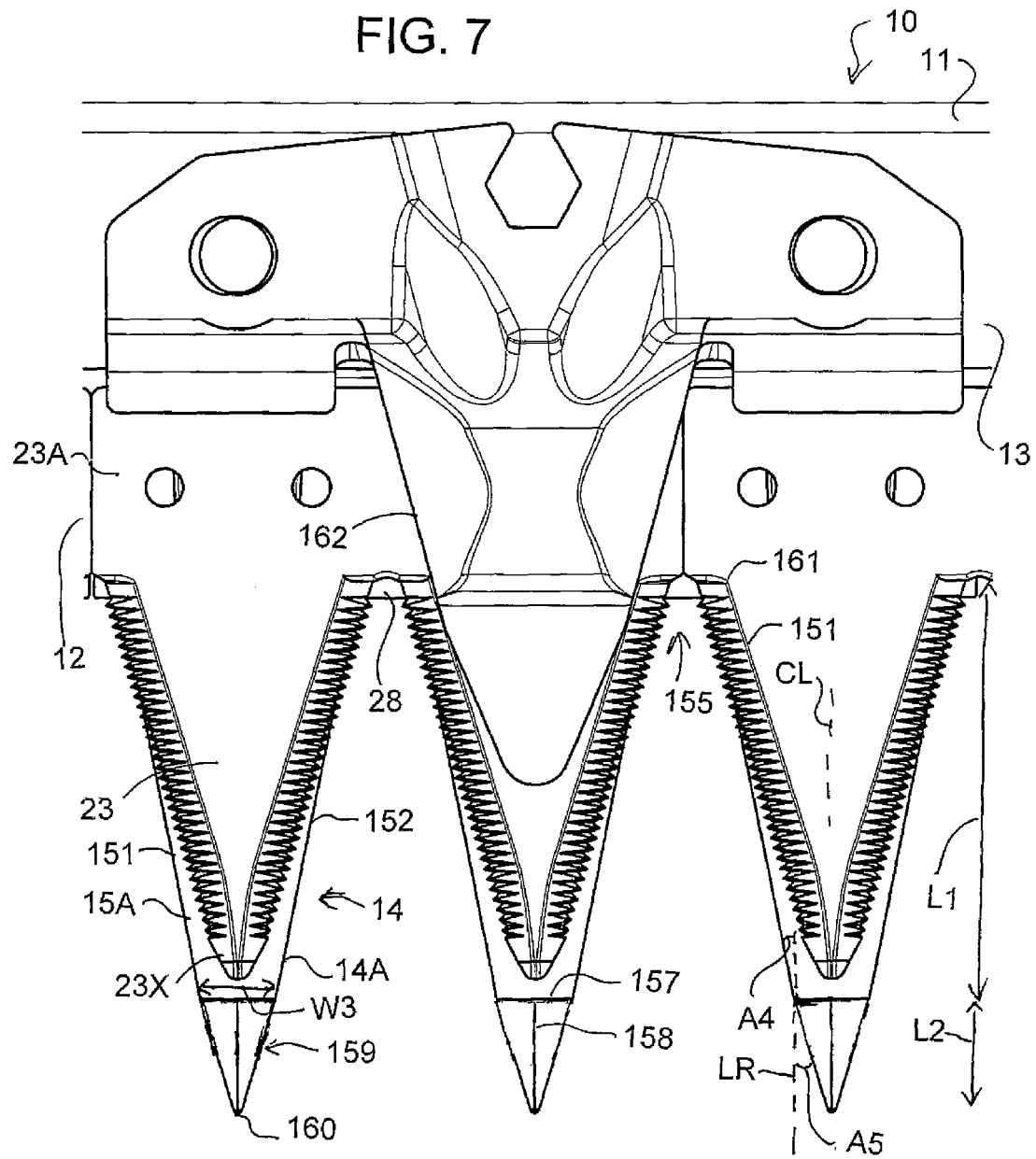
FIG. 7 is a top plan view of a part of header showing a blade of a sickle knife according to a second embodiment of the present invention using a pointed guard.
Figure 8:
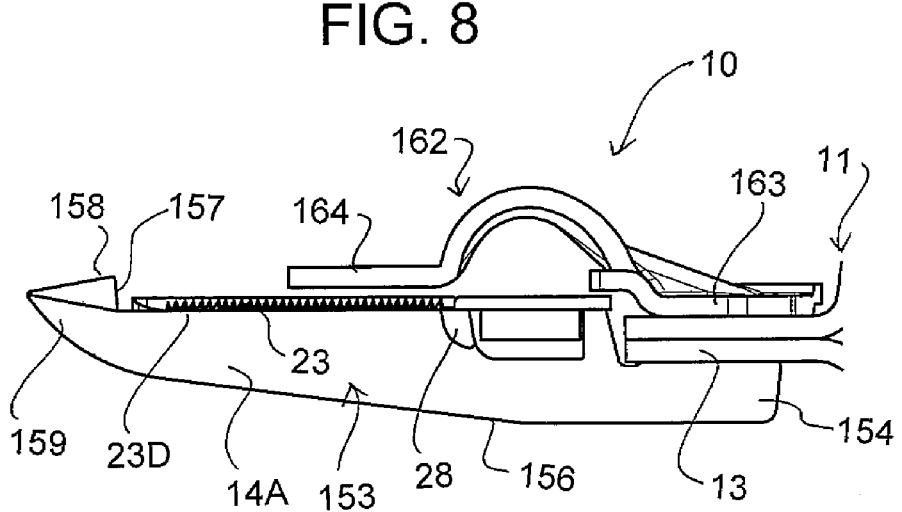
FIG. 8 is a cross-sectional view along the lines 8-8 of FIG. 7.

Turning now to FIGS. 7 and 8, the shape of the pointed guard for use in the present invention in conjunction with the pointed blade is shown and described in more detail as follows.

The knife guard 30 for use in a sickle cutting apparatus 10 includes the frame structure 11, guard bar 13, sickle bar 24 and knife blades 23 as previously described. Each the knife blades 23 has a cutting surface 23D for passing across the ledger surface 15A of the knife guards 151. Each of the knife blades has on first and second sides first and second side cutting edges as previously described to cooperate with shearing edges 152 of the guard guards 151.

The knife guard 151 includes a base portion 154 for mounting on the cutter bar 13, a rear trash bar 28 in front of the base portion 154 and at least one guard finger 153. In this embodiment three fingers 153 are arranged in a row, where the finger or fingers 153 are mounted on the base portion 154 so that the fingers are arranged in a row along the cutter bar with a space 155 between each finger and the next allowing crop to enter the space up to a position of engagement with the rear trash bar 28.

The guard fingers have the upwardly facing ledger surface 15A with opposed side edges arranged to provide first and second shearing edges. The guard fingers have a downwardly facing ground engaging surface 156 shaped and arranged to provide protection for stone engagement as the fingers slide over the ground. That is each finger has sufficient strength to avoid breakage when impacting stones and obstacles causing the cutter bar to rise if the impact is sufficient and extends over sufficient number of guard fingers to provide the lifting action. This shape of the ground engaging surface is well known to persons skilled in the art and includes a longitudinal rib which is generally triangular in cross-section on the underside of the upper part containing the ledger surface. The base of the rib thus forms an apex which runs over the ground to prevent upward forces from snapping the guard finger at the ledger surface.

An upstanding transverse shoulder 157 is provided at a front edge of the ledger surface 15A and extends upwardly to a top surface 158 of the finger where the shoulder terminates. Thus there is no tang of conventional shape, that is no portion of the guard extending rearwardly over the ledger surface 15A from the shoulder 158. Above the ledge surface therefore the knife blades are free from confinement by a conventional tang as used in a conventional pointed guard or by a cooperating upper guard finger of the type used in a stub guard as described above.

A tip portion 159 in front of the ledger surface extends forwardly from the shoulder 158 and defines a forwardmost generally pointed tip 160 for engaging crop in front of the ledger surface 15A.

A length L1 of the ledger surface 15A from the trash bar 28 to the shoulder 157 is greater than 2.0 inches or more preferably greater than 2.5 inches; and a length L2 of the tip portion 159 from the shoulder to the tip is less than 1.0 inch or more preferably less than or equal to 0.75 inches.

As defined previously, a center line spacing between each knife guard finger and the next is less than 3.0 inches and preferably of the order of 2.0 inches.

As defined previously, a width of each guard finger at the rear trash bar is greater than 1.0 inches and more preferably is greater than 1.5 inches or equal to the maximum width which can be obtained while leaving a space at the trash bar between the ledger surfaces in the range 0.25 to 0.5 inch or the distance necessary to avoid pinching of crop stalks between the ledger surfaces.

The side edges of the ledger surface 15A converge from the trash bar 28 to the shoulder 15 at an angle A4 greater than 10 degrees and preferably of the order of 12 degrees to a line LR at right angles to the trash bar or parallel to the center line CL. The angle A5 of the side edges at the shoulder increases so that the tip portion is shorter than would be the case if the angle A4 were continued up to the tip. However overall, it will be appreciated that a line joining the rear end 161 of the side edge 151 of the ledger surface 15A and the tip 160 converges at an angle greater than the 10 degrees of the side edge to a line at right angles to the trash bar.

As the side edges converge at a relatively rapid angle from the base to the tip, the ledger surface has a width W3 at the shoulder 157 of less than 0.75 inches and preferably of the order of 0.5 inches.

There is also provided a plurality of separate hold down members 162 arranged to engage the blades at every third spaced ones of the fingers. This has a base portion 163 mounted on the cutter bar 13 and a finger portion 164 extending over the ledger surface of one of the fingers 14A.

Cutting Stroke and Speed:

Generally the cutting speed can be increased as the speed of the sickle is increased. One limitation for the sickle speed is the stress that is induced in the sickle drive and the knife back from the inertia loads resulting from the acceleration of the sickle at the start of the stroke. These acceleration loads are proportional to the stroke length and to the square of the sickle speed.

Therefore for the same acceleration loads, if the stroke is decreased, the speed can be increased by an amount represented by the following formula:

stroke2=stroke1×rpm1^2/rpm2^2 or in terms or speed:

rpm2=(stroke1×rpm1^2/stroke2)^0.5

For example for a typical 35 ft header and a single sickle knife driven from one side, to achieve the same loads, if a sickle with a 3 inch stroke, is run at 750 rpm, a sickle with a 2 inch stroke can be run at 918 rpm for the same inertia loads.

This distance of the cutting stroke is less than 3.0 inches and is more preferably of the order of 2.0 inches. Typically the stroke can lie in the range 1.5 to 2.5 inches since this provides a stroke length which allows an increase in the cutting reciprocation rate of the sickle bar. This rate is preferably greater than 900. A range of 900 to 1200 rpm is particularly suitable depending on the length of the sickle.

Thus, the maximum sickle speed is affected by the length of the sickle assembly. Generally headers vary in width from 15 ft to 45 ft and are generally available in single knife drive for widths up to 40 ft. Therefore the length of the sickle can vary in length from 7.5 ft to 40 ft.

Where the maximum speed for a 40 ft single knife drive (SK) header with a 3.0 inch stroke might be set at 600 rpm, the maximum speed for 15 ft double knife drive (DK) header might be set at 950 rpm.

Therefore in the case of a 2 inch cutting stroke, the cutting speed of the new system will be increased by a percentage (22.4%) over the current system. Depending on the length of the sickle, for same inertia loads, the sickle speed can be increased as shown in FIG. 43:

It has been found with the current cutting system, that the increasing the knife speed beyond a speed of about 950 rpm (1900 strokes per minute) produces little improvement in cutting performance. It is suspected that this is due to the blunt face of the traditional knife blade or sickle section essentially creating a wall that prevents crop from entering the cutting area.

Figure 2A:
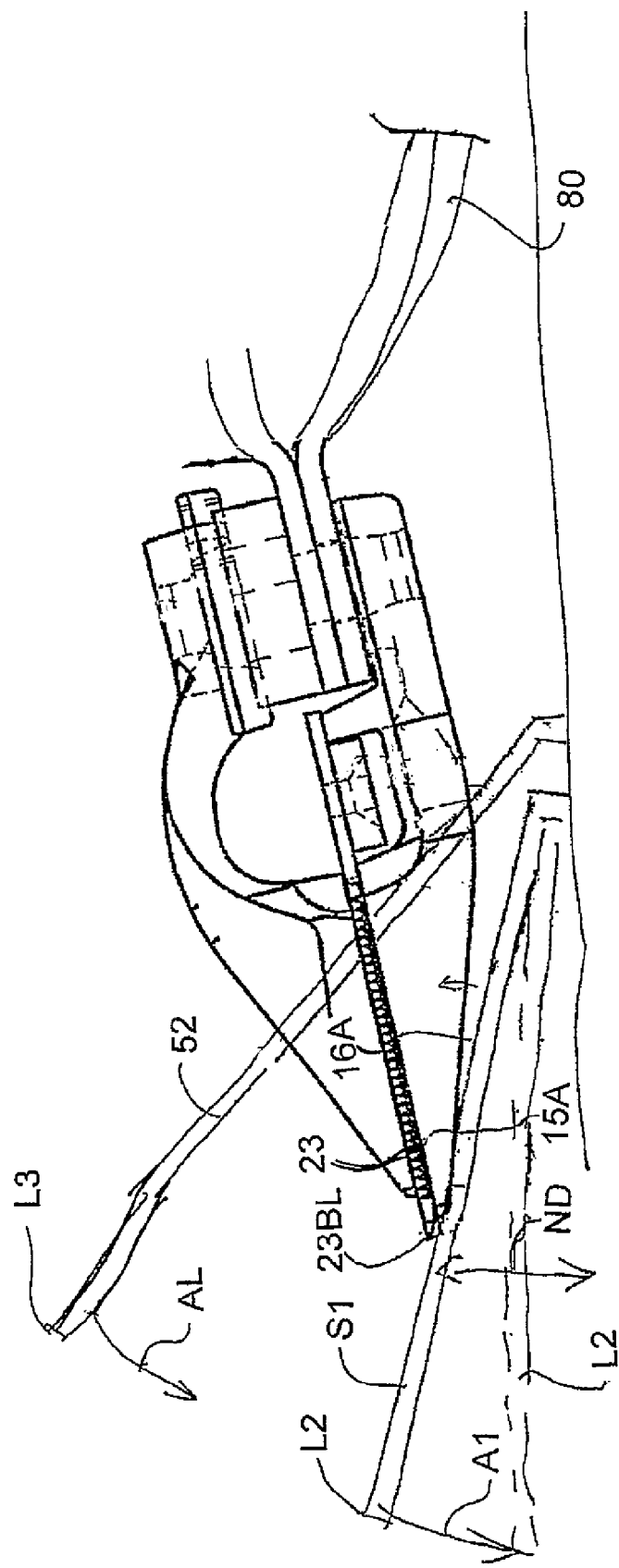
FIG. 2A is a side elevational view of a sickle apparatus showing the engagement of the front edge of the knife and the engagement of the trash bar with the crop which leads to cutting inefficiencies leading to maximum stubble length increases.

Turning now to the cutting efficiency obtained by the above geometry of cutting system relative to prior art arrangements shown in FIGS. 9 to 13, a generic cutting system is shown in FIG. 2A to show how cutting inefficiency and the associated increase in maximum stubble length arises.

Thus in FIG. 2A, the cutting system is carried so that it moves across the ground either closely in contact with the ground as shown or at a set cutting height. In both cases this determines a cutting height or nominal cutting distance ND from the ground with is the length of any crop stalk if cut efficiently and directly as it reaches the location between the blade and ledger surface. In FIG. 2A, the cutter bar rests on the ground at a skid plate 80 which holds the ledger surface 15A at the height ND from the ground. Typically this is of the order of 1.5 inches but this can be varied slightly by changing the angle of the cutter bar about a transverse axis by changing the angle of the header.

Cutting inefficiency arises where stalk S1 engages a blunt front edge 23BL of the knife blade 23 so that it is pushed forwardly by the knife blade rather than reaching the side edges of the knife blade where it can be cut.

In conventional thinking it is understood that this effect is of little importance in that the knife blade is moving rapidly side to side with the expectation is that the sideways movement will immediately cause any such crop to be shed to the side away from the movement allowing it to be quickly cut.

Figure 9A:
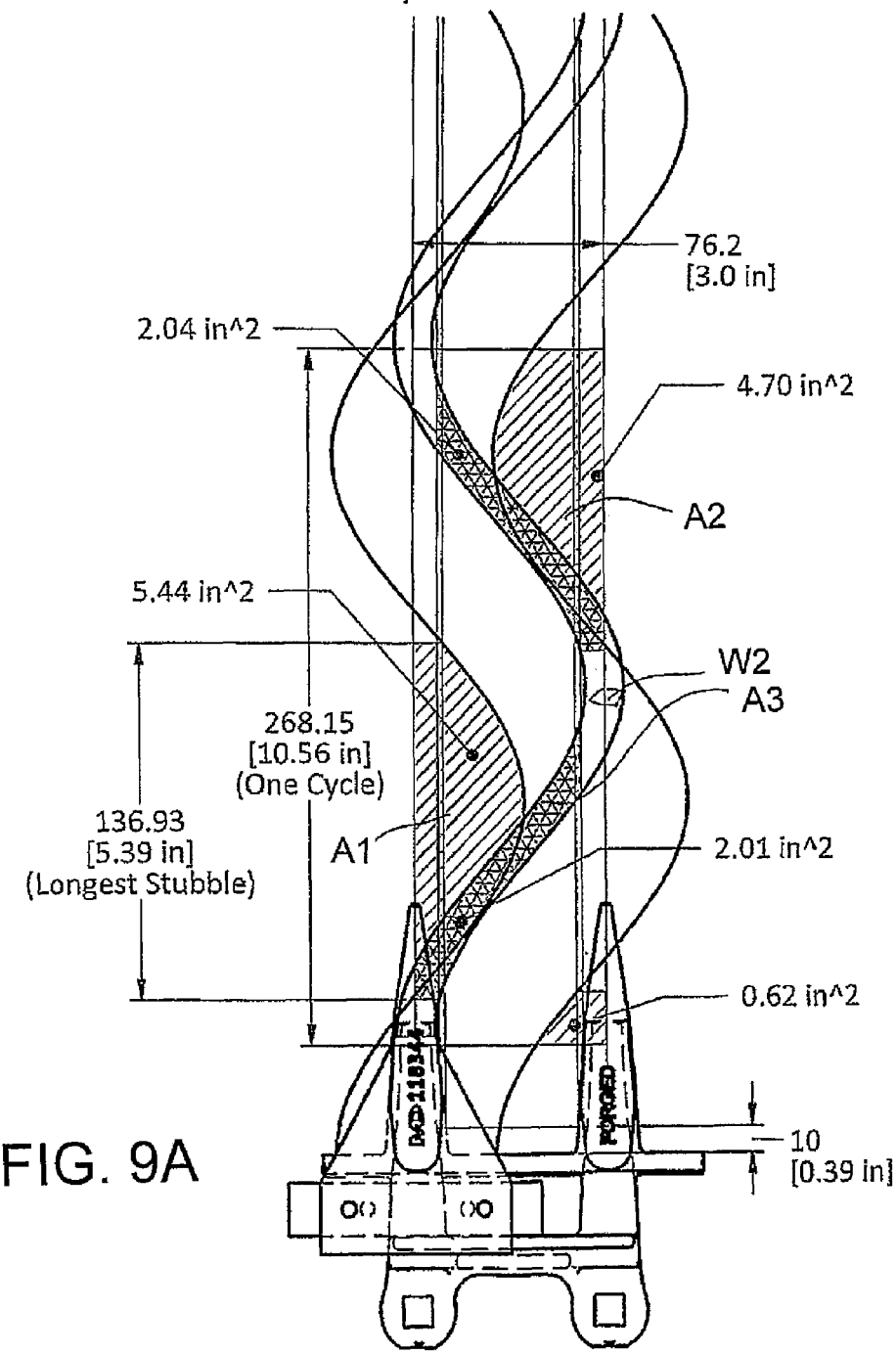
FIG. 9A shows a conventional pointed guard and cutting blade of conventional dimensions operating at 6 mph and 600 rpm.
Figure 9B:
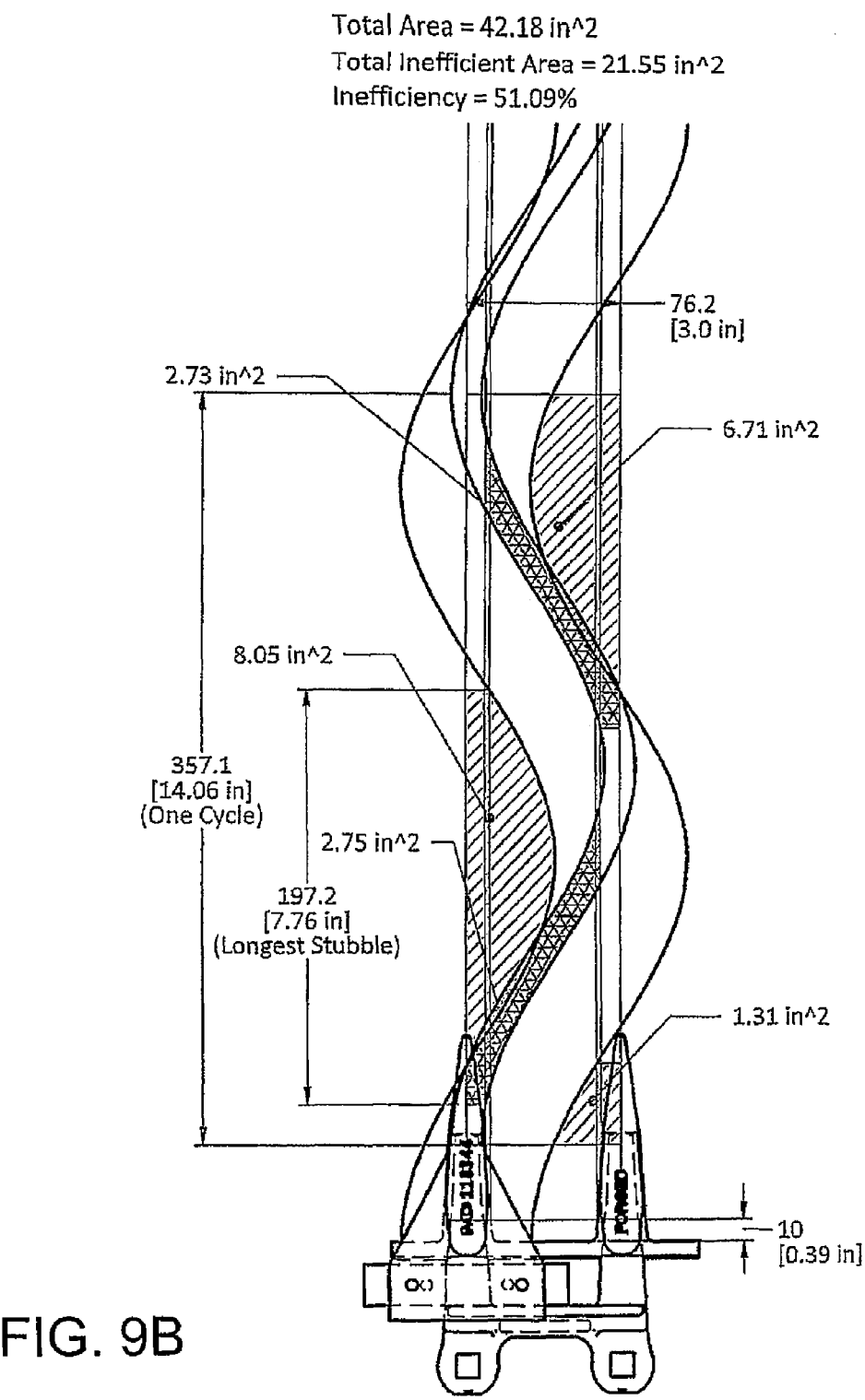
FIG. 9B shows a conventional pointed guard and cutting blade of conventional dimensions operating at 10 mph and 750 rpm.
Figure 9C:
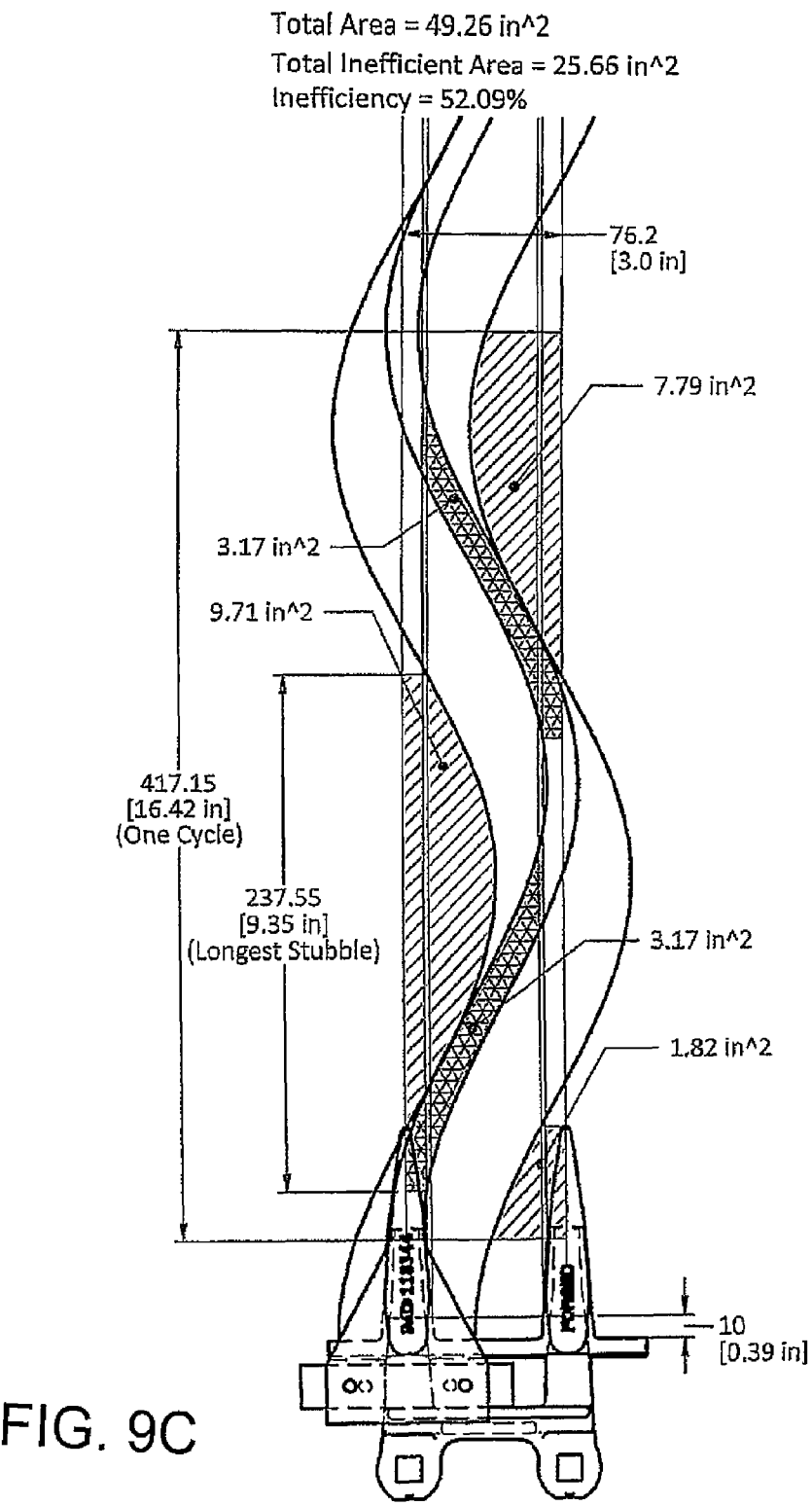
FIG. 9C shows a conventional pointed guard and cutting blade of conventional dimensions operating at 14 mph and 900 rpm.
Figure 10A:
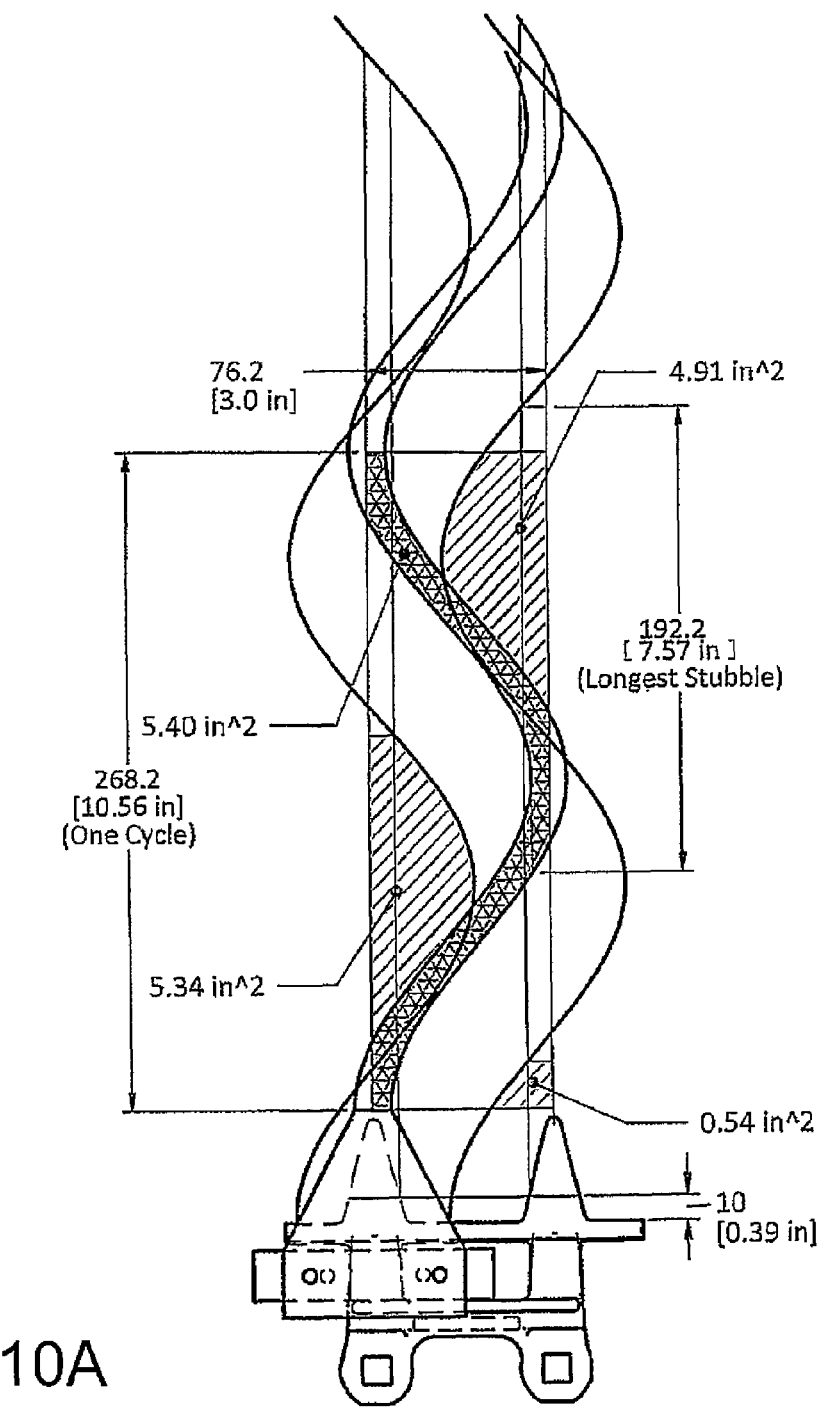
FIG. 10A shows a conventional stub guard and cutting blade of conventional dimensions operating at 6 mph and 600 rpm.
Figure 10B:
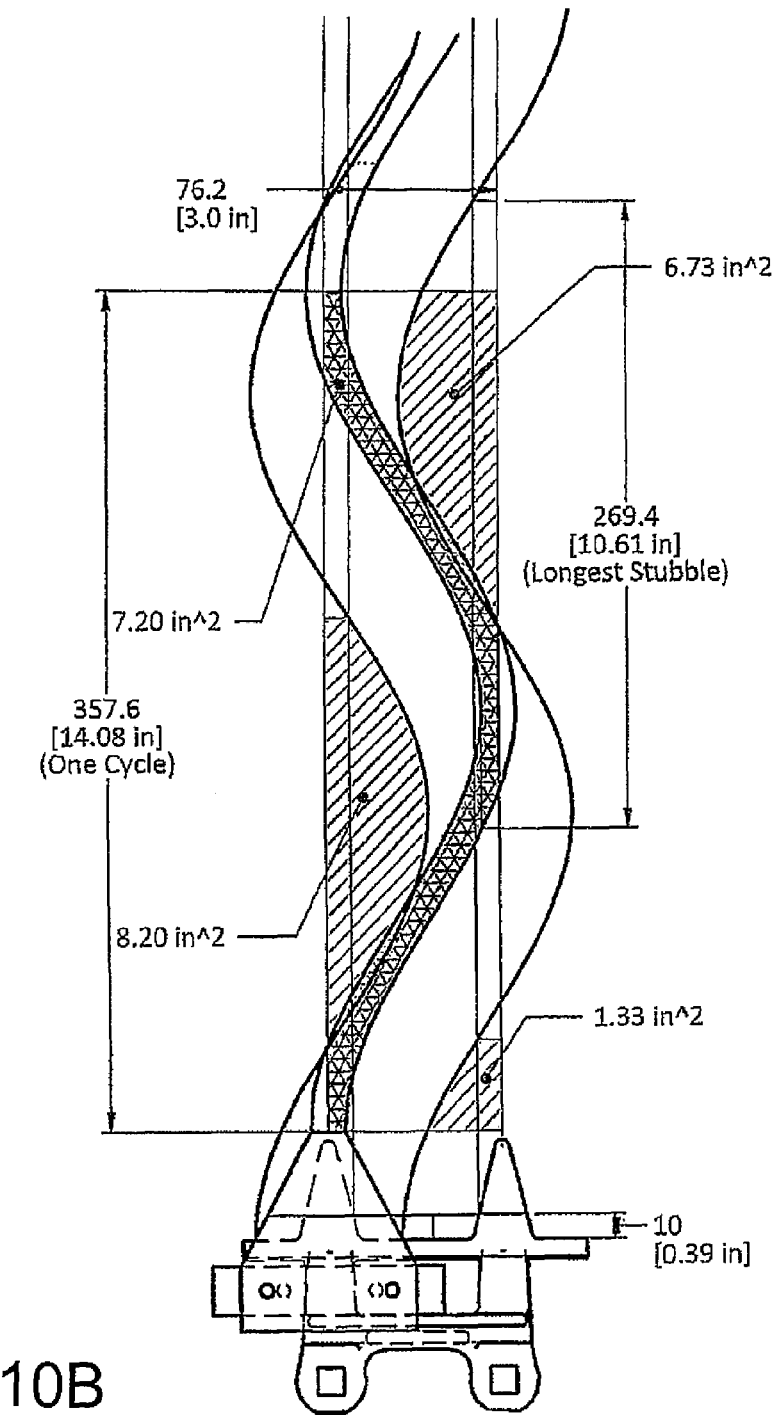
FIG. 10B shows a conventional stub guard and cutting blade of conventional dimensions operating at 10 mph and 750 rpm.
Figure 10C:
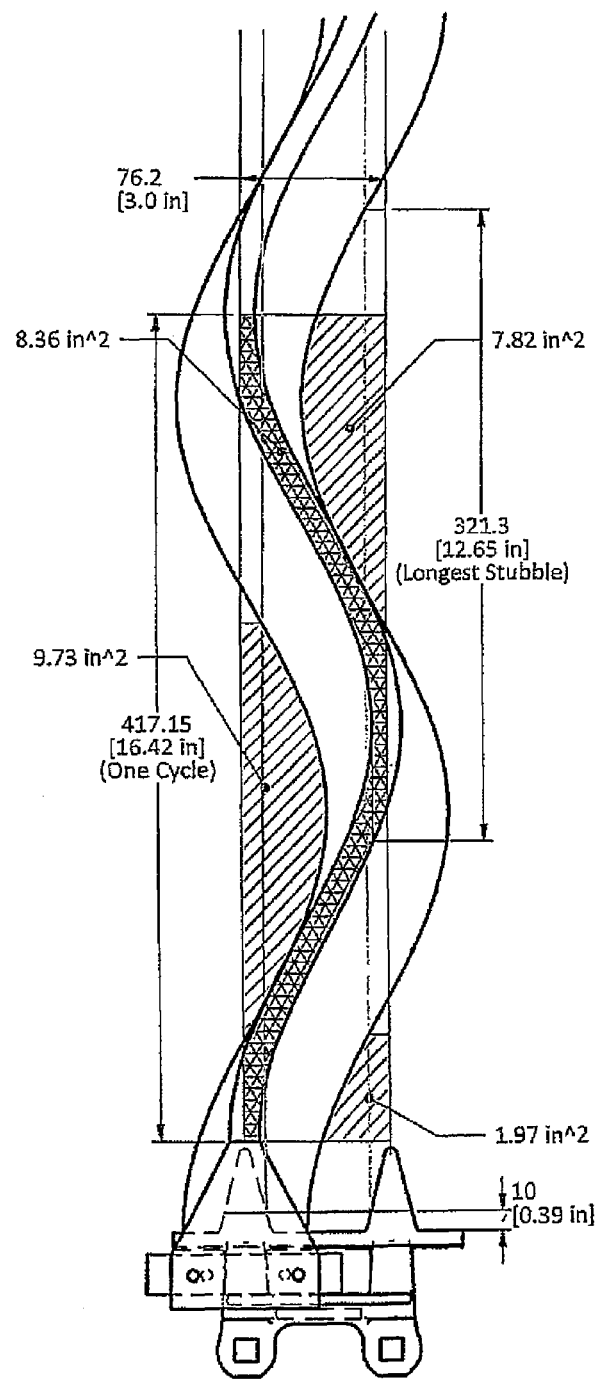
FIG. 10C shows a conventional stub guard and cutting blade of conventional dimensions operating at 14 mph and 900 rpm.
Figure 11A:
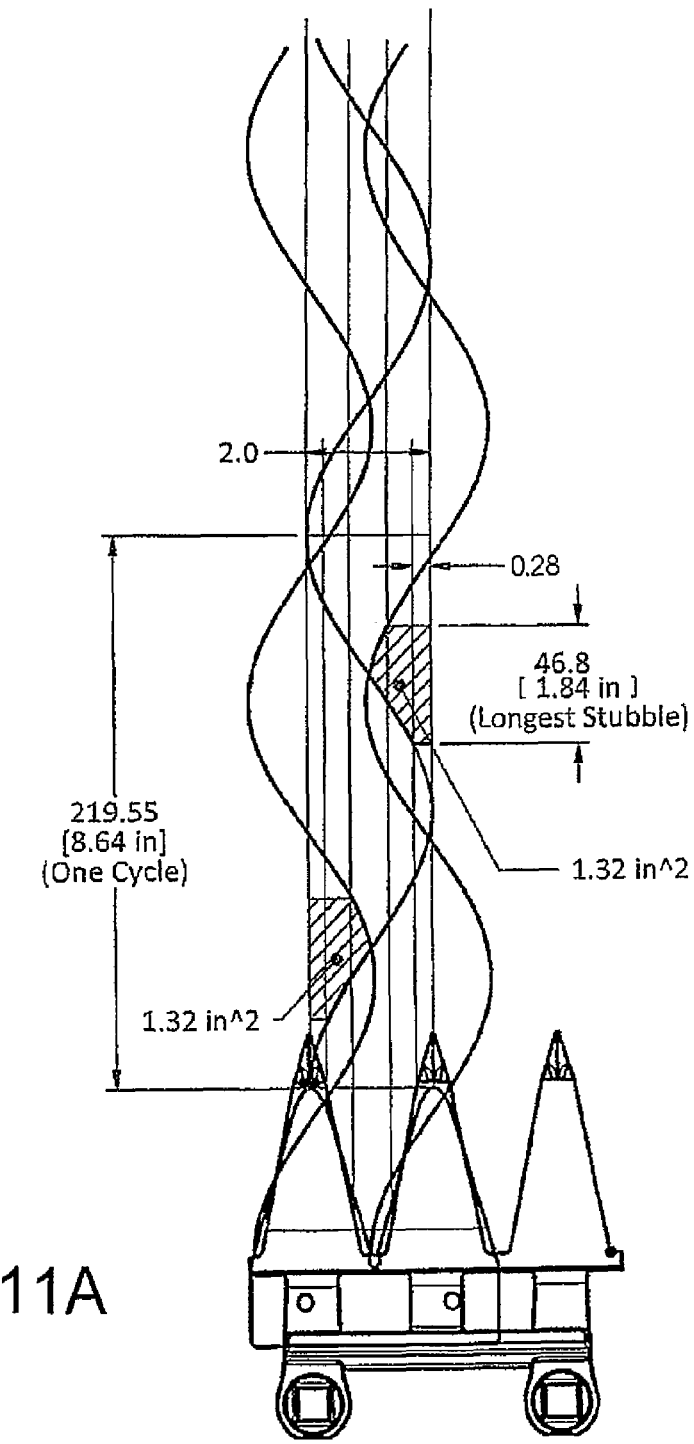
FIG. 11A shows a pointed guard and cutting blade of the present invention operating at 6 mph and 600 rpm.
Figure 11B:
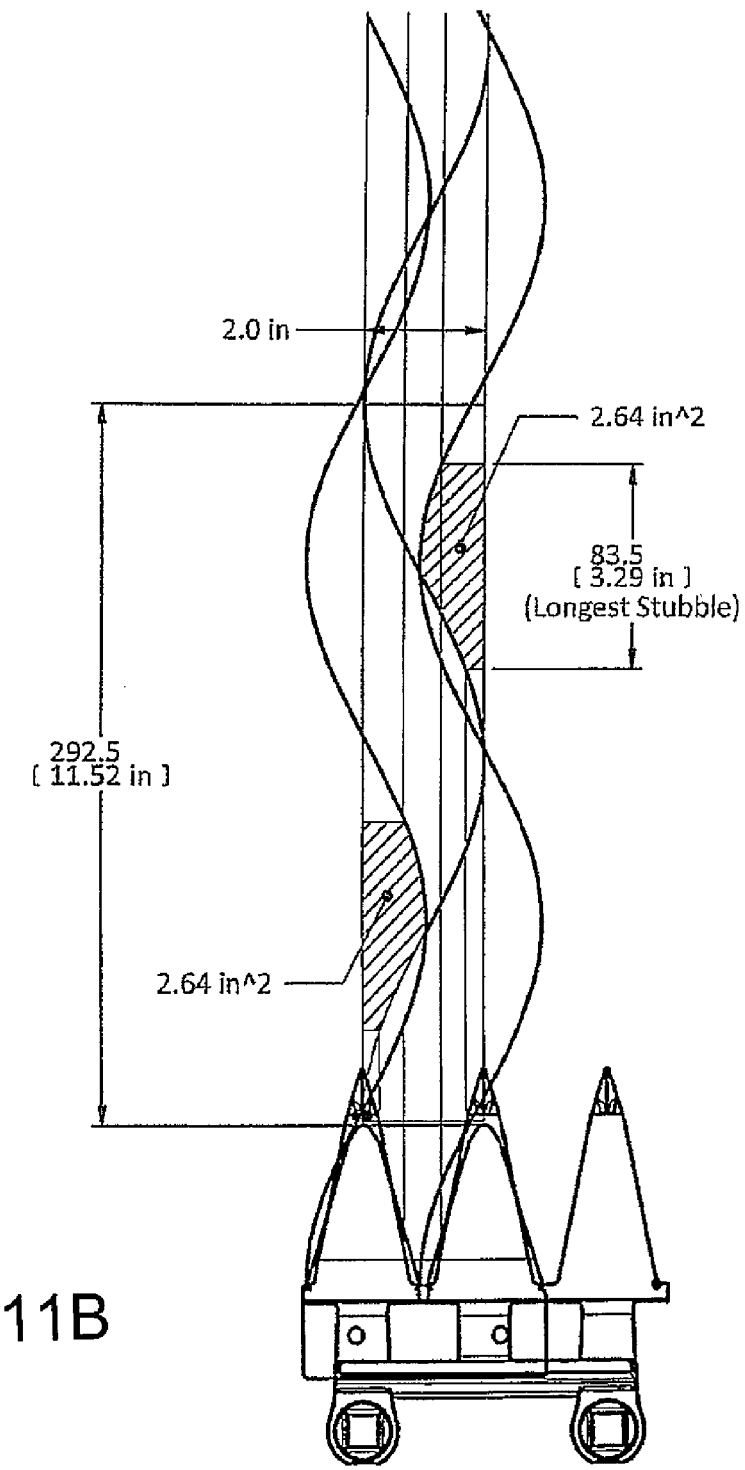
FIG. 11B shows a pointed guard and cutting blade of the present invention operating at 10 mph and 750 rpm.
Figure 11C:
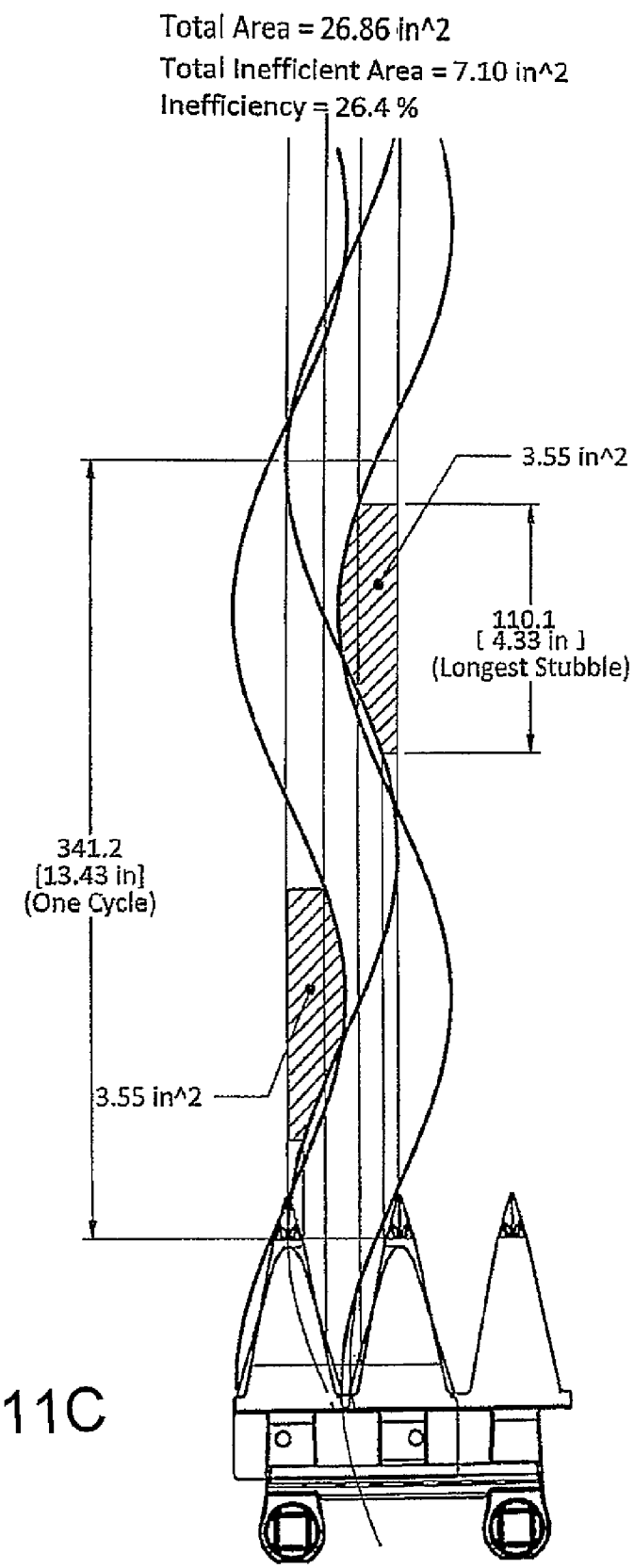
FIG. 11C shows a pointed guard and cutting blade of the present invention operating at 14 mph and 900 rpm.
Figure 12A:
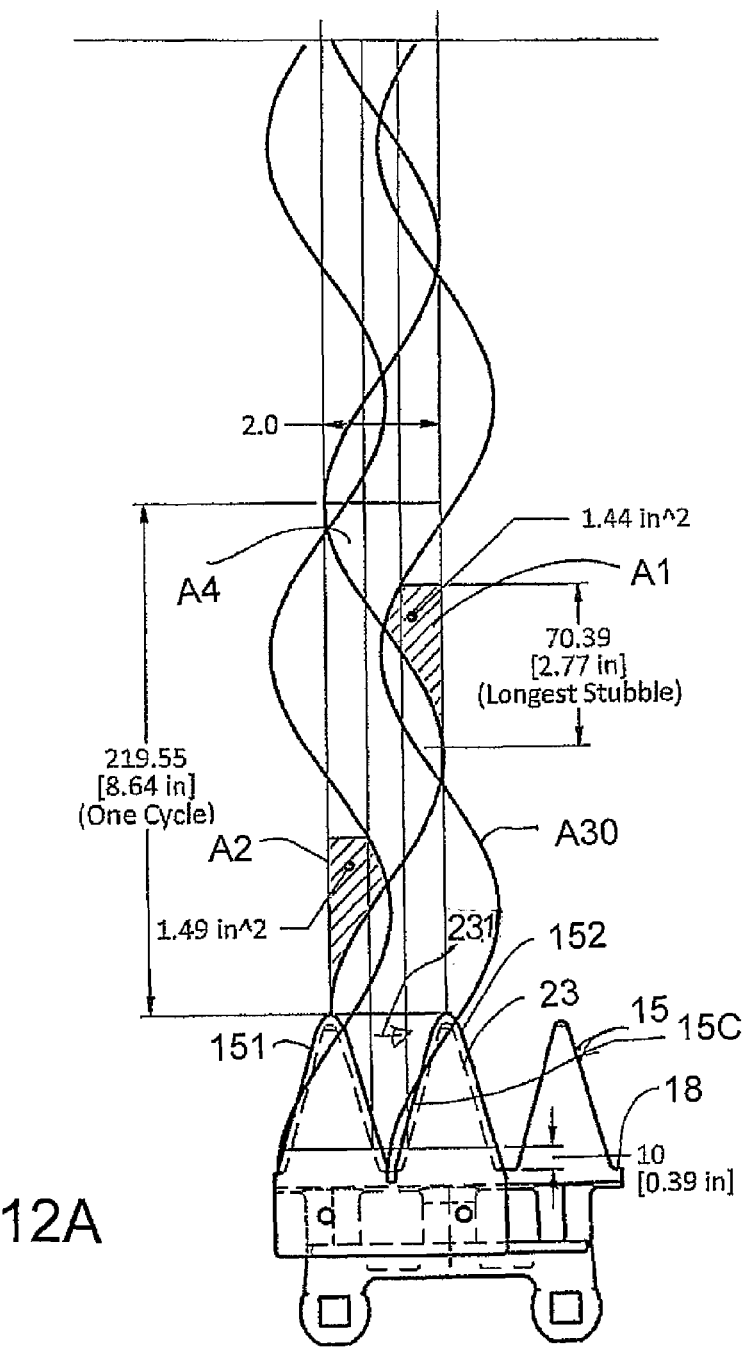
FIG. 12A shows a stub guard and cutting blade of the present invention operating at 6 mph and 600 rpm.
Figure 12B:
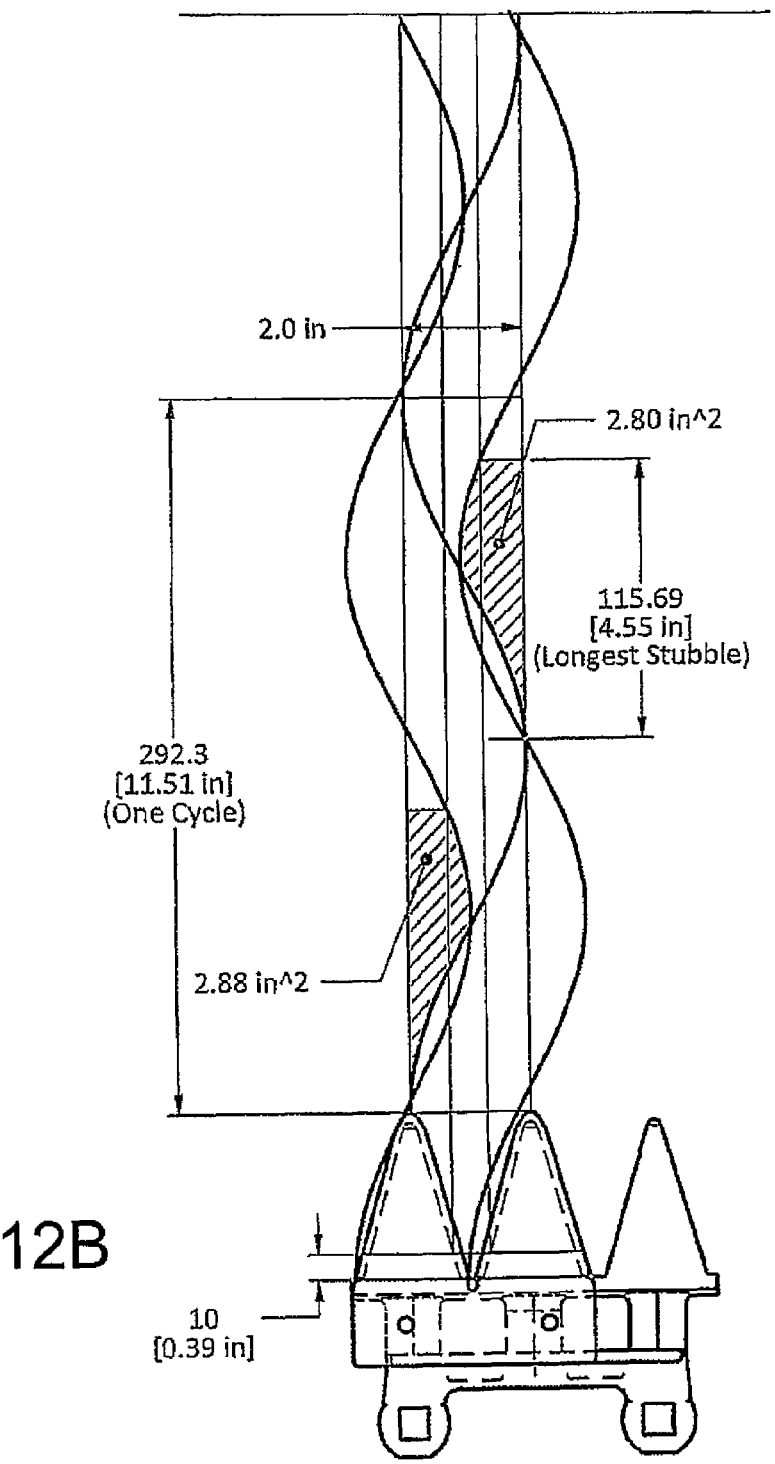
FIG. 12B shows a stub guard and cutting blade of the present invention operating at 10 mph and 750 rpm.
Figure 12C:
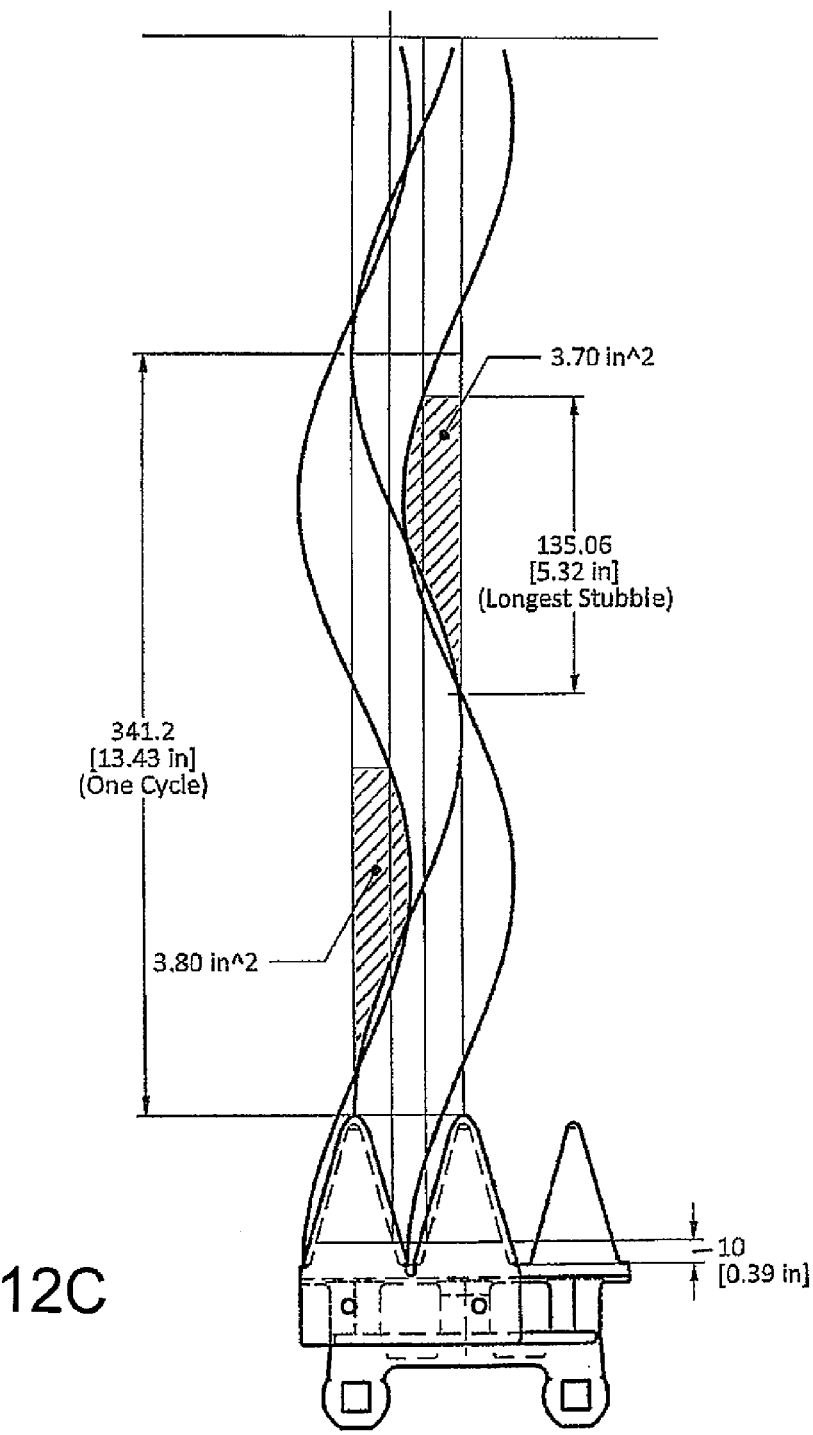
FIG. 12C shows a stub guard and cutting blade of the present invention operating at 14 mph and 900 rpm.

However the analysis of FIGS. 9 to 13 shows that, referring particularly to FIGS. 9A and 12A, at high ground speed, the forward movement has much more effect on the crop than the sideways movement so that a band of width W2 shown in FIG. 12A remains in contact with the blunt front edge 23BL. This crop is then pushed forward forwardly and downwards as indicated at arrow A1 as shown at stalks S11 and S12 without cutting until the crop is shed from the blade at the location where the blade reverses at the next guard finger, or at some point prior to that location, so that the crop can then enter into the shearing action on the second side of the blade.

Another analysis of FIGS. 9 to 13 in relation to FIG. 2A shows that, in each cycle of cutting crop, the side of the blade which is not cutting will allow some stalks S2 to move to a position between and the guard as the blade moves away from the guard sufficiently that the blade reaches a position in which the stalks engage the trash bar 28 (FIG. 12A). Again therefore these stalks are pushed forwardly and downwards as indicated at arrow A2 by the trash bar without cutting until the blade comes back in the reverse direction to effect the shearing action of the crop of that second side of the guard. As shown in FIG. 2A each stalk reaches a length L2 and L3 before it is cut.

FIG. 13A shows a guard and cutting blade of the PRIOR ART operating at 6 mph and 520 rpm.

Figure 13B:
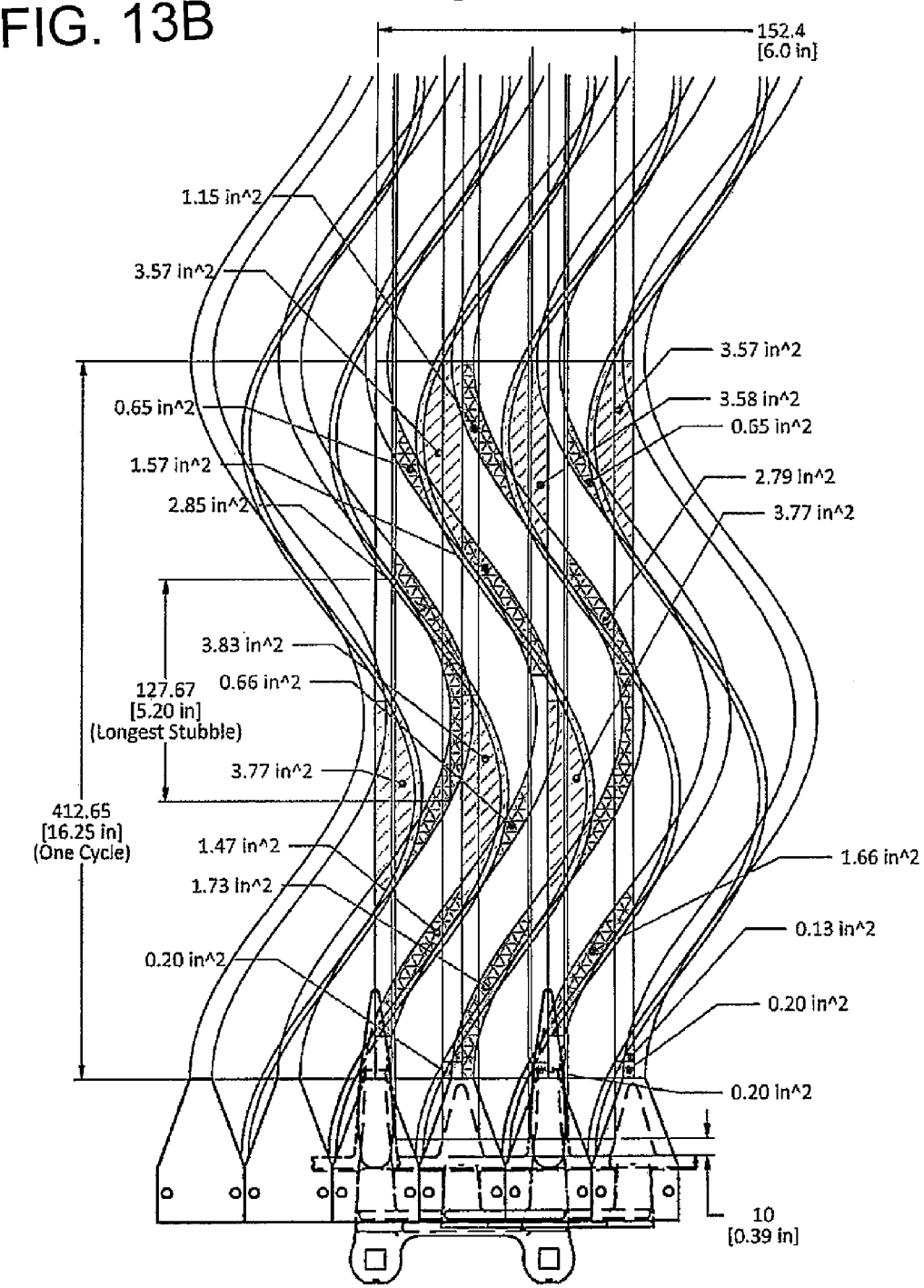
FIG. 13B shows a pointed guard and cutting blade of FIG. 13A operating at 10 mph and 650 rpm.

FIG. 13B shows a pointed guard and cutting blade of FIG. 13A operating at 10 mph and 650 rpm.

Figure 13C:
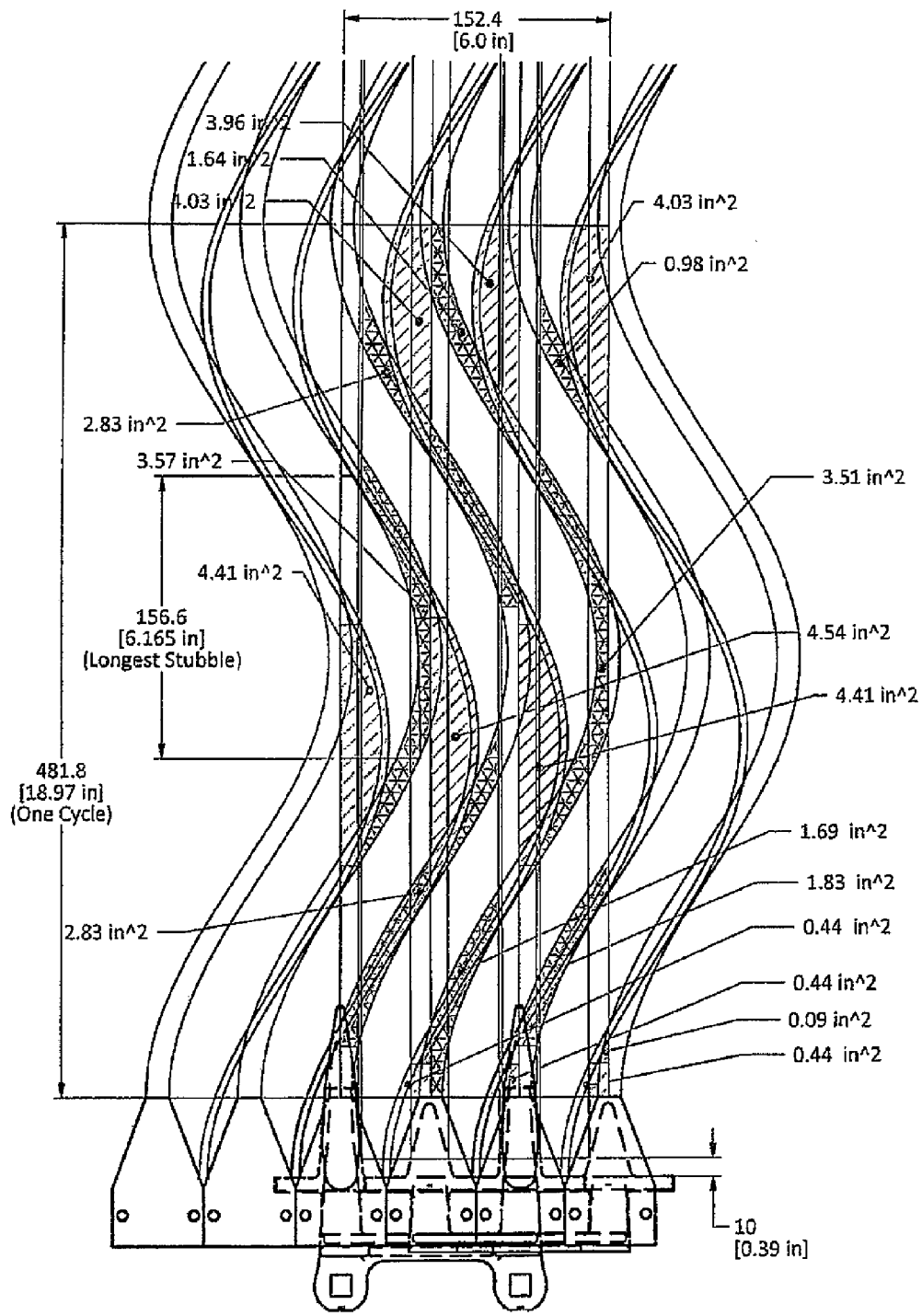
FIG. 13C shows a pointed guard and cutting blade of FIG. 13A operating at 14 mph and 779 rpm.

FIG. 13C shows a pointed guard and cutting blade of FIG. 13A operating at 14 mph and 779 rpm.

In FIGS. 13A, 13B and 13C is shown the inefficiency of a John Deere cutting system which represents what is believed to be an effective cutting system known in the prior art but which does not match the low inefficiency obtained in the present invention as shown by a comparison of FIGS. 11 and 13.

In FIG. 13, the inefficiency calculation is made more complicated in that the path of movement of four blades rather than two must be taken into account since the stroke is 4 inches with a center to center spacing of 2 inches so that each blade moves across three guards rather than back and forth between two guards. However after summing the inefficiency of four blades and dividing the total area by two to provide a matching calculation, it is clear that the inefficiency at the speeds and stroke rates set forth, the inefficiency is nearly double that of the present invention. The stroke rate must be set much lower to provide the same loadings on the knife bar since the stroke length is 4 inches relative to the stroke length of 2 inches preferred in the present invention. Of course the stoke rates set forth not the maximum which can be obtained in any machine but are set at the pre-set rates in order to carry out the same calculation at the same conditions for the different machines to show the differences in performance which are obtained by the shape and arrangement of the cutting system.

It is known that sideways movement of the crop also occurs during cutting. That is each stalk is carried sideways by the moving blade into the shearing action with the guard finger. This amount of movement varies depending on the timing of the stalk entering the area to be cut and engaging the blade and the side to side position of the stalk as it enters the area. The amount of sideways movement will of course increase the length of the stalk as it is cut since the position of the cut is at a height of the stalk greater than the distance ND from the ground. The analysis herein does not take into account this sideways movement since the maximum stalk length which can be obtained by the sideways movement is always less than the maximum stalk length which is obtained by the above described forward movement.

However another benefit of the wider guard fingers is that the crop moves to the side by a shorter distance before encountering the shearing action at the side edge of the guard.

It will be appreciated therefore that some stalks provide stubble length of ND because they are cut without any forward pushing movement and some stalks are pushed forward to a length L2 or L3 where the actual stubble length is equal to the hypotenuse of the distance of forward movement before cutting occurs and distance ND.

As shown as an example in FIG. 12A, the guard fingers 15, knife blades 23 and the trash bar 28 are arranged so as to provide a cutting action on the crop in which in a first cutting stroke, each knife blade 23 moves across from one is guard finger 151 to the next 152 in a first direction 231 so as to cut crop located on said first side of the knife blade 23 between the first cutting edge of the knife blade and the side 15C of the next guard finger 152 by the shearing action while leaving uncut crop located on the second side of the knife blade. In a second cutting stroke, each knife blade moves across from the next guard finger 152 to said one guard finger 151 in a second direction opposite to direction 231 so as to cut crop located on the second side of the knife blade between the second cutting edge of the knife blade and the guard finger 151 by the shearing action. The cutting action includes the previously uncut crop located on the first side of the blade 23, while leaving uncut crop located on the second side of the knife blade.

Figure 14:
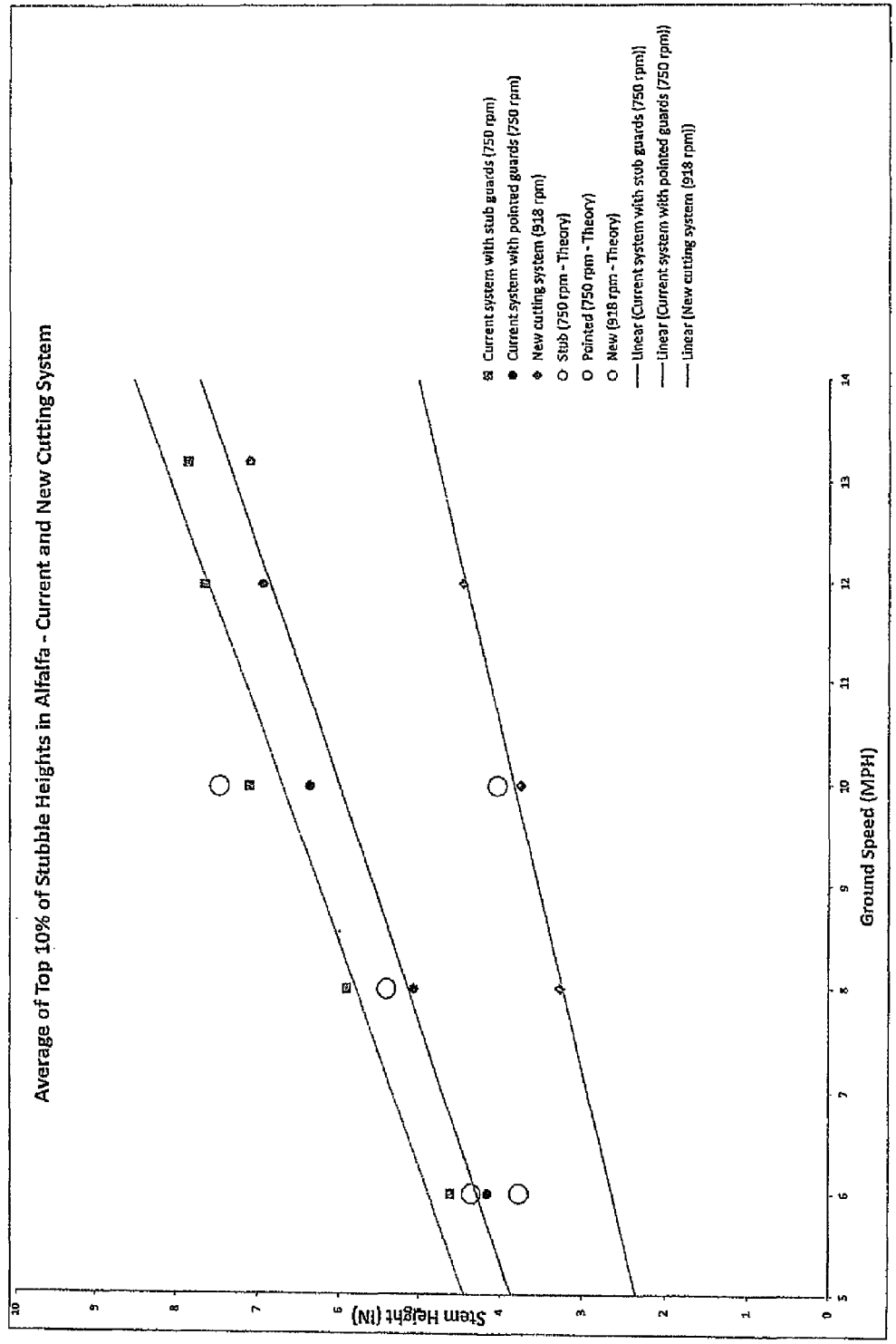
FIG. 14 shows a graph of maximum stubble length v ground speed as measured in the field for conventional systems and for the system of the present invention. It will be noted that the maximum is obtained as an average of the top ten percent of lengths in order to average out any anomalous stubble stalks which are not properly representative of the cutting action.
Figure 15:
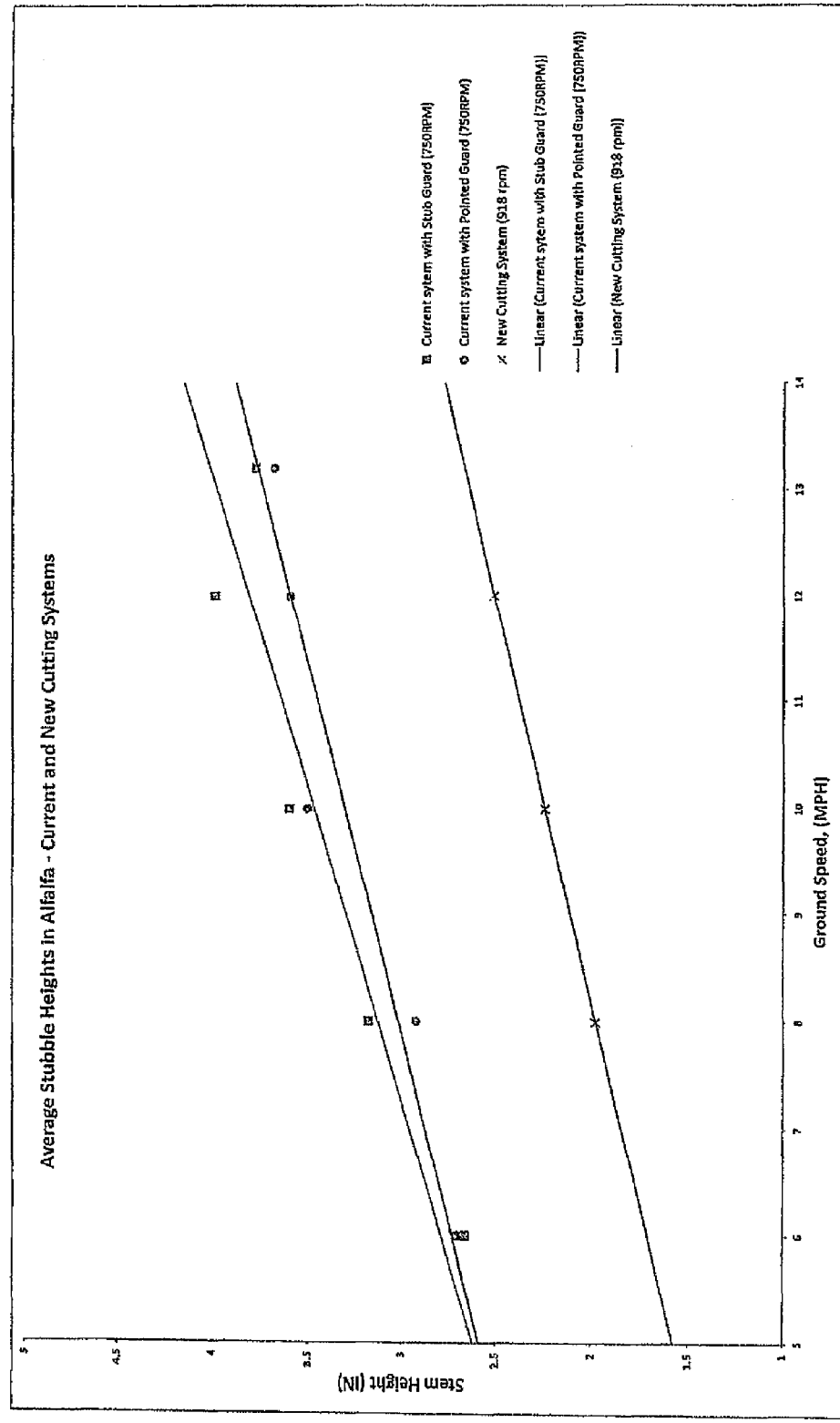
FIG. 15 shows a graph of average stubble length v ground speed as measured in the field for conventional systems and for the system of the present invention.
Figure 16A:
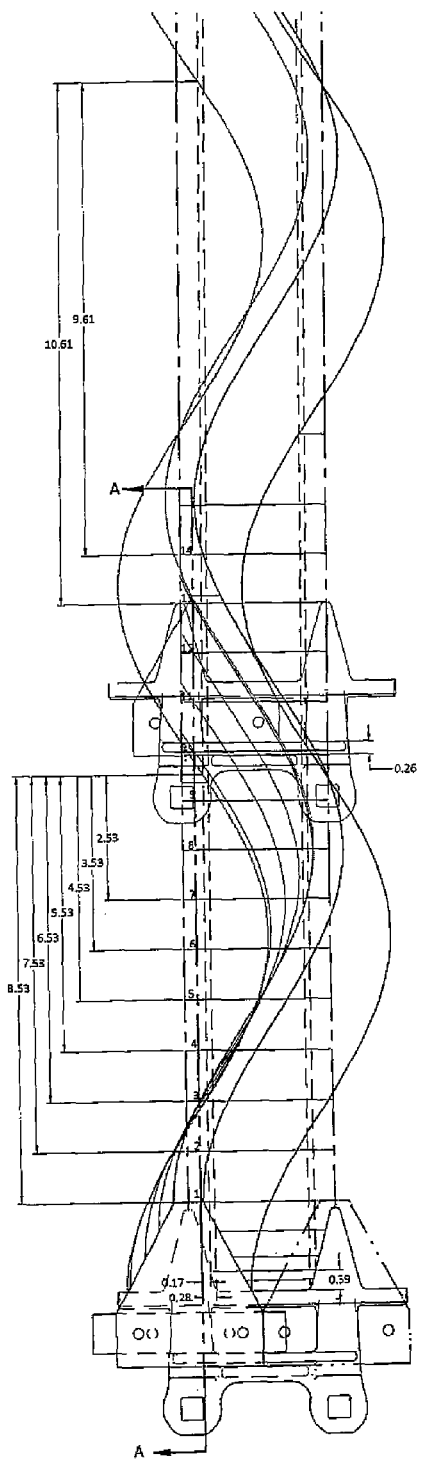
FIG. 16A shows a plan view of a cutting system with an analysis of the cutting action taken along the lines A-A of FIG. 16A where the cutting system is a prior art system using a conventional stub guard, the analysis being carried out at 10 mph and 750 rpm. The blade is triangular with a width of 3.0 inches and a length of 1.75 inches. The blade has a front edge of the order of 0.5 inch wide. The guard has a width at the trash bar of the order of 1.0 inch.
Figure 16B:
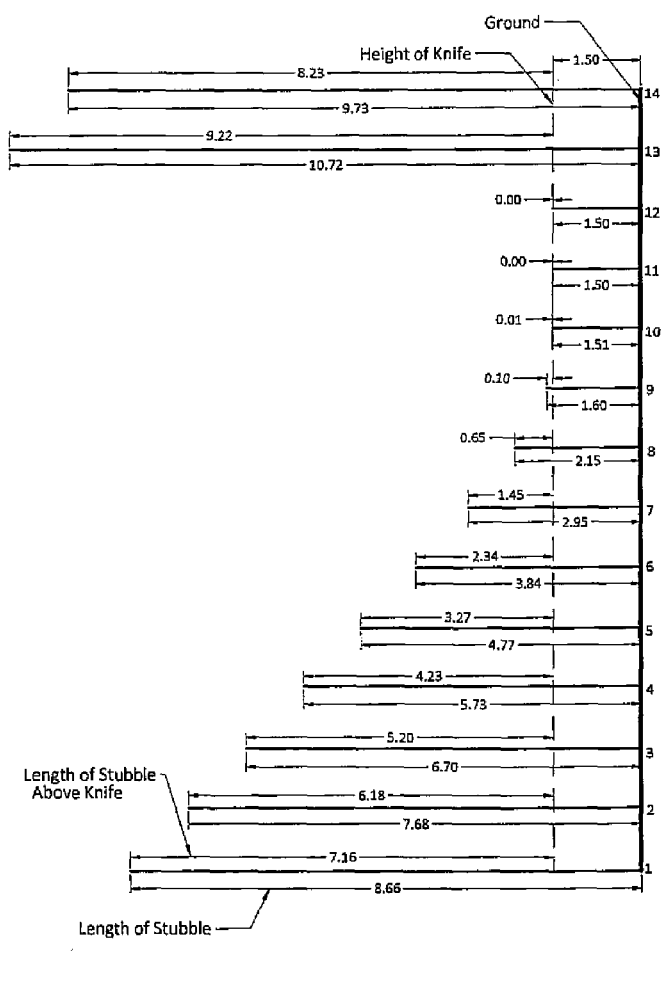
FIG. 16B shows a graph of the analysis of the cutting action taken along the lines A-A of FIG. 16A with the cutting analysis being shown in the table shown in FIG. 21.
Figure 16C:
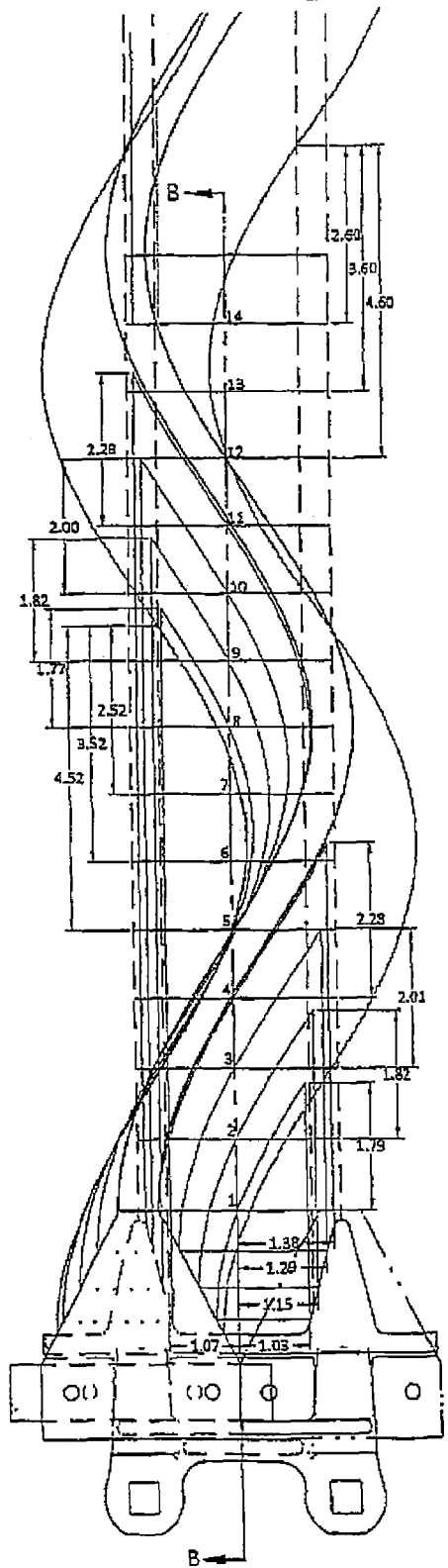
FIG. 16C shows a plan view of the cutting system of FIG. 16A with an analysis of the cutting action taken along the lines B-B of FIG. 16C.
Figure 16D:
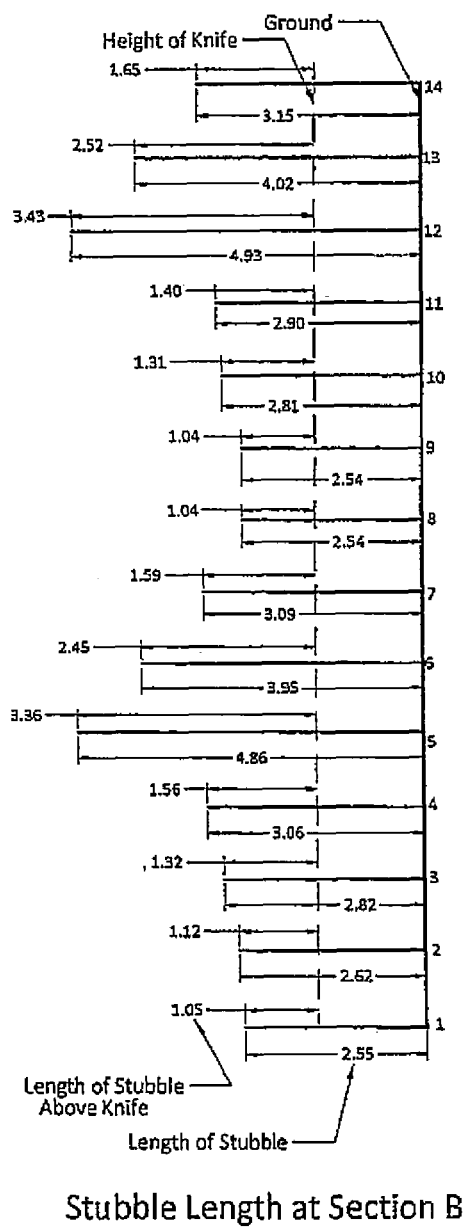
FIG. 16D shows a graph of the analysis of the cutting action taken along the lines B-B of FIG. 16C with the cutting analysis being shown in the table shown in FIG. 22.
Figure 16E:
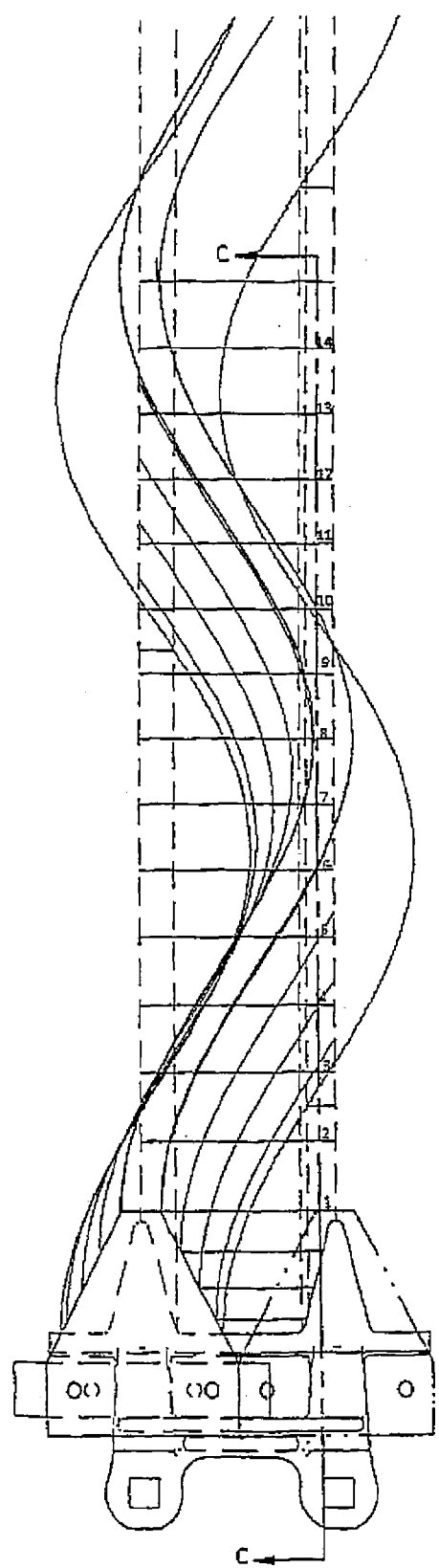
FIG. 16E shows a plan view of the cutting system of FIG. 16A with an analysis of the cutting action taken along the lines C-C of FIG. 16E.
Figure 16F:
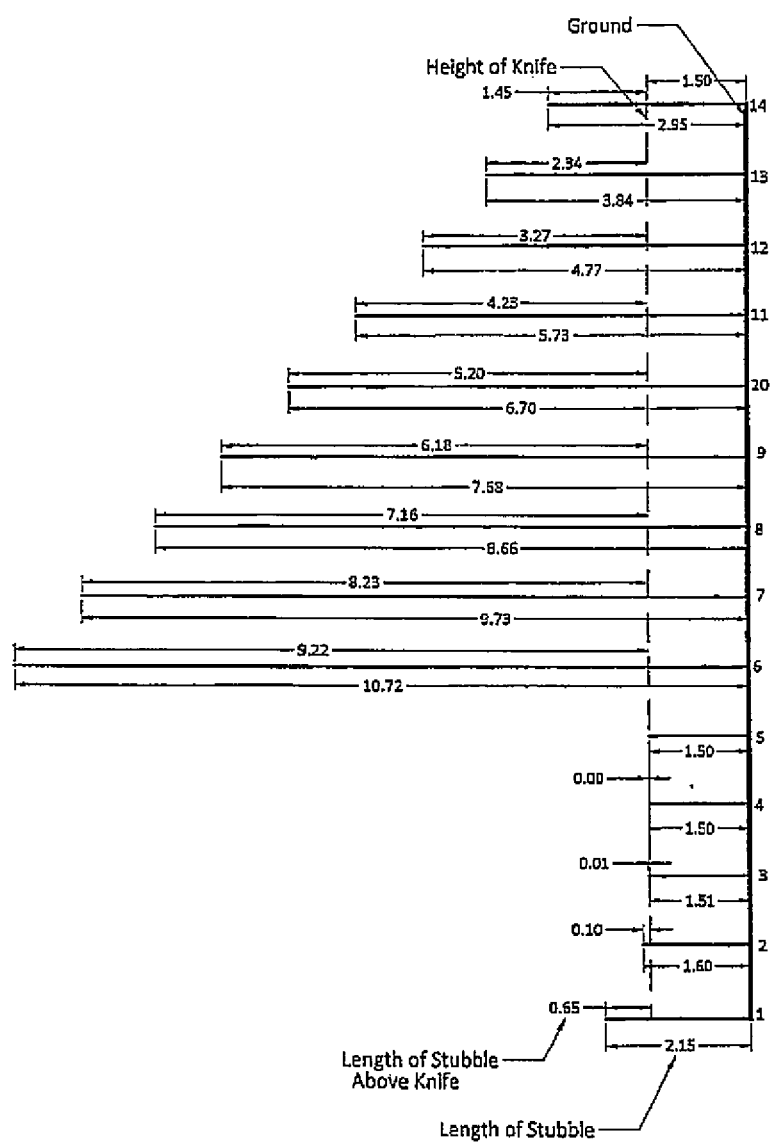
FIG. 16F shows a graph of the analysis of the cutting action taken along the lines C-C of FIG. 16E with the cutting analysis being shown in the table shown in FIG. 23.
Figure 16G:
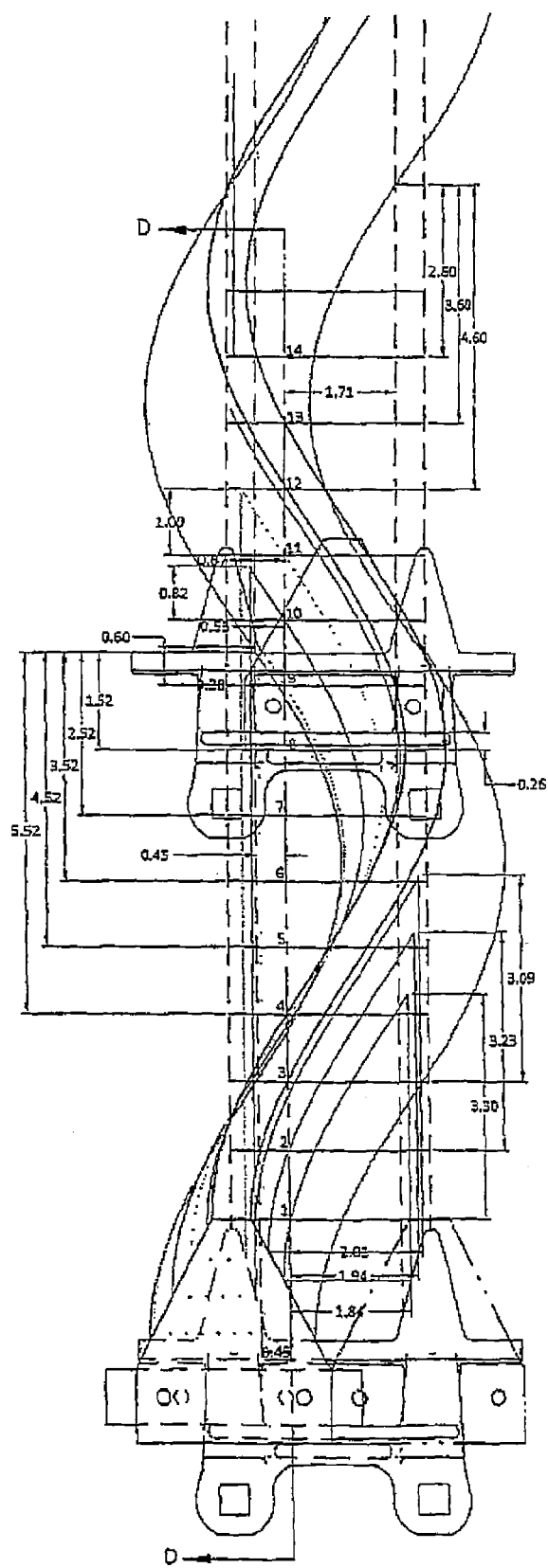
FIG. 16G shows a plan view of the cutting system of FIG. 16A with an analysis of the cutting action taken along the lines D-D of FIG. 16G.
Figure 16H:
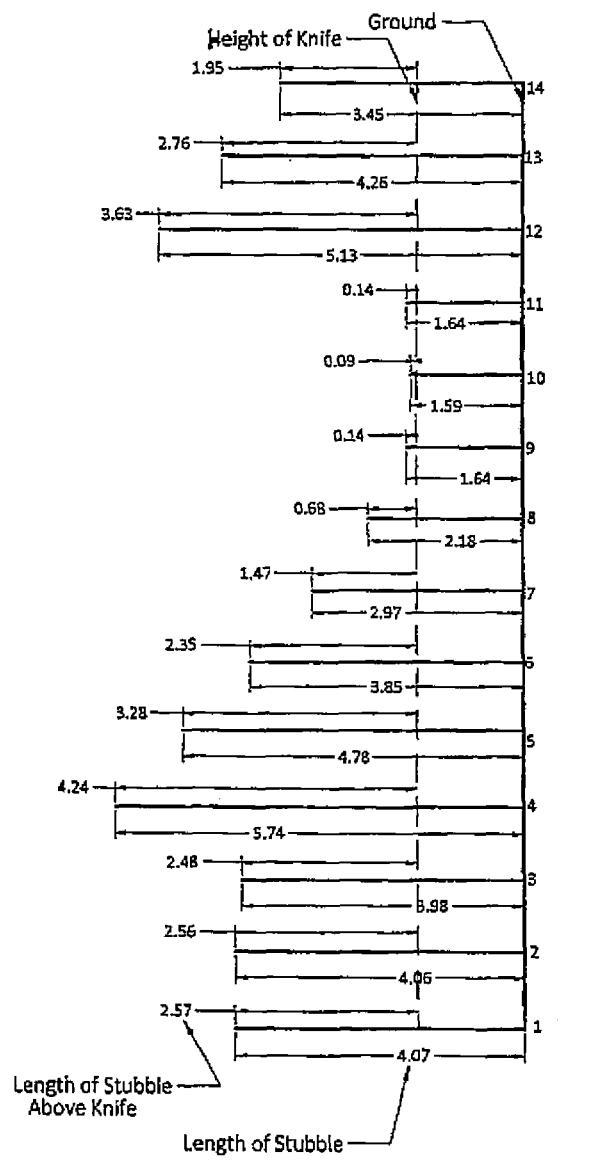
FIG. 16H shows a graph of the analysis of the cutting action taken along the lines D-D of FIG. 16G with the cutting analysis being shown in the table shown in FIG. 24.
Figure 17A:
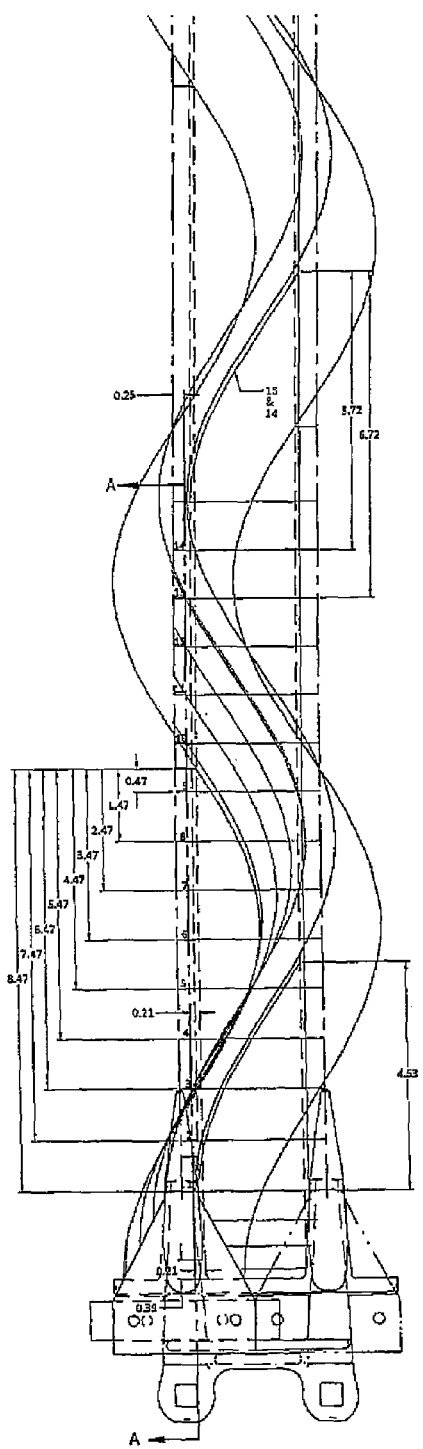
FIG. 17A shows a plan view of a cutting system with an analysis of the cutting action taken along the lines A-A of FIG. 17A where the cutting system is a prior art system using a conventional pointed guard, the analysis being carried out at 10 mph and 750 rpm. The blade is triangular with a width of 3.0 inches and a length of 1.75 inches. The blade has a front edge of the order of 0.5 inch wide. The guard has a width at the trash bar of the order of 1.0 inch.
Figure 17B:
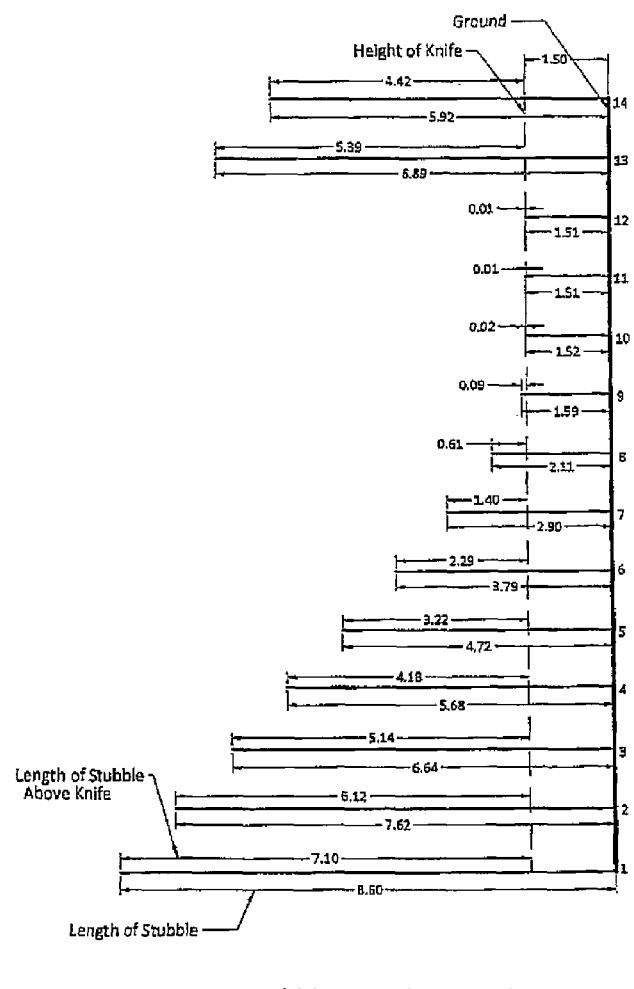
FIG. 17B shows a graph of the analysis of the cutting action taken along the lines A-A of FIG. 17A with the cutting analysis being shown in the table shown in FIG. 25.
Figure 17C:
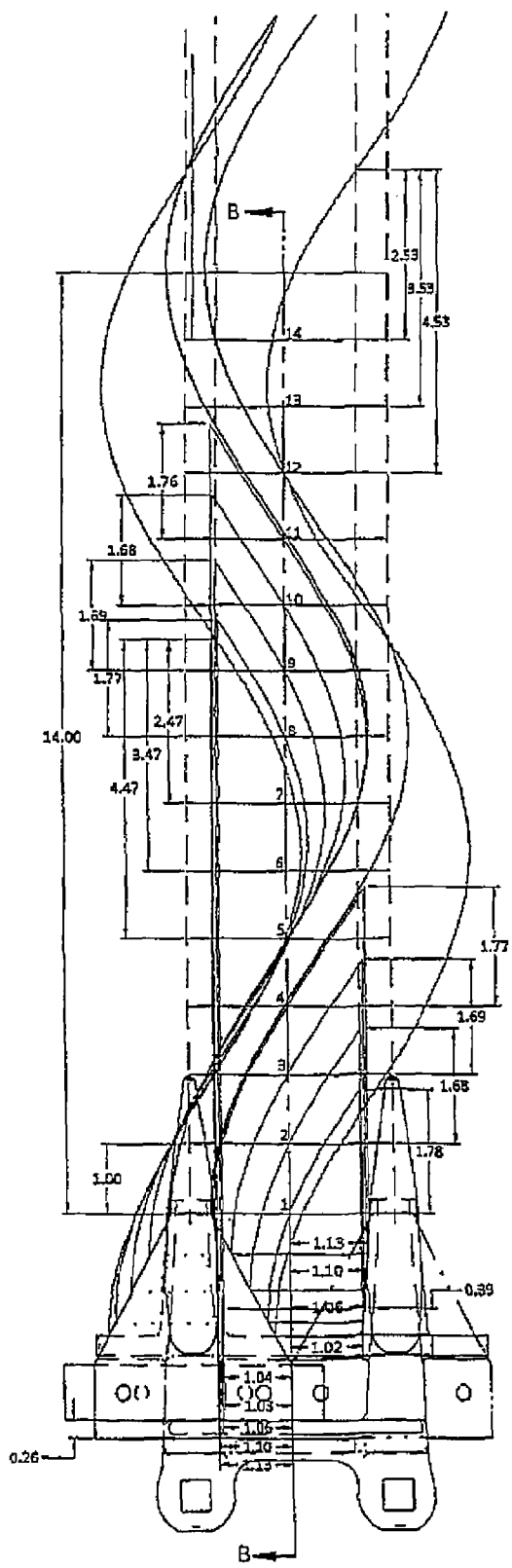
FIG. 17C shows a plan view of the cutting system of FIG. 16A with an analysis of the cutting action taken along the lines B-B of FIG. 16C.
Figure 17D:
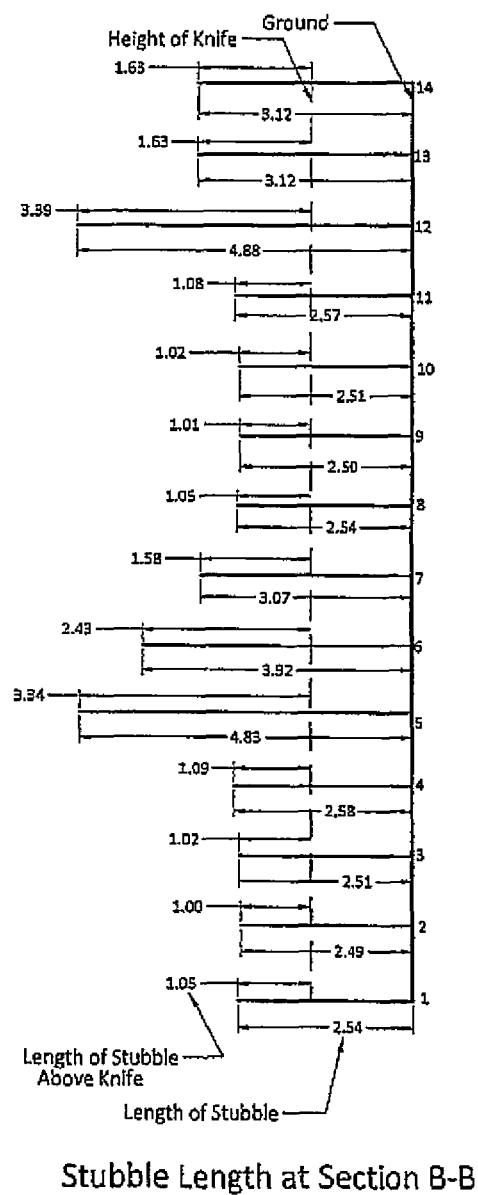
FIG. 17D shows a graph of the analysis of the cutting action taken along the lines B-B of FIG. 17C with the cutting analysis being shown in the table shown in FIG. 26.
Figure 17E:
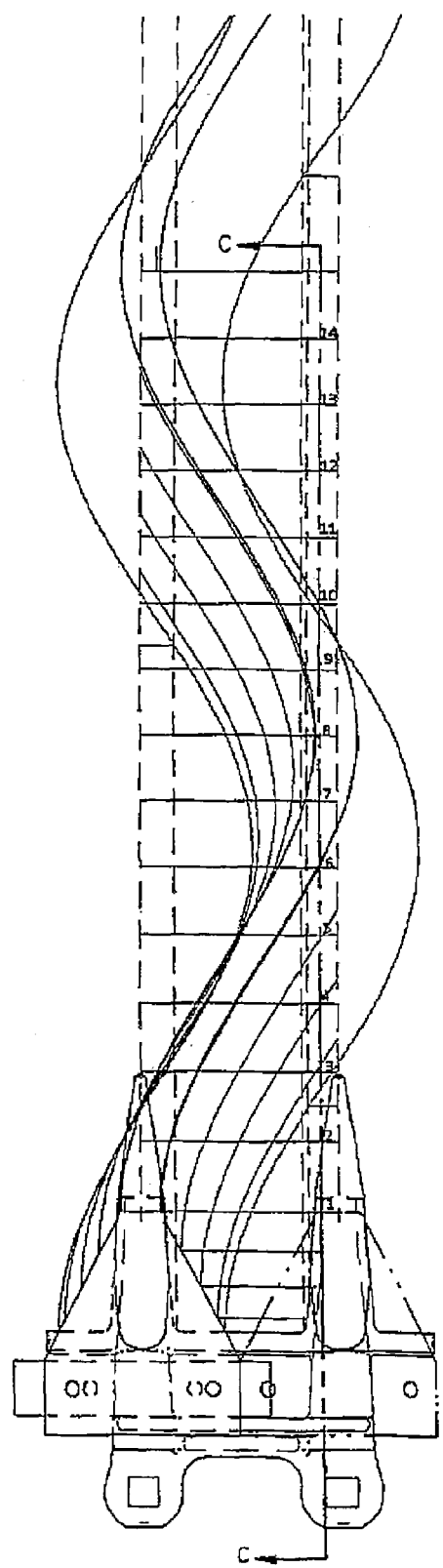
FIG. 17E shows a plan view of the cutting system of FIG. 17A with an analysis of the cutting action taken along the lines C-C of FIG. 17E.
Figure 17F:
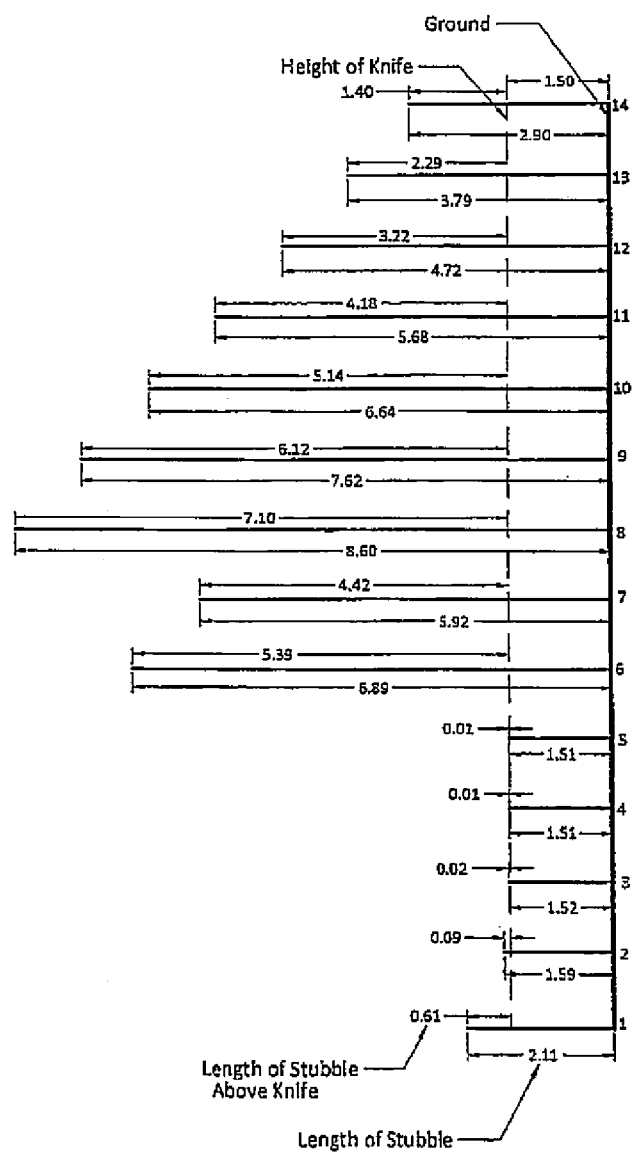
FIG. 17F shows a graph of the analysis of the cutting action taken along the lines C-C of FIG. 17E with the cutting analysis being shown in the table shown in FIG. 27.
Figure 17G:
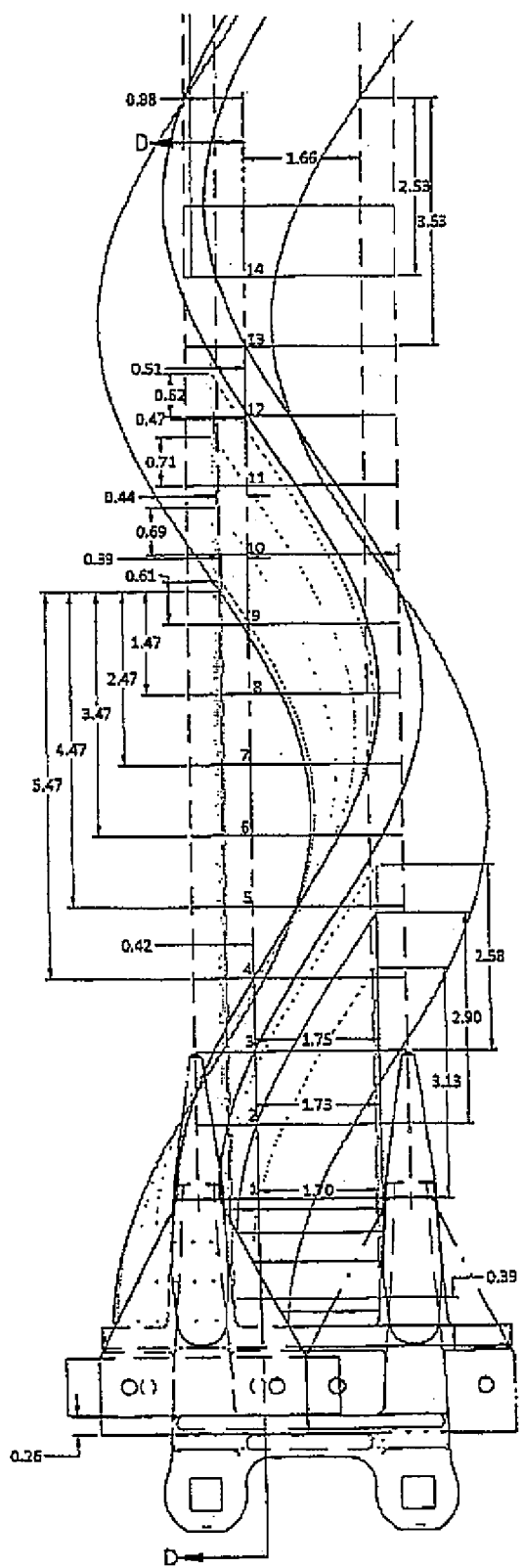
FIG. 17G shows a plan view of the cutting system of FIG. 17A with an analysis of the cutting action taken along the lines D-D of FIG. 17G.
Figure 17H:
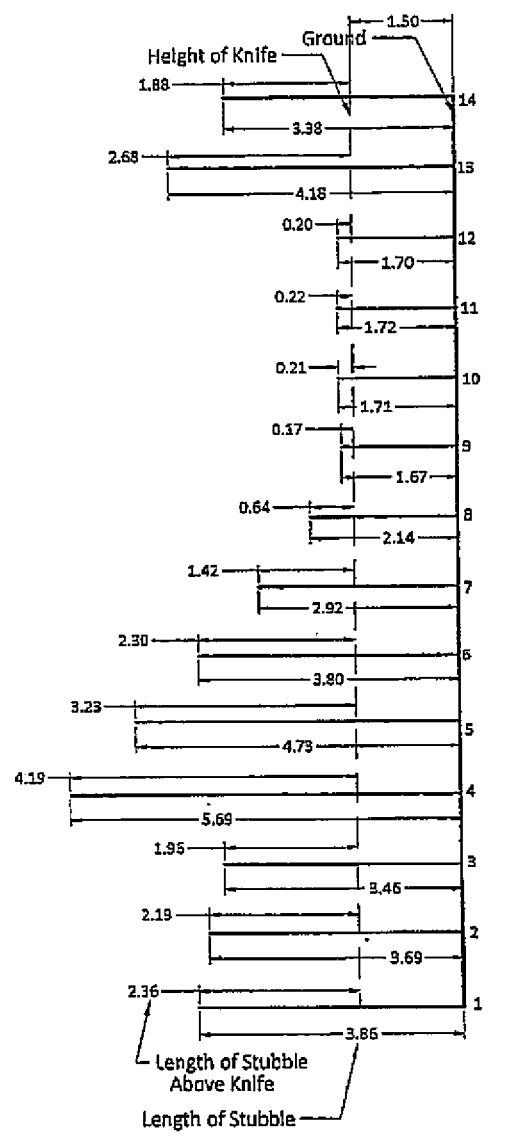
FIG. 17H shows a graph of the analysis of the cutting action taken along the lines D-D of FIG. 17G with the cutting analysis being shown in the table shown in FIG. 28.
Figure 18A:
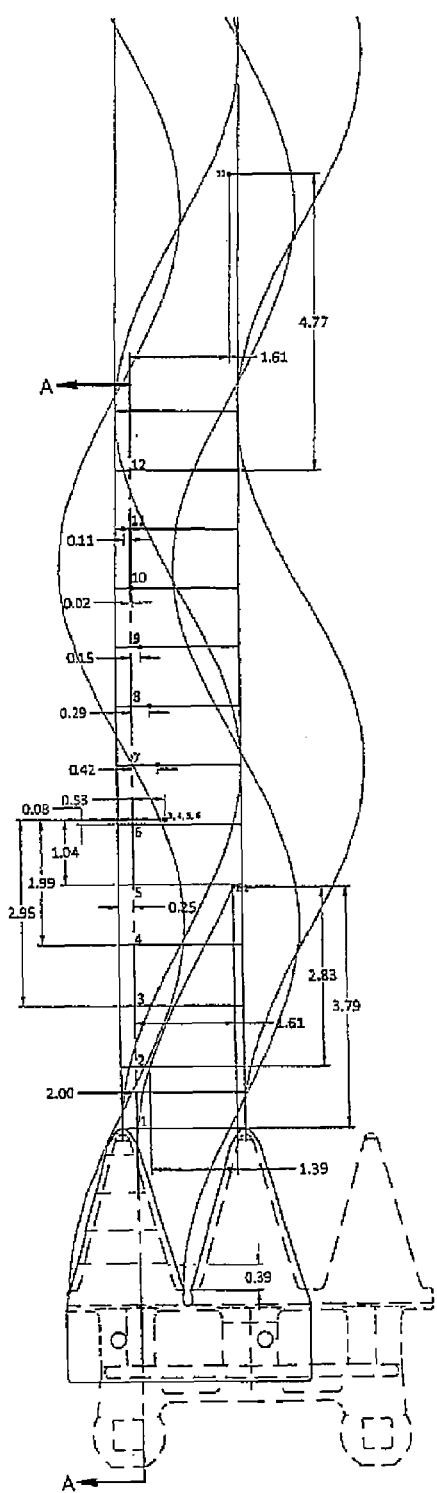
FIG. 18A shows a plan view of a cutting system with an analysis of the cutting action taken along the lines A-A of FIG. 18A where the cutting system is a system according to the present invention using a stub guard, the analysis being carried out at 10 mph and 918 rpm. The arrangement of the blade and guard is as described hereinafter.
Figure 18B:
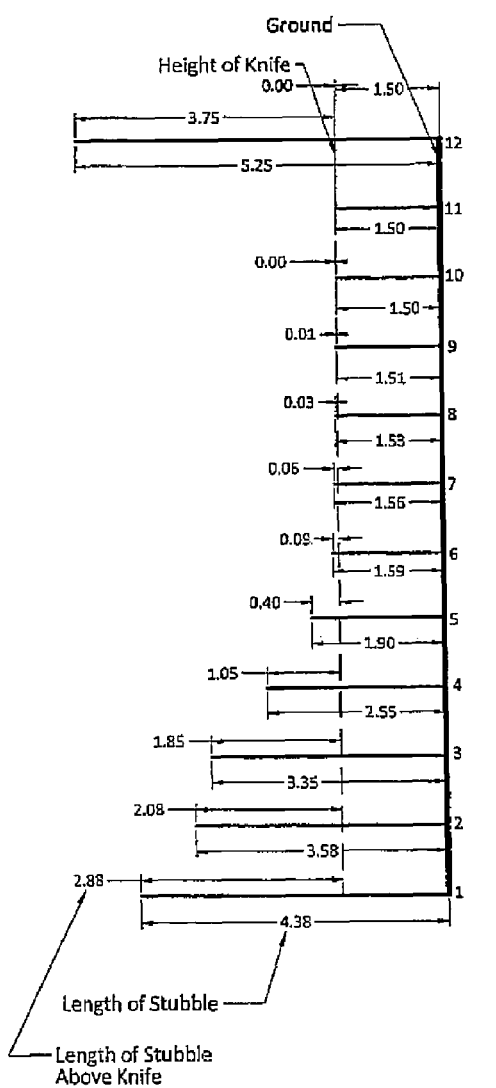
FIG. 18B shows a graph of the analysis of the cutting action taken along the lines A-A of FIG. 18A with the cutting analysis being shown in the table shown in FIG. 29.
Figure 18C:
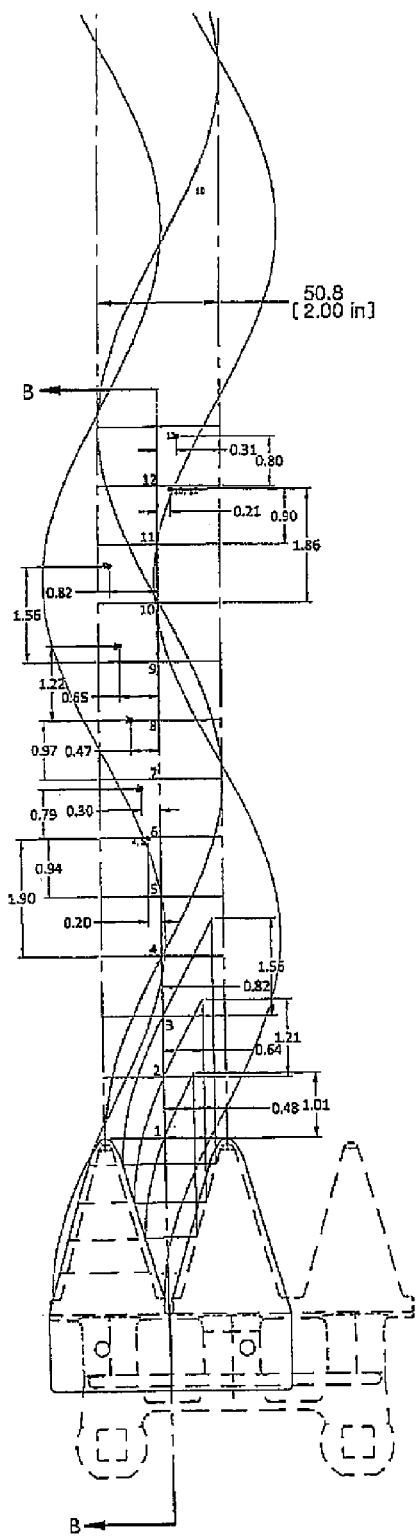
FIG. 18C shows a plan view of the cutting system of FIG. 18A with an analysis of the cutting action taken along the lines B-B of FIG. 18C.
Figure 18D:
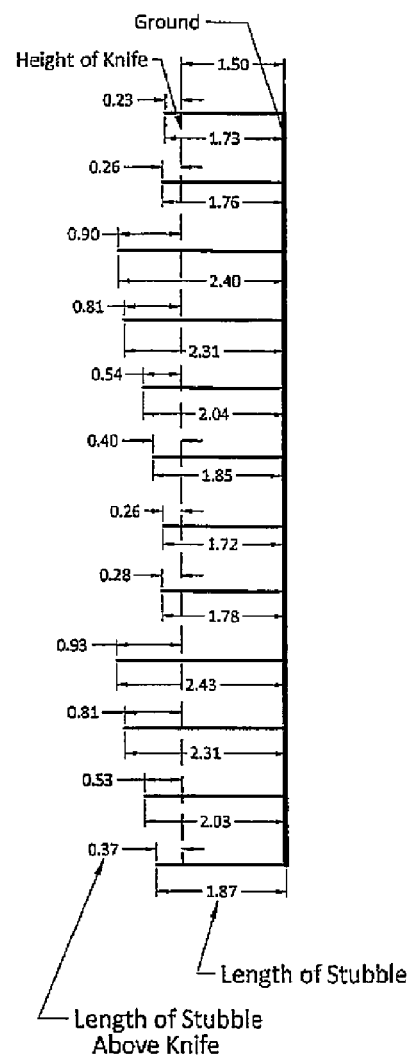
FIG. 18D shows a graph of the analysis of the cutting action taken along the lines B-B of FIG. 18C with the cutting analysis being shown in the table shown in FIG. 30.
Figure 18E:
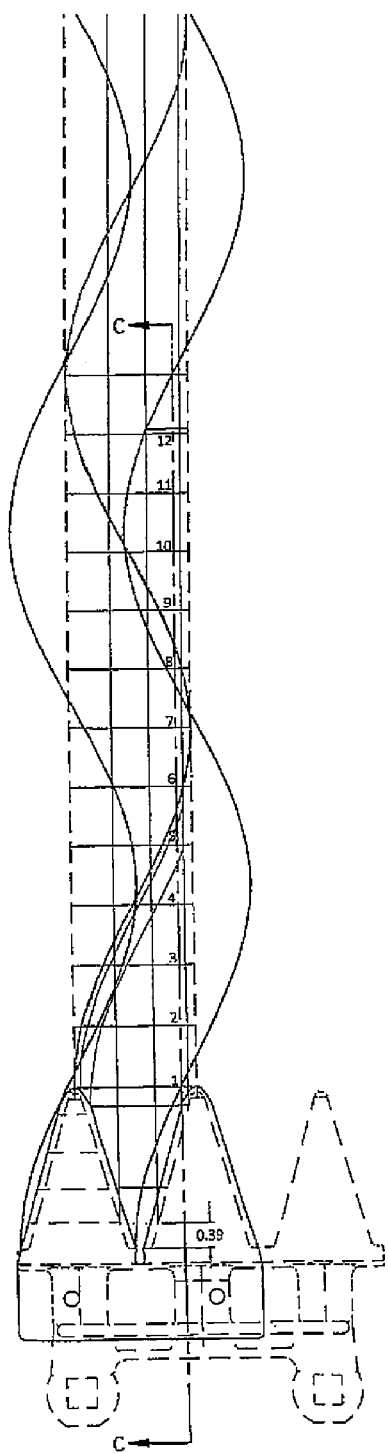
FIG. 18E shows a plan view of the cutting system of FIG. 18A with an analysis of the cutting action taken along the lines C-C of FIG. 18E.
Figure 18F:
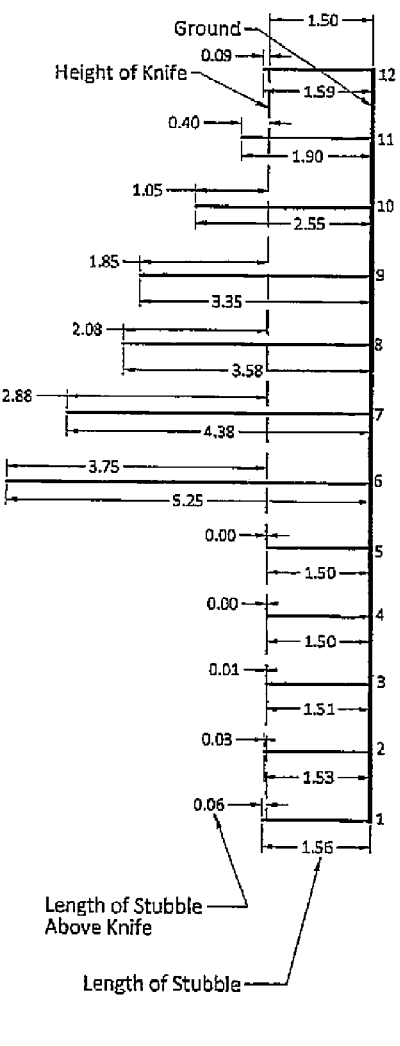
FIG. 18F shows a graph of the analysis of the cutting action taken along the lines C-C of FIG. 18E with the cutting analysis being shown in the table shown in FIG. 31.
Figure 18G:
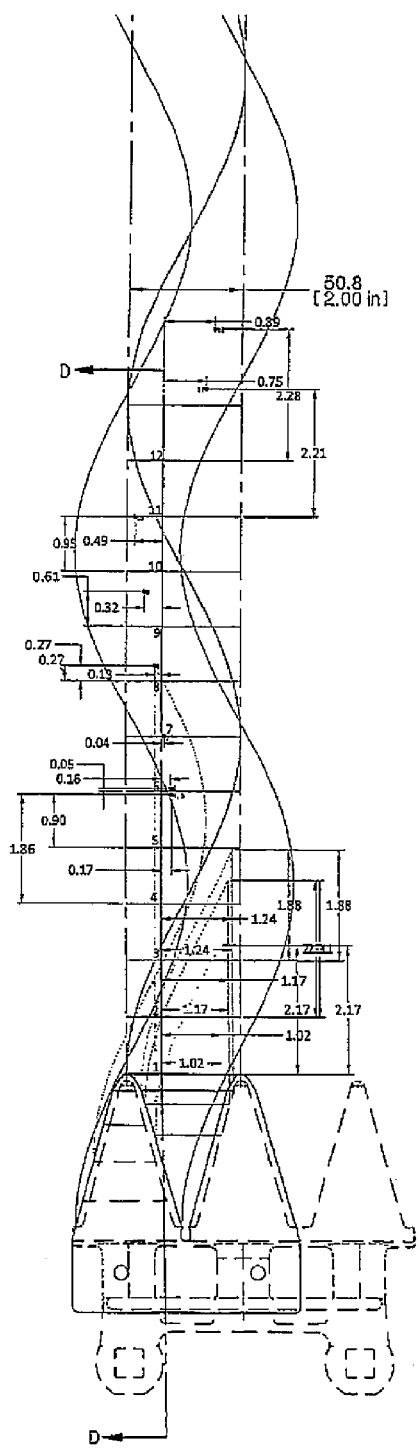
FIG. 18G shows a plan view of the cutting system of FIG. 18A with an analysis of the cutting action taken along the lines D-D of FIG. 18G.
Figure 18H:
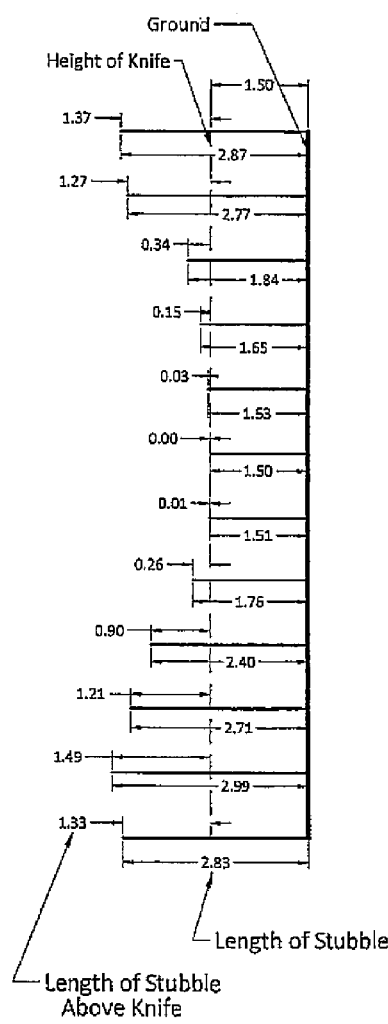
FIG. 18H shows a graph of the analysis of the cutting action taken along the lines D-D of FIG. 18G with the cutting analysis being shown in the table shown in FIG. 31.
Figure 19A:
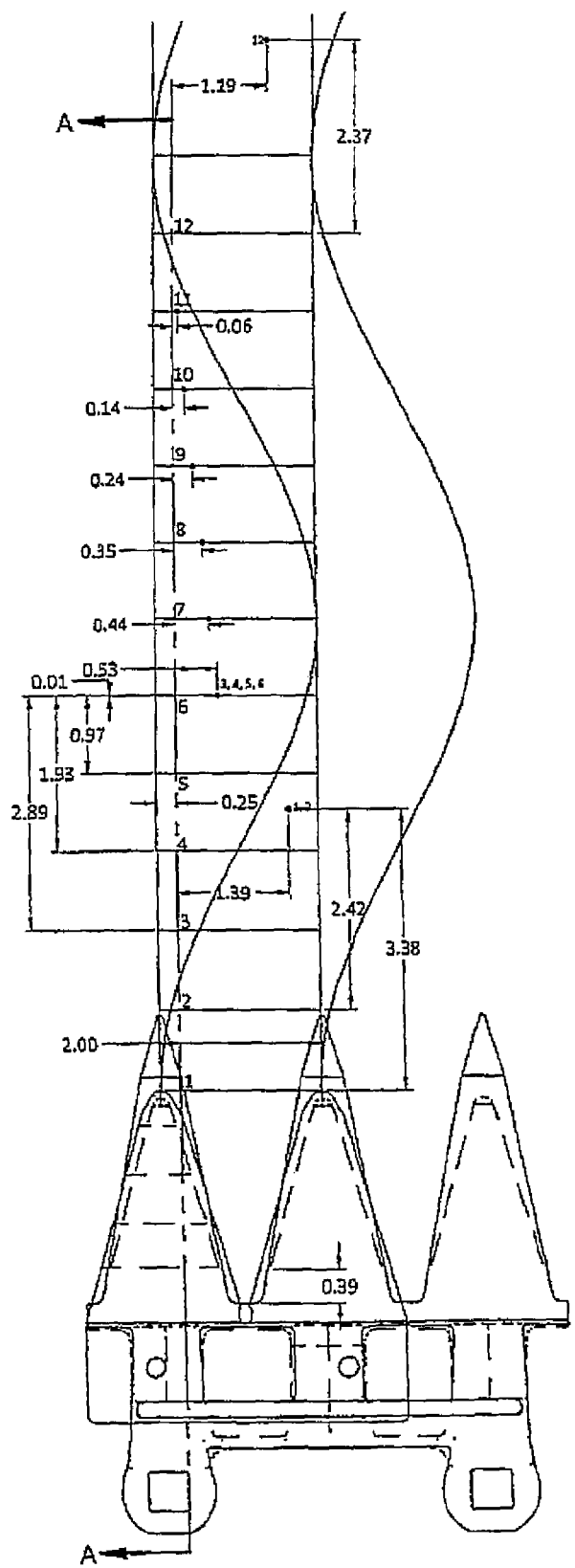
FIG. 19A shows a plan view of a cutting system with an analysis of the cutting action taken along the lines A-A of FIG. 19A where the cutting system is a system according to the present invention using a pointed guard, the analysis being carried out at 10 mph and 918 rpm.
Figure 19B:
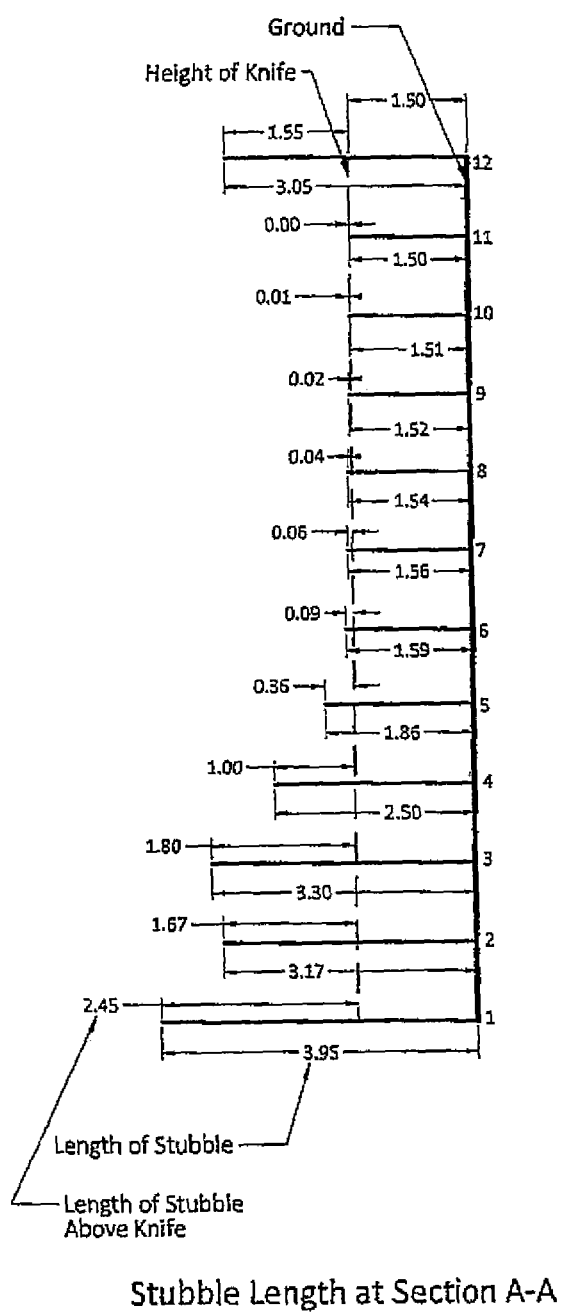
FIG. 19B shows a graph of the analysis of the cutting action taken along the lines A-A of FIG. 19A with the cutting analysis being shown in the table shown in FIG. 33.
Figure 19C:
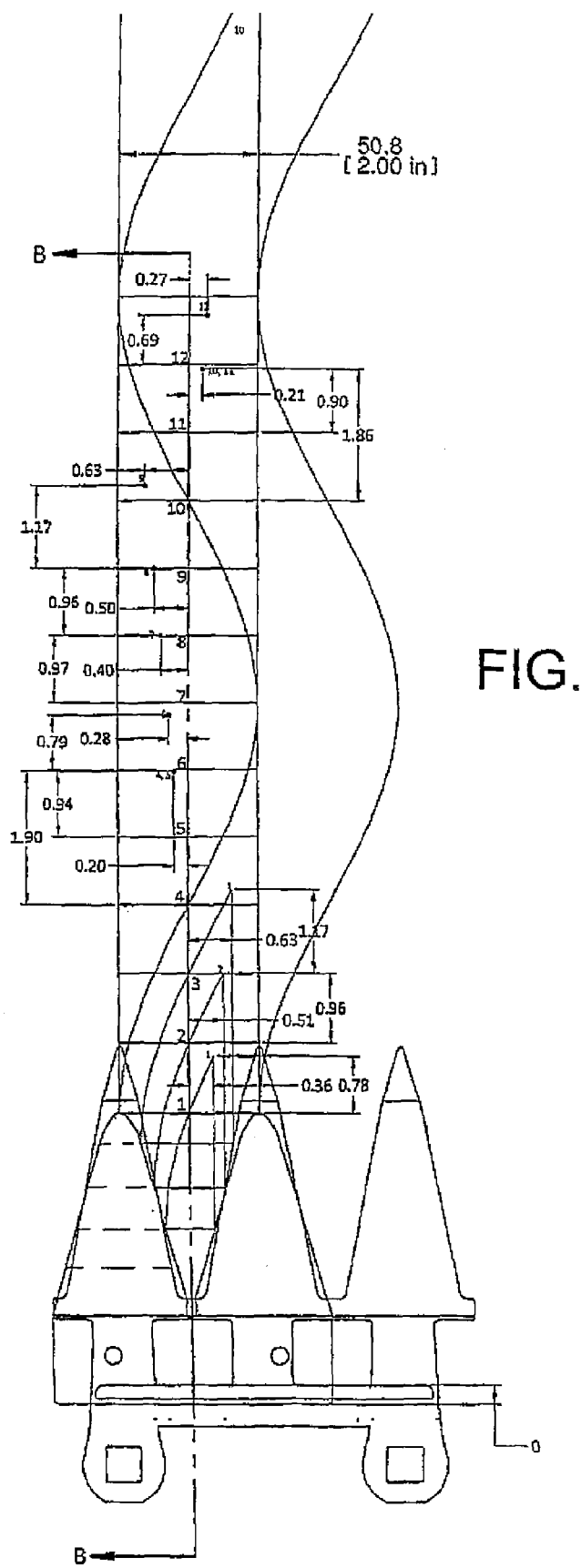
FIG. 19C shows a plan view of the cutting system of FIG. 19A with an analysis of the cutting action taken along the lines B-B of FIG. 19C.
Figure 19D:
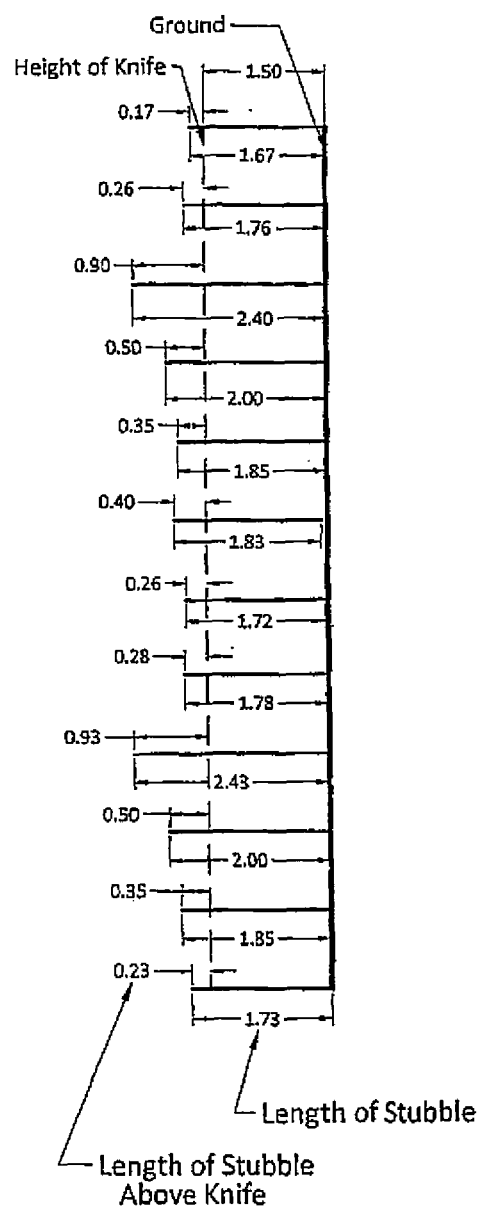
FIG. 19D shows a graph of the analysis of the cutting action taken along the lines B-B of FIG. 19C with the cutting analysis being shown in the table shown in FIG. 34.
Figure 19E:
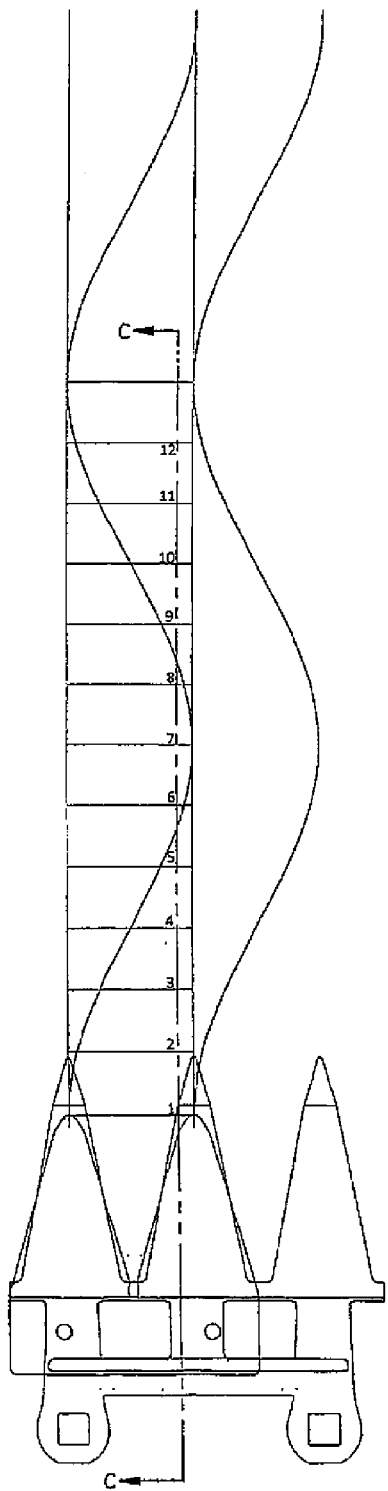
FIG. 19E shows a plan view of the cutting system of FIG. 19A with an analysis of the cutting action taken along the lines C-C of FIG. 19E.
Figure 19F:
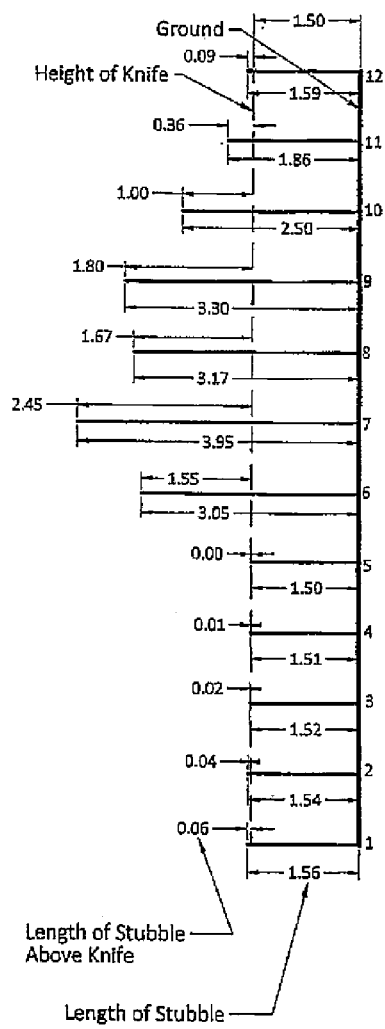
FIG. 19F shows a graph of the analysis of the cutting action taken along the lines C-C of FIG. 19A with the cutting analysis being shown in the table shown in FIG. 35.
Figure 19G:
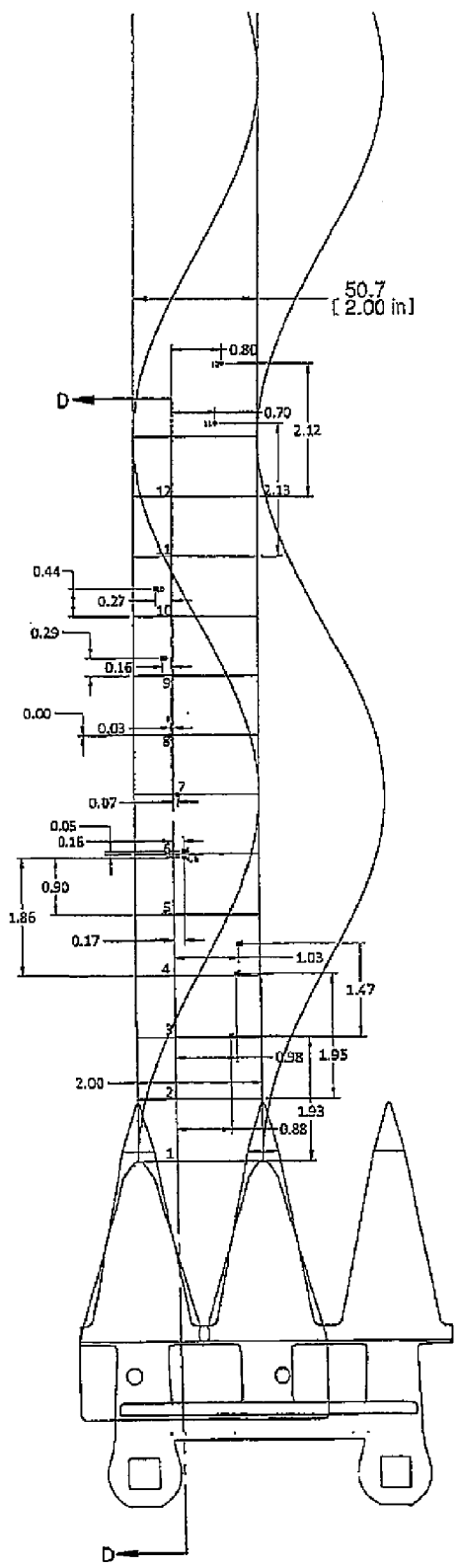
FIG. 19G shows a plan view of the cutting system of FIG. 19A with an analysis of the cutting action taken along the lines D-D of FIG. 19G.
Figure 19H:
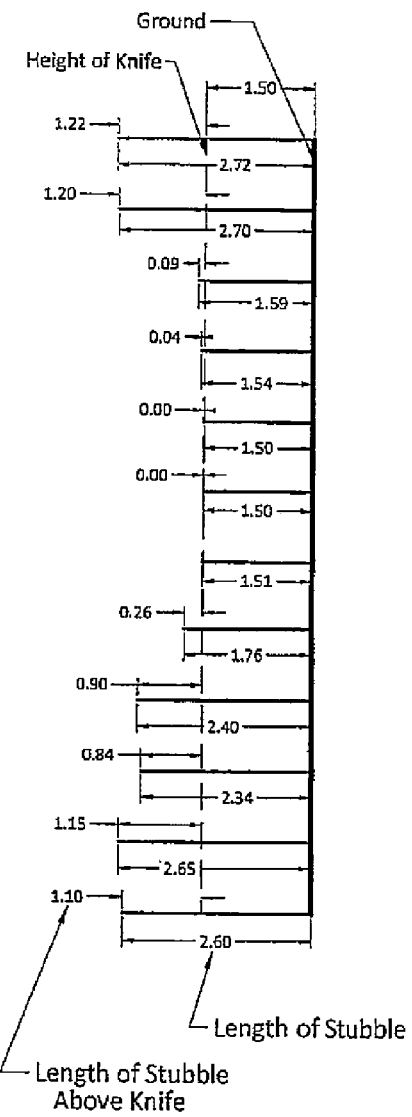
FIG. 19H shows a graph of the analysis of the cutting action taken along the lines D-D of FIG. 19G with the cutting analysis being shown in the table shown in FIG. 36.
Figure 20A:
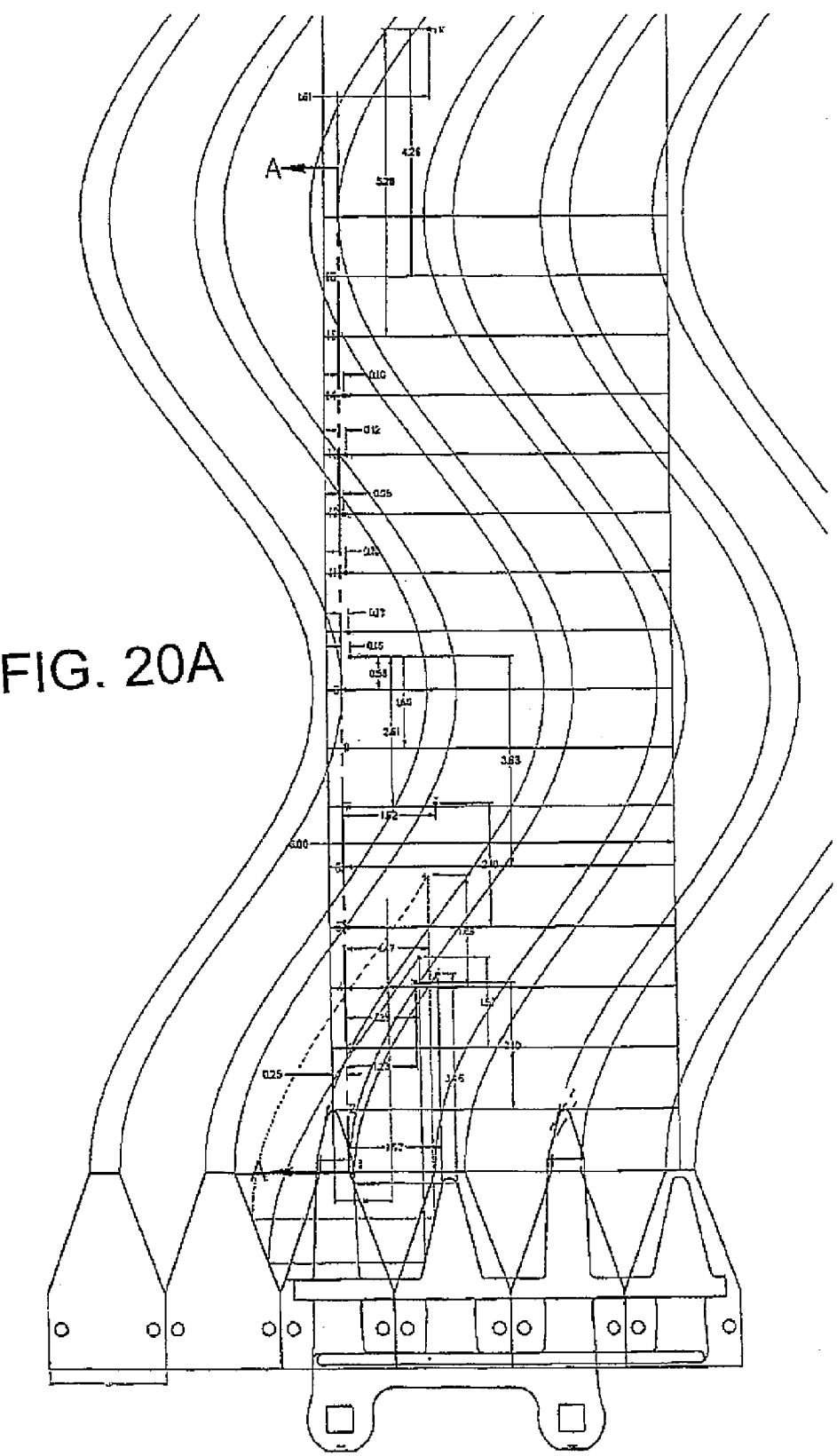
FIG. 20A shows a plan view of a cutting system with an analysis of the cutting action taken along the lines A-A of FIG. 20A where the cutting system is a PRIOR ART system, the analysis being carried out at 10 mph and 650 rpm. In this prior art arrangement as sold by John Deere the guard spacing is 2 inches with the stroke of the cutting blade being 4 inches that is double the guard spacing. The width of the blade is 2.0 inches, the length of the blade is of the order of 1.75 inches and the width of the guard at the trash bar is of the order of 1.0 inches.
Figure 20B:
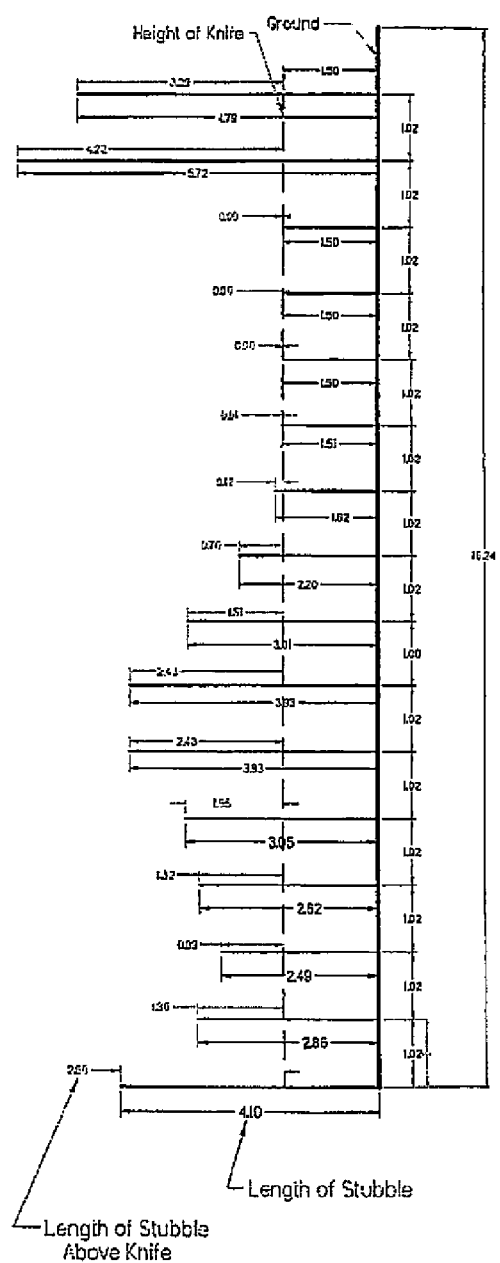
FIG. 20B shows a graph of the analysis of the cutting action taken along the lines A-A of FIG. 20A with the cutting analysis being shown in the table shown in FIG. 37.
Figure 20C:
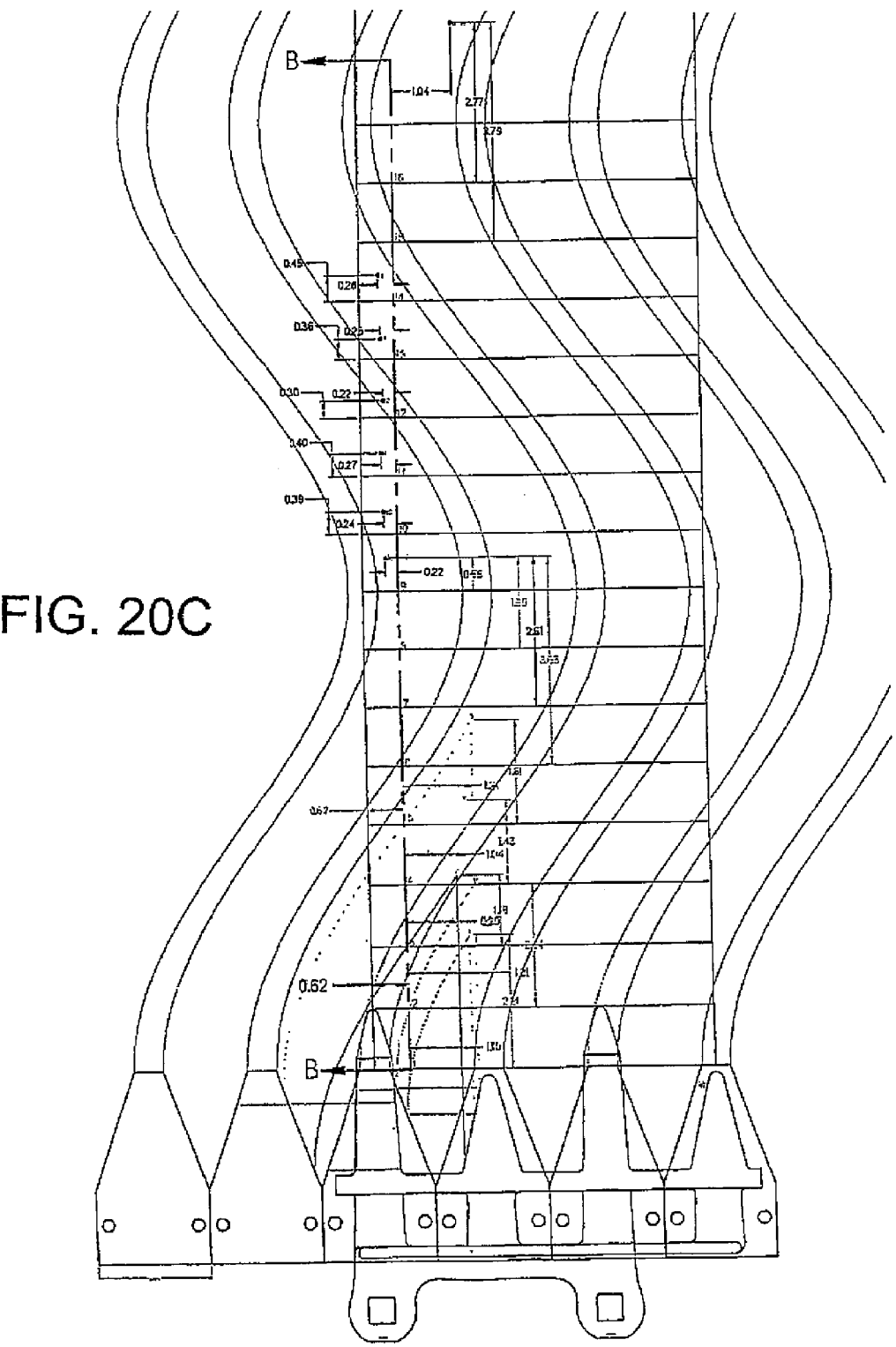
FIG. 20C shows a plan view of the cutting system of FIG. 20A with an analysis of the cutting action taken along the lines B-B of FIG. 20C.
Figure 20D:
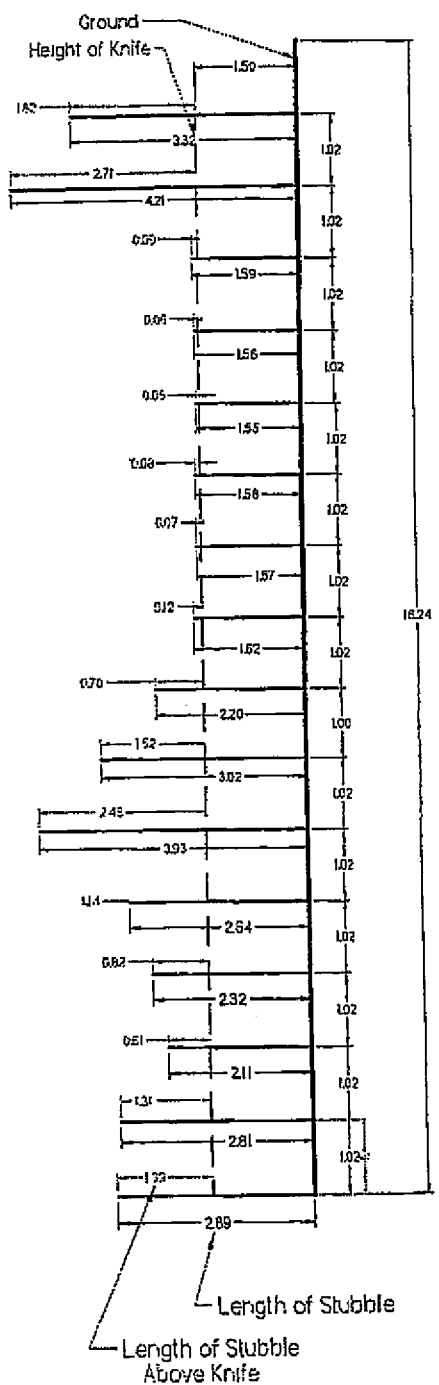
FIG. 20D shows a graph of the analysis of the cutting action taken along the lines B-B of FIG. 20C with the cutting analysis being shown in the table shown in FIG. 38.
Figure 20E:
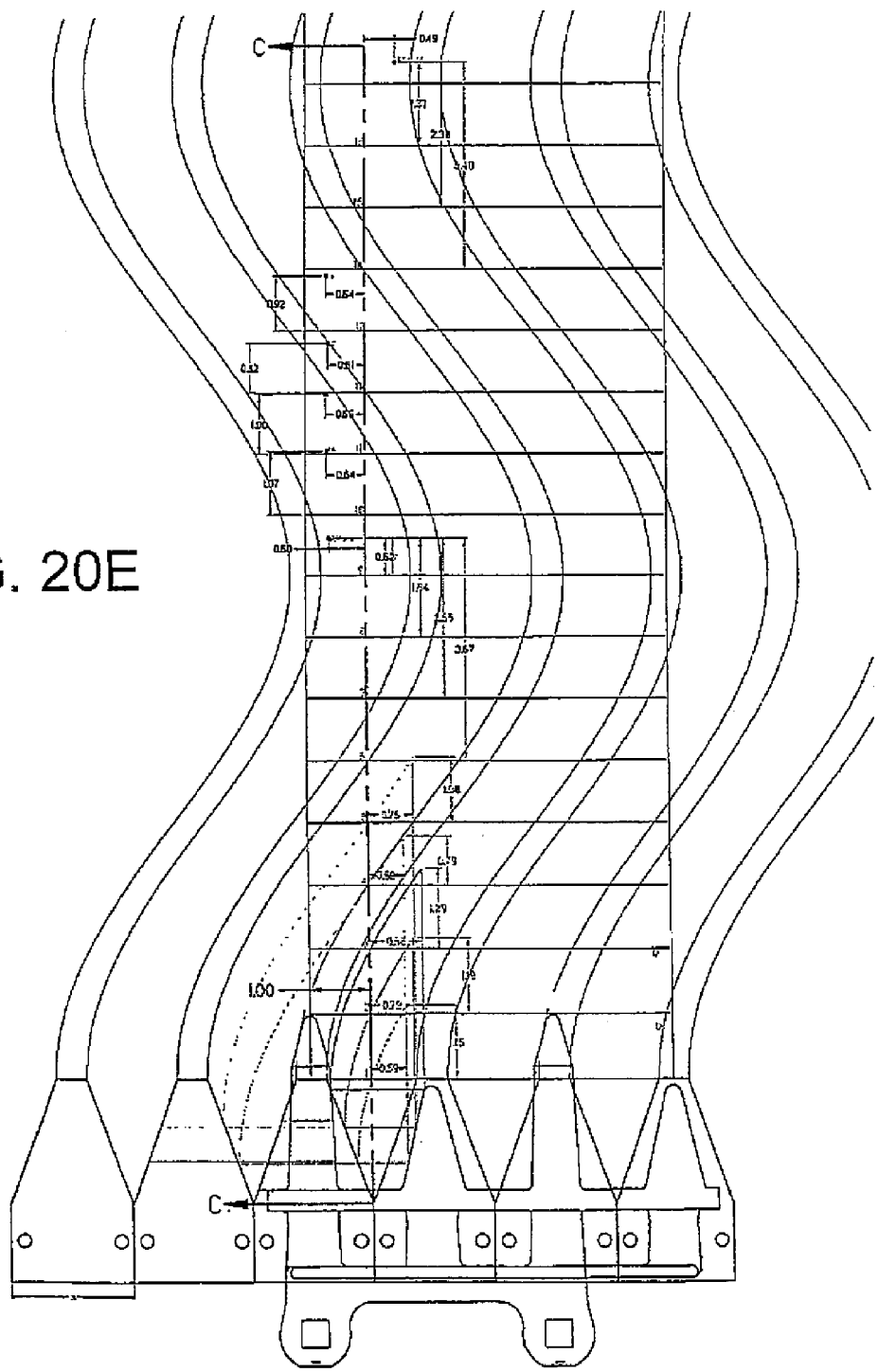
FIG. 20E shows a plan view of the cutting system of FIG. 20A with an analysis of the cutting action taken along the lines C-C of FIG. 20E.
Figure 20F:
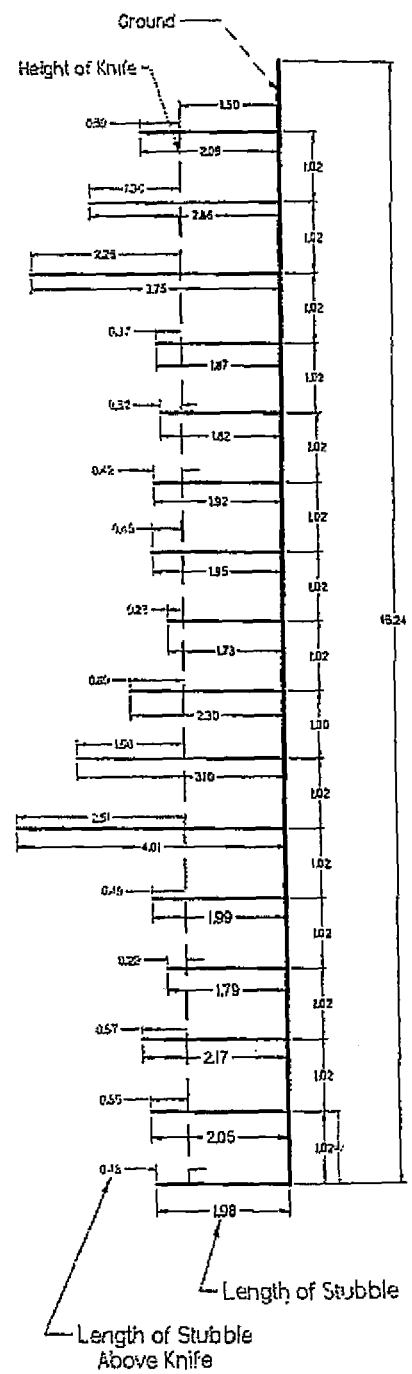
FIG. 20F shows a graph of the analysis of the cutting action taken along the lines C-C of FIG. 20A with the cutting analysis being shown in the table shown in FIG. 39.
Figure 20G:
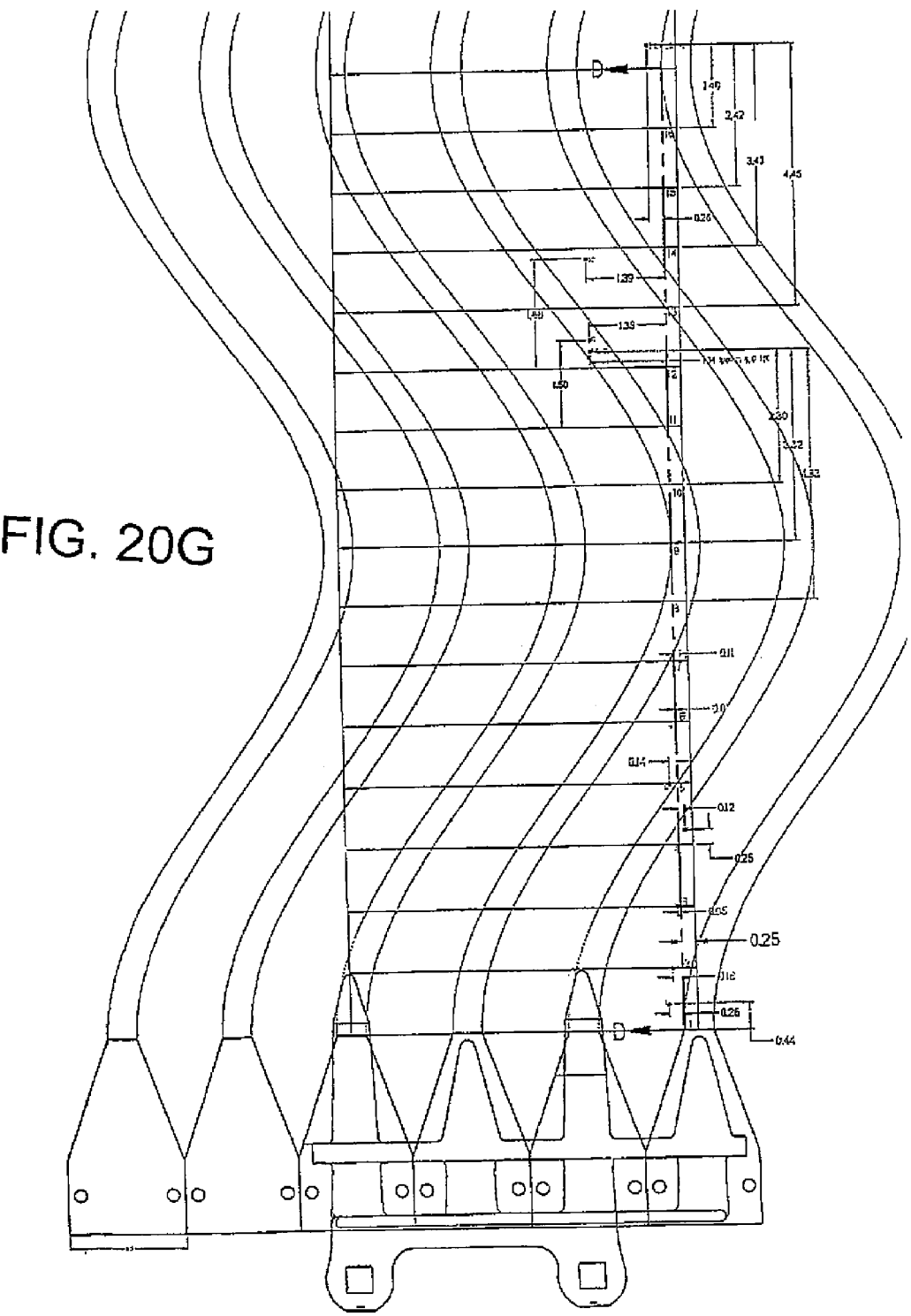
FIG. 20G shows a plan view of the cutting system of FIG. 20A with an analysis of the cutting action taken along the lines D-D of FIG. 20G.
Figure 20H:
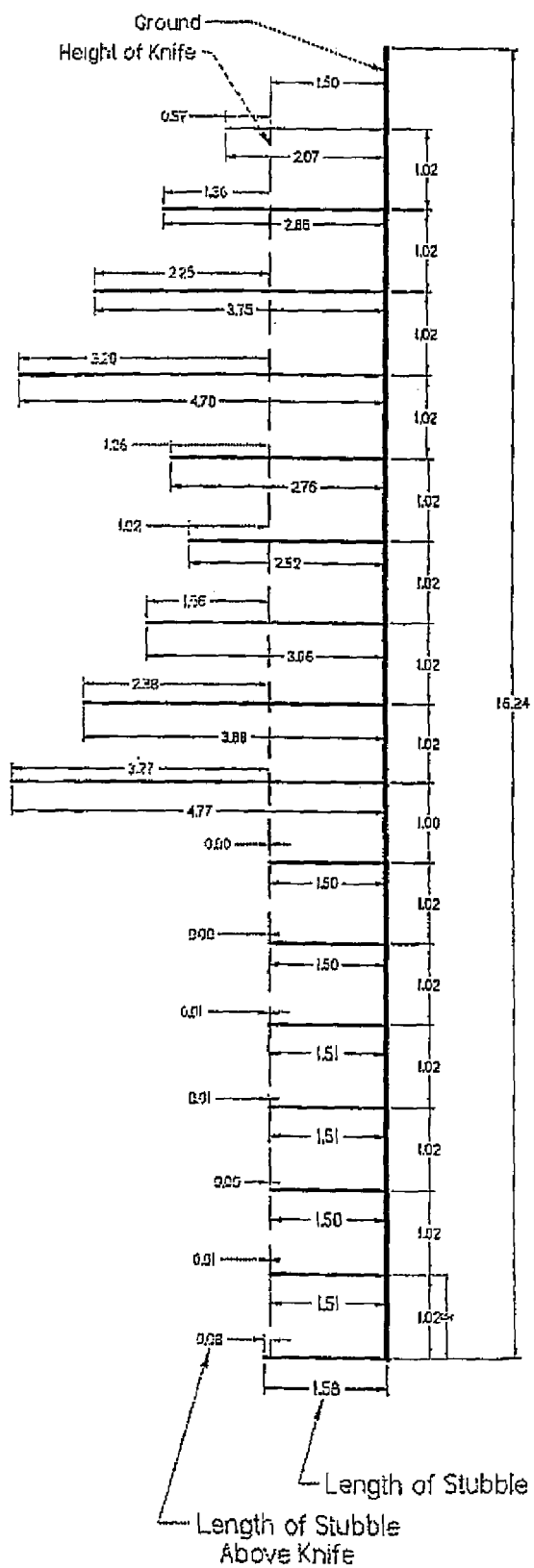
FIG. 20H shows a graph of the analysis of the cutting action taken along the lines D-D of FIG. 20G with the cutting analysis being shown in the table shown in FIG. 40.

Turning now to FIGS. 16 to 20 and the tables shown in FIGS. 21 to 40, there is shown an analysis, of the stubble length for five separate systems. These systems are set out in the brief description of the drawings and are not repeated here. These theoretical lengths match very well the actual measurements of FIGS. 14 and 15. The analyses use the assumptions that:

1—That crop stems are pushed ahead by the conventional square faced tip of the blade and that no crop is pushed by the blade of the present system.

2—That crop that makes contact with the serrations of a section, does not slide along the section, but follows the blade until it makes contact with the guard, at which point, it gets cut.

3—That crop that makes contact with the smooth angled part of the blade slides along the blade until it makes contact with the first serration 4—That crop that makes contact with a guard will slide along the edge of the guard.

A summary of the results of the analyses of the tables shown in FIGS. 21 to 40 is shown in the table shown in FIG. 41. That is the five different systems of FIGS. 16, 17, 20, 18 and 19 are shown using for each the information from the respective four tables. Thus in the first column for the arrangement of FIG. 16, the information relating to the average length of the stubble and the average length above the nominal cutting height of the knife is taken from the tables shown in FIGS. 21 to 24. The bottom row then shows the total average calculated from the four averages shown in the tables shown in FIGS. 21 to 24. Similarly each of the other four systems lists the information taken from the respective tables and in the bottom row shows the total average.

It will be noted that the key values for each of the five systems is shown in the second column for each of the systems. Thus the values for the arrangements are as follows:

Prior art of FIG. 16—2.54 inches above the nominal cutting height

Prior art of FIG. 17—2.14 inches above the nominal cutting height

Prior art of FIG. 20—1.0 inches above the nominal cutting height

Current invention of FIG. 17—0.79 inches above the nominal cutting height

Current invention of FIG. 18—0.61 inches above the nominal cutting height.

This shows that at the set speed of 10 mph and using a reciprocation rate which is suitable for the system concerned bearing in mind the stroke length, the present invention provides an average stubble length above the nominal cutting height of less than 1.0 inches which is the best achieved by the prior art arrangements.

The values of 0.79 and 0.61 provide significant improvements which allow the stubble height at high ground speed to be maintained within acceptable lengths for the effectiveness of the cutting action.

In the table shown in FIG. 42 is shown the results of further analyses of arrangements not shown.

Thus in columns 1 and 2 are shown a further improvement to the present invention where the same configuration of guard and blade as described above is used but the stroke length is increased to 4 inches so that the blade moves across three guards rather than two as described above. It will be noted that the total average in the bottom row is decreased for the stub guard arrangement from 0.79 in the table shown in FIG. 41 to 0.65 and that the total average in the bottom row is decreased for the pointed guard arrangement from 0.61 in the table shown in FIG. 41 to 0.54.

Thus in columns 3 and 4 are shown different arrangements for comparison. In column 3, is shown the results for an arrangement using a pointed blade shape of the present invention but having a width of blade and guard of 3.0 inches. It will be noted that the resultant value is increased to 1.40 which is an unacceptable value above that suitable for the present invention.

In column 4 is shown an arrangement using the configurations of blade described herein with the stroke length of 2.0 inches as described herein, except that the width of the guard is decreased to that of the conventional guard of typically 1.0 inches in width at the trash bar. This change provides a reduction in the improvement to a resultant value of 0.78 which compares to 0.61 with the same configuration using the wider guard of more than 1.5 inches at the trash bar. Thus the wider guard provides an improvement and the narrower guard reduces that improvement but not to an extent where the advantages of the present invention are lost.

The invention claimed is:

1. A sickle cutting apparatus comprising:
   a frame structure arranged for forward travel over ground having a standing crop thereon;
   a cutter bar secured to the frame structure and extending transversely across a front end of said frame structure;
   a plurality of stationary knife guards mounted along the cutter bar and projecting forwardly therefrom;
   each of said guards having at least one guard finger so that the fingers are arranged in a row along the cutter bar with a space between each finger and the next allowing crop to enter the space up to a position of engagement with a rear element along the cutter bar;
   each guard finger having an upwardly facing ledger surface with opposed side edges thereof arranged to provide first and second shearing edges;
   a sickle bar mounted in transversely extending position and being driven for reciprocating movement relative to said guard fingers;

the sickle bar having a plurality of knife blades mounted thereon for movement therewith;

each of the knife blades having a cutting surface for passing across the ledger surface of the knife guard fingers and an opposed surface;

each of the knife blades having on first and second sides first and second side cutting edges which are beveled from the opposed surface to the cutting surface to cooperate with said shearing edges of said guard fingers;

the guard fingers and knife blades being arranged so as to provide a cutting action on the crop in which each knife blade reciprocates back and forth between the guard fingers;

wherein the guard fingers, knife blades and the rear element are shaped and arranged to provide a percentage cutting inefficiency calculated as follows:

within a rectangular area defined by the length of the knife stroke and the ground distance traveled during one knife cycle, the sum of any areas of crop in which the crop remains uncut until it reaches an element of the cutting system by which the crop is pushed forward, without cutting, by contact with the element as the element moves forward;

divided by:

the rectangular area defined by the length of the knife stroke and the ground distance traveled during one knife cycle;

EITHER wherein the percentage cutting inefficiency, calculated at 6 mph and at a sickle stroke rate set at a value which provides inertia values equal to those obtained by a three inch stroke at 600 rpm, is less than 30%;

OR wherein the percentage cutting inefficiency, calculated at 10 mph and at a sickle stroke rate set at a value which provides inertia values equal to those obtained by a three inch stroke at 750 rpm, is less than 35%;

OR wherein the percentage cutting inefficiency, calculated at 14 mph and at a sickle stroke rate set at a value which provides inertia values equal to those obtained by a three inch stroke at 900 rpm, is less than 40%.

2. The apparatus according to claim 1 wherein:
EITHER
the percentage cutting inefficiency at 6 mph is less than 25%;
OR
the percentage cutting inefficiency at 10 mph is less than 30%;
OR
the percentage cutting inefficiency at 14 mph is less than 35%.

3. The apparatus according to claim 1 wherein:
EITHER
the percentage cutting inefficiency at 6 mph is less than 20%;
OR
the percentage cutting inefficiency at 10 mph is less than 25%;
OR
the percentage cutting inefficiency at 14 mph is less than 30%.

4. The apparatus according to claim 1 wherein the sickle stroke rate is in accordance with Table 23.

5. The apparatus according to claim 1 wherein a center line spacing between each knife blade and the next is less than 3.0 inches.

6. The apparatus according to claim 1 wherein the center line spacing between each knife blade and the next is less than 2.5 inches.

7. The apparatus according to claim 1 wherein the center line spacing between each knife blade and the next is of the order of 2.0 inches.

8. The apparatus according to claim 1 wherein a length of each knife blade from the rear element to a forwardmost tip of the knife blade is greater than 1.75 inches or preferably greater than 2.0 inches or is of the order of or is greater than 2.5 inches.

9. The apparatus according to claim 1 wherein a width of each guard at the rear element is greater than 1.0 inches.

10. The apparatus according to claim 1 wherein a width of each guard at the rear element is greater than 1.5 inches.

11. The apparatus according to claim 1 wherein a width of each guard at the rear element is equal to the maximum width which can be obtained while leaving a space at the rear element between the ledger surfaces in the range 0.25 to 0.5 inch or the distance necessary to avoid pinching of crop stalks between the ledger surfaces.

12. The apparatus according to claim 1 wherein the stroke length is equal to the center line spacing between the knife blades.

13. The apparatus according to claim 1 wherein the stroke length is equal to a whole number multiple of the center line spacing between the knife blades.

14. The apparatus according to claim 1 wherein at the position in the stroke where the center line of the knife blades is aligned with the center line of the guard fingers, the side cutting edges of the knife blades substantially directly overlie the side edges of the ledger surface.

15. The apparatus according to claim 1 wherein each knife blade has a front point portion in front of the side cutting edges which front point portion has side edges converging to front apex, where the apex and the side edges of the front point portion are shaped and arranged such that crop material engaging the front point portion, as the point portion is moved forwardly in the crop, is shed to one or other side of the front point portion for cutting by the side cutting edges and is not pushed forwardly by the front point portion.

16. The apparatus according to claim 15 wherein the front point portion has side edges which are not sharpened.

17. The apparatus according to claim 1 wherein each guard finger has a downwardly facing ground engaging surface shaped and arranged to provide protection for stone engagement.

* * * * *